United States Patent
Zhang et al.

(10) Patent No.: US 12,034,662 B2
(45) Date of Patent: Jul. 9, 2024

(54) METHOD AND APPARATUS FOR TRANSMITTING INFORMATION

(71) Applicant: ZTE CORPORATION, Shenzhen (CN)

(72) Inventors: Shujuan Zhang, Shenzhen (CN); Zhaohua Lu, Shenzhen (CN); Chuangxin Jiang, Shenzhen (CN); Yu Ngok Li, Hong Kong (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 445 days.

(21) Appl. No.: 17/423,825

(22) PCT Filed: Jan. 16, 2020

(86) PCT No.: PCT/CN2020/072351
§ 371 (c)(1),
(2) Date: Oct. 15, 2021

(87) PCT Pub. No.: WO2020/147764
PCT Pub. Date: Jul. 23, 2020

(65) Prior Publication Data
US 2022/0116171 A1 Apr. 14, 2022

(30) Foreign Application Priority Data
Jan. 18, 2019 (CN) .......................... 201910049885.7

(51) Int. Cl.
*H04L 5/00* (2006.01)
*H04W 72/23* (2023.01)

(52) U.S. Cl.
CPC ........... *H04L 5/0048* (2013.01); *H04W 72/23* (2023.01)

(58) Field of Classification Search
CPC .............................. H04L 5/0048; H04W 72/23
See application file for complete search history.

(56) References Cited

U.S. PATENT DOCUMENTS

| 2018/0375634 | A1 | 12/2018 | Sun et al. | |
| 2020/0229008 | A1* | 7/2020 | Islam | ..................... H04W 16/28 |
| 2020/0296704 | A1* | 9/2020 | Vilaipornsawai | ..... H04L 5/0094 |

FOREIGN PATENT DOCUMENTS

| CN | 107734514 A | 2/2018 |
| CN | 108111283 A | 6/2018 |

(Continued)

OTHER PUBLICATIONS

Chinese Office Action for Application No. 201910049885.7, dated Jun. 14, 2022, 12 pages including translation.

(Continued)

*Primary Examiner* — Kevin M Cunningham
(74) *Attorney, Agent, or Firm* — Morgan, Lewis & Bockius LLP

(57) ABSTRACT

Provided are method and apparatus for transmitting information. The method for transmitting information includes: determining an intersection between pieces of transmission information included in N first-type information elements; and in the case where the intersection is non-empty, determining first information. The first information includes at least one of: a difference set between pieces of transmission information included in any two first-type information elements of the N first-type information elements, Hybrid Automatic Repeat Request acknowledgement (HARQ-ACK) feedback bits of the N first-type information elements, a mapping relationship between a bit field value corresponding to a bit indication field in downlink control information (DCI) and a parameter value indicated by the bit indication field in the DCI, the number of bits of each of the pieces of transmission information or a resource mapping (Continued)

manner of first-type information element. N is a positive integer greater than or equal to 2.

16 Claims, 9 Drawing Sheets

(56) References Cited

FOREIGN PATENT DOCUMENTS

| CN | 108199819 A | 6/2018 |
|---|---|---|
| CN | 108964832 A | 12/2018 |
| CN | 110535570 A | 12/2019 |
| WO | WO2018/171474 A1 | 9/2018 |
| WO | WO-2018164495 A1 | 9/2018 |
| WO | WO2018/202160 A1 | 11/2018 |
| WO | WO2018/228487 A1 | 12/2018 |
| WO | WO-2018223279 A1 | 12/2018 |
| WO | WO-2019005838 A1 | 1/2019 |

OTHER PUBLICATIONS

Chinese Search Report for Application No. 201910049885.7, dated May 10, 2022, 3 pages including translation.
Indian Office Action for Application No. 202127037450, dated Aug. 4, 2022, 7 pages including English translation.
Extended European Search Report in Application No. 20741416.0, dated Sep. 12, 2022, 10 pages.
Zte, "Multi-TRP Transmission and interference coordination", 3GPP TSG RAN WG1 NR Ad-Hoc#2, R1-1710180, Qingdao, P.R. China, Jun. 27-30, 2017, 7 pages.
International Search Report for Application No. PCT/CN2020/072351, dated Apr. 16, 2020, 6 pages including English translation.

\* cited by examiner

METHOD AND APPARATUS FOR TRANSMITTING INFORMATION

CROSS REFERENCE TO RELATED APPLICATIONS

This application is a U.S. National Stage Application, filed under 35 U.S.C. 371, of International Patent Application No. PCT/CN2020/072351, filed on Jan. 16, 2020, which claims priority to Chinese Patent Application No. 201910049885.7 filed with the CNIPA on Jan. 18, 2019, the contents of which are incorporated herein by reference in their entireties.

TECHNICAL FIELD

Embodiments of the present disclosure relate to, but are not limited to, the field of communications, for example, a method and an apparatus for transmitting information.

BACKGROUND

The core technical feature of high-frequency communications is the use of beam communications with a core advantage of small interference. A large beam gain makes it possible for the high-frequency communications with a large path loss to be used for outdoor communications. The beam communications have a core disadvantage of partial coverage.

Therefore, attention is paid to a technology which uses multiple beams for sending the same information to improve link robustness while ensuring a low communication delay. However, different beams arrive at a terminal with different link performance. If information is transmitted by using all beams at the same rate, spectral efficiency will not be fully utilized. How to improve the spectral efficiency when the same information is transmitted using the multiple beams is a main problem considered herein.

On the other hand, the enhancement of Hybrid Automatic Repeat Request acknowledgement (HARQ-ACK) feedback and the enhancement of control signaling in the case of repeated transmissions are also problems considered herein.

SUMMARY

Embodiments of the present disclosure provide a method and apparatus for transmitting information, which can improve spectral efficiency while transmitting information using multiple beams.

An embodiment of the present disclosure provides a method for transmitting information. The method includes: determining an intersection between pieces of transmission information included in N first-type information elements; and in the case where the intersection is non-empty, determining first information. The first information includes at least one of: a difference set between pieces of transmission information included in any two first-type information elements of the N first-type information elements, Hybrid Automatic Repeat Request acknowledgement (HARQ-ACK) feedback bits of the N first-type information elements, a mapping relationship between a bit field value corresponding to a bit indication field in downlink control information (DCI) and a parameter value indicated by the bit indication field in the DCI, the number of bits of each of the pieces of transmission information or a resource mapping manner of a first-type information element of the N first-type information elements. N is a positive integer greater than or equal to 2.

Another embodiment of the present disclosure provides an apparatus for transmitting information. The apparatus includes a first determination module and a second determination module. The first determination module is configured to determine an intersection between pieces of transmission information included in N first-type information elements. The second determination module is configured to: in the case where the intersection is non-empty, determine first information. The first information includes at least one of: a difference set between pieces of transmission information included in any two first-type information elements, of the N first-type information elements, Hybrid Automatic Repeat Request acknowledgement (HARQ-ACK) feedback bits of the N first-type information elements, a mapping relationship between a bit field value corresponding to a bit indication field in downlink control information (DCI) and a parameter value indicated by the bit indication field in the DCI, the number of bits of each of the pieces of transmission information or a resource mapping manner of a first-type information element of the N first-type information elements. N is a positive integer greater than or equal to 2.

Another embodiment of the present disclosure provides an apparatus for transmitting information. The apparatus includes a processor and a computer-readable storage medium. The computer-readable storage medium stores instructions which, when executed by the processor, implement any one of the preceding methods for transmitting information.

Another embodiment of the present disclosure provides a computer-readable storage medium. The computer-readable storage medium stores a computer program which, when executed by a processor, implements steps of any one of the preceding methods for transmitting information.

Another embodiment of the present disclosure provides a method for transmitting an information element. The method includes: determining a correspondence between an eleventh-type parameter and a twelfth-type parameter according to signaling information and/or a predetermined rule; and determining a thirteenth-type parameter and/or the eleventh-type parameter of the information element according to the correspondence. The eleventh-type parameter includes one of a quasi co-location reference signal set, a group where a quasi co-location reference signal set is located, a transmission configuration indicator (TCI) state, a TCI state group, a demodulation reference signal (DMRS) port group, a time domain resource set, a frequency domain resource set, a first-type process number set or a control channel resource group. The twelfth-type parameter includes at least one of the thirteenth-type parameter or a difference between two thirteenth-type parameters corresponding to values of two eleventh-type parameters.

Another embodiment of the present disclosure provides an apparatus for transmitting an information element. The apparatus includes a third determination module and a fourth determination module. The third determination module is configured to determine a correspondence between an eleventh-type parameter and a twelfth-type parameter according to signaling information and/or a predetermined rule. The fourth determination module is configured to determine a thirteenth-type parameter and/or the eleventh-type parameter of the information element according to the correspondence. The eleventh-type parameter includes one of a quasi co-location reference signal set, a group where a quasi co-location reference signal set is located, a transmission configuration indicator (TCI) state, a TCI state group, a demodulation reference signal (DMRS) port group, a time domain resource set, a frequency domain resource set, a first-type process number set or a control channel resource group. The twelfth-type parameter includes at least one of the thirteenth-type parameter or a difference between two thirteenth-type parameters corresponding to values of two eleventh-type parameters.

Another embodiment of the present disclosure provides an apparatus for transmitting an information element. The apparatus includes a processor and a computer-readable storage medium. The computer-readable storage medium stores instructions which, when executed by the processor, implement any one of the preceding methods for transmitting an information element.

Another embodiment of the present disclosure provides a computer-readable storage medium. The computer-readable storage medium stores a computer program which, when executed by a processor, implements steps of any one of the preceding methods for transmitting an information element.

An embodiment of the present disclosure provides an information processing method. The method includes sending third information; and/or determining the third information through signaling information and/or a predetermined rule. The third information includes at least one of: a maximum number of fourth-type information elements capable of being simultaneously transmitted in one time unit; a maximum number of fourth-type information elements capable of being transmitted in one time unit; a maximum number of spatial receive parameters capable of being simultaneously transmitted in one time unit; a maximum number of fourth-type information elements capable of being notified to be received in a time domain resource between two Hybrid Automatic Repeat reQuest acknowledgment (HARQ-ACK) feedback resources of one process number, where the HARQ-ACK feedback resources include ACKs or non-acknowledgments (NACKs) for fourth-type information elements in the one process number; whether multiple frequency domain bandwidths are capable of sharing one HARQ entity; whether data or information in multiple soft buffers is capable of being combined; a maximum number of fourth-type information elements including the same transmission information; a condition to be satisfied by a relationship between frequency domain resources occupied by at least two fourth-type information elements whose time domain resources have a non-empty intersection; a condition to be satisfied by a relationship between time domain resources occupied by multiple fourth-type information elements which fall within one time unit; a size of a soft buffer and/or the number of soft buffers corresponding to one process number; or a size of a codeword (CW) or a transport block (TB) and/or the number of CWs or TBs included in one soft buffer.

An embodiment of the present disclosure provides an information processing apparatus. The apparatus is configured to send third information and/or determine the third information through signaling information and/or a predetermined rule. The third information includes at least one of: a maximum number of fourth-type information elements capable of being simultaneously transmitted in one time unit; a maximum number of fourth-type information elements capable of being transmitted in one time unit; a maximum number of spatial receive parameters capable of being simultaneously transmitted in one time unit; a maximum number of fourth-type information elements capable of being notified to be received in a time domain resource between two Hybrid Automatic Repeat Request acknowledgment (HARQ-ACK) feedback resources of one process number, where the HARQ-ACK feedback resources include ACKs or non-acknowledgments (NACKs) for fourth-type information elements in the one process number; whether multiple frequency domain bandwidths are capable of sharing one HARQ entity; whether data or information in multiple soft buffers is capable of being combined; a maximum number of fourth-type information elements including the same transmission information; a condition to be satisfied by a relationship between frequency domain resources occupied by at least two fourth-type information elements whose time domain resources have a non-empty intersection; a condition to be satisfied by a relationship between time domain resources occupied by multiple fourth-type information elements which fall within one time unit; a size of a soft buffer and/or the number of soft buffers corresponding to one process number; or a size of a codeword (CW) or a transport block (TB) and/or the number of CWs or TBs included in one soft buffer.

An embodiment of the present disclosure provides an information processing apparatus. The apparatus includes a processor and a computer-readable storage medium. The computer-readable storage medium stores instructions which, when executed by the processor, implement any one of the preceding information processing methods.

An embodiment of the present disclosure provides a computer-readable storage medium. The computer-readable storage medium stores a computer program which, when executed by a processor, implements steps of any one of the preceding information processing methods.

The embodiment of the present disclosure includes: determining the intersection between the pieces of transmission information included in the N first-type information elements; and in the case where the intersection is non-empty, determining the first information. The first information includes at least one of: the difference between the pieces of transmission information included in the any two first-type information elements of the N first-type information elements, the Hybrid Automatic Repeat Request acknowledgement (HARQ-ACK) feedback bits of the N first-type information elements, the mapping relationship between the bit field value corresponding to the bit indication field in the downlink control information (DCI) and the parameter value indicated by the bit indication field in the DCI, the number of bits of each of the pieces of transmission information or the resource mapping manner of the first-type information element. N is a positive integer greater than or equal to 2. In the embodiments of the present disclosure, in the case where the intersection is non-empty, link robustness is improved and link performance is fully utilized so that spectral efficiency is improved. Meanwhile, the signaling information is fully utilized in the embodiments of the present disclosure so that signaling loads are reduced to a certain extent.

Other features and advantages of the embodiments of the present disclosure will be set forth in the description which follows and in part become apparent from the description, or will be understood through implementation of the embodiments of the present disclosure. The object and other advantages of the embodiments of the present disclosure may be achieved and obtained through structures set forth in the description, claims and drawings.

BRIEF DESCRIPTION OF DRAWINGS

The drawings are intended to provide a further understanding of solutions of embodiments of the present disclosure, constitute a part of the description, and explain the solutions of the embodiments of the present disclosure in conjunction with embodiments of the present disclosure, and do not limit the solutions of the embodiments of the present disclosure.

DETAILED DESCRIPTION

Embodiments of the present disclosure are described below in detail in conjunction with drawings. It is to be noted that if not in collision, embodiments and features therein in the present application may be combined with each other in any manner.

The steps illustrated in the flowcharts among the drawings may be performed by a computer system such as a group of computers capable of executing instructions. Moreover, although logical sequences are illustrated in the flowcharts, the steps illustrated or described may be performed in sequences different from those described herein in some cases.

At present, New Radio (NR) supports a transmission based on code block group (CBG). One transport block (TB) is divided into C code blocks (CBs), each CB has its corresponding cyclic redundancy check (CRC) code, and the TB itself has one CRC code. A communication receiving end may determine whether transmission information is successfully received through a check bit of the CRC code.

Figure 1:
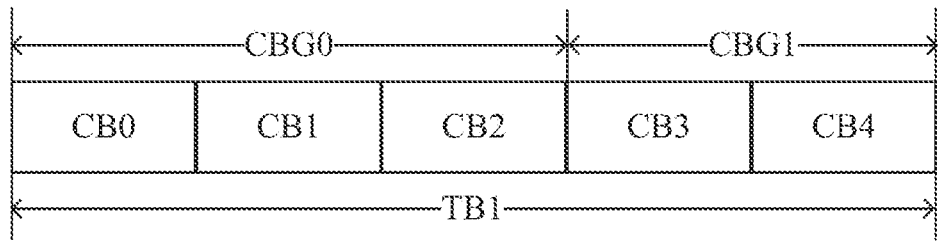
FIG. 1 is a schematic diagram illustrating that one TB includes five code blocks (CBs) and two code block groups (CBGs) according to an embodiment of the present disclosure.
Figure 2:
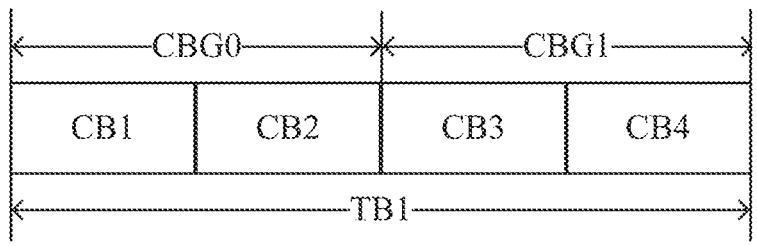
FIG. 2 is a schematic diagram illustrating that one TB includes four CBs and two CBGs according to an embodiment of the present disclosure.

The CBs included in the TB are divided into one or more CBGs and each CBG corresponds to one acknowledge (ACK) feedback bit or one non-acknowledge (NACK) feedback bit (hereinafter referred to as a Hybrid Automatic Repeat Request (HARQ)-ACK feedback bit). As shown in FIG. 1, one TB includes five CBs and two CBGs, where first three CBs are included in CBG0 and last two CBs are included in CBG1. Alternatively, as shown in FIG. 2, one TB includes four CBs and two CBGs, where first two CBs are included in CBG0 and last two CBs are included in CBG1.

In the following description, when an intersection between pieces of transmission information included in N codewords (CWs) is non-empty, especially when a difference set between the pieces of transmission information included in the N CWs is also empty, it may be referred to as that the N CWs correspond to one TB. Alternatively, even if one TB is repeatedly transmitted in two CWs, it is considered that each CW corresponds to one TB and an intersection between pieces of transmission information included in the two CWs is non-empty. Alternatively, CWs are in a one-to-one correspondence to parameter notification bit fields notified in downlink control information (DCI), that is, each CW corresponds to one independent set of parameter notification bit fields, where parameters include at least one of a modulation and coding scheme (MCS), a new data indicator (NDI), a redundancy version (RV) or code block group transmission information (CBGTI). That is, the N CWs correspond to N notification bit fields of the above parameter in the DCI. The N parameter notification bit fields may be included in one piece of DCI or may be included in multiple pieces of DCI. The parameter notification bit fields may be the same as or different from bit indication fields described below.

In the following embodiments, an agreed rule may also be referred to as a predetermined rule, for example, a rule predetermined by both parties. Alternatively, one of the parties performs operations according to the predetermined rule.

In the following embodiments, a transmission configuration indicator (TCI) is used for configuring information about a quasi co-location reference signal of a downlink reference signal and may also be referred to as an indication field of the quasi co-location reference signal or configuration information of the quasi co-location reference signal or other equivalent names, which does not affect the inventiveness of the present application.

That two pieces of transmission configuration information are different includes one of the following: quasi co-location reference signals configured in the two pieces of transmission configuration information with respect to one type of quasi co-location parameter do not satisfy a quasi co-location relationship, or quasi co-location reference signals configured in the two pieces of transmission configuration information with respect to one type of quasi co-location parameter are different.

For example, as for TCI configuration information of a target downlink reference signal (such as a downlink demodulation reference signal (DMRS) and/or a measurement reference signal and/or a phase tracking reference signal), TCI configuration information of a target downlink reference signal DL-RS3 is {(DL-RS1, QCL-type1), (DL-RS2, QCL-type2)}, which indicates that the target downlink reference signal DL-RS3 and DL-RS1 satisfy the quasi co-location relationship with respect to a quasi co-location parameter included in QCL-type1, and the target downlink reference signal DL-RS3 and DL-RS2 satisfy the quasi co-location relationship with respect to a QCL parameter included in QCL-type2. QCL-type1 and/or QCL-type2 include one or more of the following QCL parameters: a Doppler shift, a Doppler spread, an average delay, a delay spread, a spatial receive (Rx) parameter or an average gain.

One TCI state (which may also be simply referred to as the TCI in the following description) may include one or more quasi co-location reference signal sets. As shown in Table 1, TCI1 includes one quasi co-location reference signal set {DL-RS1, DL-RS2}, and TCI2 includes two quasi co-location reference signal sets {DL-RS3, DL-RS4} and {DL-RS5, DL-RS6}. DMRSs in the same DMRS group satisfy the quasi co-location relationship. Each quasi co-location reference signal set corresponds to one DMRS group.

TABLE 1

| Index of a TCI state | Target Reference Signal | Quasi Co-Location Reference Signal |
|---|---|---|
| TCI1 | DMRS group1 | (DL-RS1, QCL-type1) (DL-RS2, QCL-type2) |
| TCI2 | DMRS group1 | (DL-RS3, QCL-type1) (DL-RS4, QCL-type2) |
|  | DMRS group2 | (DL-RS5, QCL-type1) (DL-RS6, QCL-type2) |

In the following embodiments, one frequency domain bandwidth includes at least one of one component carrier (CC) or one bandwidth part (BWP).

In the following embodiments, an association between two parameters includes at least one of the following: a value of one parameter is obtained according to a value of the other parameter; a value range of one parameter is obtained according to a value or a value range of the other parameter; some values of the two parameters cannot appear at the same time as a combination; a parameter 2 corresponding to a parameter 1 is configured in configuration information of the parameter 1; or a correspondence between the two parameters is determined through signaling information and/or an agreed rule.

In the following embodiments, the transmission information is an information bit transmitted in a data channel before channel coding.

In the following embodiments, unless specifically stated, one information element includes at least one of one data channel (such as a physical downlink shared channel (PDSCH) or a physical uplink shared channel (PUSCH)), one CW, one TB, one CBG, one CB or a channel corresponding to one DMRS group. DMRS ports in the one DMRS group satisfy the quasi co-location relationship.

In the following embodiments, a generation parameter of a scrambling sequence of a data channel includes a radio network temporary identifier (RNTI) and/or $n_{ID}$. For example, a scrambling sequence of the data channel is a pseudo-random (PN) sequence, and an initialization parameter of the PN sequence is acquired by the following formula:

$$c_{init} = n_{RNTI} \cdot 2^{15} + q \cdot 2^{14} + n_{ID,PDSCH}.$$

In the formula, $n_{RNTI}$ denotes the RNTI, q denotes an index of a TB/CW, cinit denotes an initialization value of the PN sequence, and $n_{ID}$ denotes a physical cell ID obtained according to a synchronization signal (SS) or is notified via higher-layer signaling. $n_{ID}$ notified via the higher-layer signaling may also be referred to as a virtual cell ID configured for the data channel.

In the following embodiments, a scrambling sequence generation parameter of DCI includes one or more of the following parameters: a generation parameter of a cyclic redundancy check (CRC) scrambling sequence of the DCI or a generation parameter of a PN sequence of the DCI after channel coding. Specifically, the CRC scrambling sequence of the DCI is acquired according to an RNTI. For example, the CRC scrambling sequence is a bit sequence with a length of 24 bits and corresponding to the RNTI. A scrambling sequence of bits of the DCI after channel coding is the PN sequence and an initialization parameter of the PN sequence is $c_{init} = (n_{RNTI} 2^{16} + n_{ID,PDCCH}) \mod 2^{31}$, where $n_{RNTI}$ is fixed to be a cell radio network temporary identifier (C-RNTI) and $n_{ID}$ is a physical cell ID obtained according to a synchronization signal (SS) or notified via higher-layer signaling. $n_{ID}$ notified via the higher-layer signaling may also be referred to as a virtual cell ID configured for the data channel.

The RNTI in the scrambling sequence of the data channel or the RNTI in the CRC of the DCI includes at least one of a Rand A (RA)-RNTI, a temporary C-RNTI, the C-RNTI, an MCS-C-RNTI, a CS-RNTI, a TPC-PUCCH-RNTI, a TPC-PUSCH-RNTI, a TPC-SRS-RNTI, an INT-RNTI, an SFI-RNTI, an SP-CSI-RNTI or the like.

In the following embodiments, a generation parameter of a reference signal sequence includes $n_{ID,RS}$ notified via higher-layer signaling. $n_{ID,RS}$ may also be referred to as a virtual cell ID notified for a reference signal. Different reference signal resources may correspond to different $n_{ID,RS}$, or when $n_{ID,RS}$ is not configured, $n_{ID,RS}$ is a physical cell ID. Unless otherwise specified, $n_{ID,RS}$ and $n_{ID}$ are independent of each other and have no relations.

Figure 3:
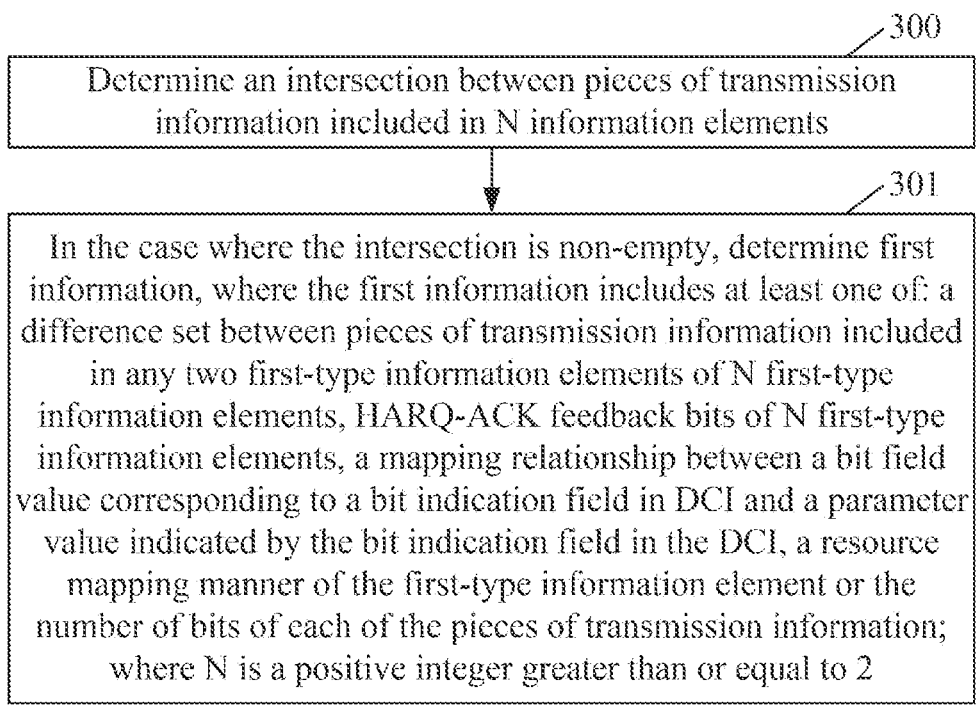
FIG. 3 is a flowchart of a method for transmitting information according to an embodiment of the present disclosure.

Referring to FIG. 3, an embodiment of the present disclosure provides a method for transmitting information. The method includes steps described below.

In step 300, an intersection between pieces of transmission information included in N first-type information elements is determined.

In an embodiment of the present disclosure, the N first-type information elements have the same transmission direction, where the transmission direction includes any one of the following: information elements are received information elements, or information elements are sent information elements.

In an embodiment of the present disclosure, the intersection of the pieces of transmission information included in the N first-type information elements may be determined according to first signaling information and/or a first predetermined rule.

The first signaling information includes at least one of: TCI information, DMRS information, DCI signaling, media access control control element (MAC-CE) signaling information or radio resource control (RRC) signaling information.

In an embodiment of the present disclosure, the N first-type information elements satisfy at least one of characteristics described below:

the N first-type information elements are scheduled by M pieces of downlink control information (DCI), where M is a positive integer less than or equal to N and/or M is a positive integer greater than or equal to N;

the N first-type information elements are N first-type information elements belonging to different time units and scheduled by the same piece of downlink control information (DCI);

an intersection of resources occupied by the N first-type information elements is non-empty;

a difference set between frequency domain resources occupied by the N first-type information elements is empty;

a span of resources occupied by the N first-type information elements is less than a predetermined value;

the N first-type information elements occupy the same number of resources;

the N first-type information elements correspond to N independent sixth-type parameters; HARQ-ACK feedback bits of the N first-type information elements satisfy a second characteristic;

the N first-type information elements belong to the same third-type information element, where a third-type information element includes N first-type information elements;

the N first-type information elements correspond to the same process number;

time domain resources occupied by the N first-type information elements are located between two consecutive HARQ-ACK feedback resources in one process number, where no other HARQ-ACK feedback resource, including that for an HARQ-ACK of an information element in the process number, exists between the two consecutive HARQ-ACK feedback resources;

at least two of the N first-type information elements are located in different frequency domain bandwidths;

frequency domain resources occupied by the N first-type information elements are located in one frequency domain bandwidth group;

among the N first-type information elements, two first-type information elements at least exist which correspond to two bit sequences of the same piece of transmission information after channel coding, where the two bit sequences after channel coding correspond to two quantities of bits, or the two bit sequences after channel coding correspond to two quantities of bits and two RVs;

the number of soft buffers corresponding to the N first-type information elements is less than N;

data in soft buffers corresponding to the N first-type information elements is capable of being combined;

more than one frequency domain bandwidth corresponding to the N first-type information elements share one HARQ entity.

The sixth-type parameter includes at least one of: a DMRS group, a TCI (for configuring a quasi co-location reference signal set), a modulation order, a channel coding rate, a modulation and coding scheme (MCS), an RV, a new data indicator (NDI), an index of a frequency domain bandwidth, a frequency domain resource, a time domain resource or information about rate matching.

Each of the resources includes at least one of: the time domain resource or the frequency domain resource.

The number of resources includes at least one of: the number of time domain symbols, the number of physical resource blocks (PRBs) or the number of subcarriers (i.e., the number of resource elements (REs)).

The span of resources includes a difference between a lowest resource and a highest resource occupied by the N first-type information elements.

In an embodiment of the present disclosure, the second characteristic includes at least one of characteristics described below:
- the N first-type information elements correspond to one group of HARQ-ACK feedback bits;
- the N first-type information elements correspond to more than one group of HARQ-ACK feedback bits, where the more than one group of HARQ-ACK feedback bits have the same values;
- feedback resources where the HARQ-ACK feedback bits of the N first-type information elements are located fall within the same time unit;
- the HARQ-ACK feedback bits of the N first-type information elements are located in the same feedback resource, where the feedback resource includes at least one of a physical uplink control channel (PUCCH) resource or a PUSCH resource.

HARQ-ACK feedback resources of the N first-type information elements are after transmissions resources where the N first-type information elements are located.

In an embodiment of the present disclosure, the method includes at least one of characteristics described below:
- in the case where the N first-type information elements satisfy a third characteristic, the intersection between the pieces of transmission information included in the N first-type information elements is non-empty;
- in the case where the intersection between the pieces of transmission information included in the N first-type information elements is non-empty, the N first-type information elements satisfy a third characteristic.

The third characteristic includes at least one of characteristics described below:
- the N first-type information elements are scheduled by M pieces of DCI, where M is a positive integer greater than or equal to 1 and/or M is less than or equal to N;
- a span of resources occupied by the N first-type information elements is less than a predetermined value;
- HARQ-ACK feedback bits of the N first-type information elements satisfy the second characteristic;
- the N first-type information elements correspond to N independent seventh-type parameters, that is, seventh-type parameters of the N first-type information elements are independent of each other and there is no association between the seventh-type parameters of the N first-type information elements;
- the N first-type information elements correspond to the same eighth-type parameter; a combination of N ninth-type parameters of the N first-type information elements satisfies a fourth characteristic, for example, the combination belongs to a first predetermined set or the combination does not belong to a second predetermined set, where the combination is elements in the first predetermined set and/or the second predetermined set;
- N tenth-type parameters of the N first-type information elements satisfy a predetermined priority characteristic, for example, in the case where the N tenth-type parameters of the N first-type information elements are different, the tenth-type parameters of the N first-type information elements are determined according to tenth-type parameter(s) of one or more information elements with higher priority (priorities) or predetermined priority (priorities);
- the N first-type information elements correspond to the same process number; the time domain resources occupied by the N first-type information elements are located between two consecutive HARQ-ACK feedback resources of a predetermined type, where the HARQ-ACK feedback resources of the predetermined type include pieces of HARQ-ACK information for first-type information elements in the same process number; the frequency domain resources occupied by the N first-type information elements are located in one frequency domain bandwidth group;
- the N first-type information elements share one channel coding rate;
- the N first-type information elements correspond to N modulation orders;
- among the N first-type information elements, two first-type information elements at least exist which correspond to two bit sequences of the same piece of transmission information after channel coding, where the two bit sequences after channel coding correspond to two quantities of bits, or the two bit sequences after channel coding correspond to two quantities of bits and two RVs;
- the number of soft buffers corresponding to the N first-type information elements is less than N;
- the data in the soft buffers corresponding to the N first-type information elements is capable of being combined;
- more than one frequency domain bandwidth corresponding to the N first-type information elements share one HARQ entity.

One or more of the seventh-type parameter, the eighth-type parameter, the ninth-type parameter or the tenth-type parameter include at least one of the following parameters: CBGTI, the modulation order, the channel coding rate, the RV, the NDI, the quantity of information bits, DCI, the TCI, the frequency domain resource, the time domain resource, a reference signal resource, a rate matching resource, an index of the third-type information element to which the N first-type information elements belong, or a process number set.

The method includes at least one of characteristics described below:
- an i-th type information element includes at least one of a data channel, a codeword (CW), a transport block (TB), a code block group (CBG), a code block (CB) or an information element corresponding to a demodulation reference signal (DMRS) group, where i belongs to {one, two, three, four};
- the N first-type information elements have the same transmission direction, where the transmission direction includes any one of the following: the information elements are received information elements, or the information elements are sent information elements.

In an embodiment of the present disclosure, in the case where the N first-type information elements are CBGs, the N CBGs belong to one TB or CW.

Here, the one TB or CW satisfies at least one of characteristics described below: each CBG in the one TB or CW corresponds to one piece of modulation order indication information and/or one piece of channel coding rate indication information; in the one TB or CW, two CBGs at least exist which are repeatedly sent different times; in the one TB or CW, two CBGs at least exist which have different channel coding rates.

In an embodiment of the present disclosure, in the case where the N first-type information elements are information elements corresponding to one DMRS group, the method satisfies at least one of characteristics described below:
one CW corresponds to more than one DMRS group;
one TB corresponds to N CWs;
N CWs correspond to N bit sequences of the same TB after channel coding;
an intersection between N information elements corresponding to N DMRS groups corresponding to one CW is non-empty;
one CW is firstly mapped to a layer, then to frequency domain, and lastly to time domain in each of N DMRS groups corresponding to the one CW, separately;
a size of transmission information included in one CW is determined according to the number of layers of a DMRS included in one of multiple DMRS groups included in the one CW;
DMRSs in one DMRS group satisfy a quasi co-location relationship;
DMRSs in different DMRS groups do not satisfy a quasi co-location relationship;
each DMRS group corresponds to one quasi co-location reference signal set.

In step 301, in the case where the intersection is non-empty, first information is determined, where the first information includes at least one of: a difference set between pieces of transmission information included in any two first-type information elements of the N first-type information elements, the HARQ-ACK feedback bits of the N first-type information elements, a mapping relationship between a bit field value corresponding to a bit indication field in DCI and a parameter value indicated by the bit indication field in the DCI, a resource mapping manner of the first-type information elements, or the number of information bits of the transmission information. N is a positive integer greater than or equal to 2.

In an embodiment of the present disclosure, a difference set between pieces of transmission information included in a first information element and a second information element among the N first-type information elements may be determined according to second signaling information and/or a second predetermined rule.

The second signaling information includes at least one of: the TCI information or the DMRS information.

The first signaling information and the second signaling information may be the same or different, and the first predetermined rule and the second predetermined rule may be the same or different.

In an embodiment of the present disclosure, a difference set between pieces of transmission information included in two first-type information elements is a union of difference sets between all information elements of the N first-type information elements and the intersection.

In an embodiment of the present disclosure, the step of determining the difference set and/or the intersection includes:
determining the difference set and/or the intersection according to at least one of the following parameters: a first index of a second-type information element included in one first-type information element of any two first-type information elements; a second index of a second-type information element included in the other first-type information element of the any two first-type information elements; a number C of second-type information elements included in the one first-type information element; a number D of second-type information elements included in the other first-type information element; a third index of a piece of transmission information included in the first-type information element; a generation parameter of a first scrambling sequence of downlink control information (DCI) for scheduling the N first-type information elements; generation parameters of second scrambling sequences of the N first-type information elements; a transmission configuration indicator (TCI); a modulation and coding scheme (MCS); a new data indicator (NDI); code block group transmission information (CBGTI); code block group flushing out information (CBGFI); or link performance corresponding to the N first-type information elements.

The link performance corresponding to the first-type information element is obtained according to one or both of the modulation order and the channel coding rate. Alternatively, the link performance is determined according to a channel quality fed back by a communication node, such as a Channel Quality Indicator (CQI), a signal-to-interference-plus-noise ratio (SINR) or reference signal received power (RSRP). Alternatively, the link performance is determined according to an HARQ-ACK fed back. For example, the feedback of an ACK indicates good link performance and the feedback of an NACK indicates bad link performance. A certain penalty factor may be assigned to the NACK and the ACK and accumulated so that the link performance is obtained.

The first-type information element includes one or more second-type information elements, and C and D are non-negative integers.

Figure 7:
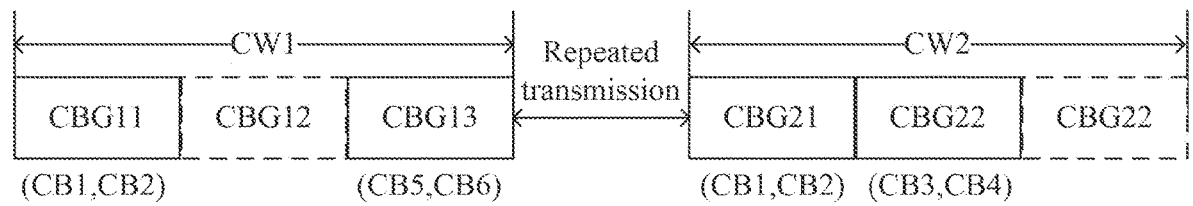
FIG. 7 is a schematic diagram illustrating that CBGs with the same index in two CWs for a repeated transmission include the same transmission information according to an embodiment of the present disclosure.

The step of determining the difference set and/or the intersection according to the parameter includes at least one of the following:
in the case where a correspondence exists between the first index and the second index, an intersection between transmission information included in the second-type information element corresponding to the first index and transmission information included in the second-type information element corresponding to the second index is non-empty; an index of the second-type information element is an index of the second-type information element in a set of second-type information elements; the set of second-type information elements is composed of second-type information elements included in the first-type information element, for example, indexes of (CBG11, CBG13) (that is, the second-type information elements) in CW1 (that is, the first-type information element) in FIG. 7 are {0, 1}; alternatively, each second-type information element in the set of second-type information elements corresponds to one bit in the CBGTI, for example, the indexes of (CBG11, CBG13) (that is, the second-type information elements) in CW1 (that is, the first-type information element) in FIG. 7 are {0, 2};
pieces of transmission information with the same third index belong to the intersection; a piece of transmission information with a different third index belongs to the difference set;
in the case where no second index has a correspondence to the first index, transmission information included in the second-type information element corresponding to the first index belongs to the difference set;
in the case where a generation parameter of an i-th scrambling sequence includes a modulation and coding scheme-cell radio network temporary identifier (MCS-C-RNTI), the intersection between the pieces of transmission information included in the N first-type information elements is non-empty, where i belongs to {one, two};

the intersection includes C second-type information elements in the other first-type information element;

the difference set includes (D−C) second-type information elements in the other first-type information element, where D is a positive integer greater than or equal to C; in the case where quasi co-location reference signals configured in the TCI of the N first-type information elements with respect to one type of quasi co-location parameter are the same or satisfy the quasi co-location relationship, the intersection between the pieces of transmission information included in the N first-type information elements is empty; where, the TCI may also be referred to as configuration information of a quasi co-location reference signal, and that two pieces of transmission configuration information are different includes one of the following: quasi co-location reference signals configured in the two pieces of transmission configuration information with respect to one type of quasi co-location parameter do not satisfy the quasi co-location relationship, or quasi co-location reference signals configured in the two pieces of transmission configuration information with respect to one type of quasi co-location parameter are different;

in the case where quasi co-location reference signals configured in the TCI of the N first-type information elements with respect to one type of quasi co-location parameter are different or do not satisfy the quasi co-location relationship, whether the intersection between the pieces of transmission information included in the N first-type information elements is empty is determined according to signaling information and/or a predetermined rule;

in the case where an NDI corresponding to F first-type information elements of the N first-type information elements indicates a first transmission (which may also be referred to as a new data transmission), a bit field corresponding to E first-type information elements or part of bits in the corresponding bit field is used for indicating information about the intersection and/or information about the difference set of the N first-type information elements, where the bit field includes at least one of the following bit fields: the NDI, the MCS, the RV, the CBGTI or the CBGFI, and E and F satisfy one of the following characteristics: E and F are non-negative integers less than or equal to N, E is equal to F, E is equal to N minus F, E is equal to N minus 1, or F is equal to 1; these bit fields are generally used for indicating the above parameters, for example, when it is not the first transmission or when the intersection is predetermined to be empty, the bit fields are used for indicating the NDI, the MCS, the RV, the CBGTI and the CBGFI;

in the case where the generation parameters of the second scrambling sequences of the N first-type information elements are different, the intersection is non-empty;

in the case where the generation parameters of the second scrambling sequences of the N first-type information elements are the same, the intersection is empty;

in the case where a difference between the link performances corresponding to the N first-type information elements is greater than a predetermined value, the difference set is non-empty;

in the case where among the N first-type information elements, one first-type information element at least exists whose NDI indicates a first transmission, second-type information elements included in the one first-type information element correspond to non-zero elements in CBGTI corresponding to the one first-type information element in sequence, or CBGTI corresponding to the one first-type information element has non-consecutive non-zero elements;

in the case where among the N first-type information elements, one first-type information element at least exists whose NDI indicates a first transmission, the one first-type information element includes non-consecutive code blocks (CBs) or non-consecutive code block groups (CBGs) in one transport block (TB).

Here, D is greater than or equal to C.

The method satisfies at least one of characteristics described below:

the correspondence between the first index and the second index includes that the first index is equal to the second index;

in the case where the correspondence between the first index and the second index exists, an intersection between the second-type information element corresponding to the first index and the second-type information element corresponding to the second index is non-empty, and a difference set between the second-type information element corresponding to the first index and the second-type information element corresponding to the second index is empty.

In an embodiment of the present disclosure, the step of determining the quantity of bits of the each of the pieces of transmission information includes at least one of steps described below:

a parameter for acquiring the quantity of bits of a piece of transmission information included in the intersection includes any one of: fourteenth-type parameters corresponding to Q first-type information elements of the N first-type information elements, or a minimum value of quantities of bits of the pieces of transmission information included in the N first-type information elements, where the quantities of bits are obtained according to fourteenth-type parameters corresponding to the N first-type information elements; a parameter for acquiring the quantity of bits of a piece of transmission information included in the difference set between the pieces of transmission information included in any two first-type information elements of the N first-type information elements includes a difference between quantities of bits of the pieces of transmission information included in the any two first-type information elements, where the quantities of bits are obtained according to fourteenth-type parameters corresponding to the any two first-type information elements.

In an embodiment of the present disclosure, the method satisfies at least one of characteristics described below:

the Q first-type information elements include one of: Q first-type information elements with lowest indexes among the N first-type information elements; Q first-type information elements whose fourteenth-type parameters have smallest values among the N first-type information elements; or Q first-type information elements occupying foremost time domain resources among the N first-type information elements;

Q is equal to 1;

the fourteenth-type parameter includes at least one of: the modulation order, the number of layers of a DMRS, the channel coding rate, the number of subcarriers occupied by the rate matching resource, the number of subcarriers allocated before rate matching, the number of subcarriers occupied after rate matching or channel coding information;

in the case where the N first-type information elements include information elements corresponding to N DMRS port groups in one CW, the intersection is acquired according to fourteenth-type parameters corresponding to Q DMRS port groups of the N DMRS port groups;

in the case where the N first-type information elements include information elements corresponding to N quasi co-location reference signal sets in one CW, the intersection is acquired according to fourteenth-type parameters corresponding to Q quasi co-location reference signal sets of the N quasi co-location reference signal sets.

In an embodiment of the present disclosure, the step of determining the difference set between the pieces of transmission information included in the any two first-type information elements of the N first-type information elements includes at least one of steps described below:

in the case where fourth-type parameters corresponding to two first-type information elements are the same, a difference set between pieces of transmission information included in the two first-type information elements is empty;

in the case where fourth-type parameters corresponding to two first-type information elements are different, a difference set between pieces of transmission information included in the two first-type information elements is non-empty;

in the case where fourth-type parameters corresponding to two first-type information elements are different, whether a difference set between pieces of transmission information included in the two first-type information elements is non-empty is determined according to fifth-type parameters corresponding to the two first-type information elements.

The fourth-type parameter and/or the fifth-type parameter include at least one of: the TCI, the channel coding rate, the modulation order, the number of layers of the DMRS, the number of PRBs, the number of time domain symbols, the number of subcarriers occupied by the rate matching resource, the number of bits of transmission information obtained according to a fourth predetermined rule, or a product of the channel coding rate, the number of layers of the DMRS and the number of subcarriers obtained according to a third predetermined rule. A difference set between the fourth-type parameter and the fifth-type parameter is non-empty.

The number of PRBs and the number of time domain symbols may be the number of PRBs and the number of time domain symbols, which are allocated before rate matching, the number of PRBs and the number of time domain symbols, which are occupied by an information element after rate matching, or the number of PRBs and the number of time domain symbols, which are occupied by a channel where an information element is located after rate matching.

Information about the rate matching resource includes information about a rate matching resource used for calculating the number of bits of the transmission information, such as xOverhead in NR, and/or information in a rate matching resource that cannot be occupied at the time of a transmission of the information element, such as zero power channel state information reference signal (ZP-CSI-RS), a combination of PRB and time domain symbol, or information about DMRS code-division multiplexing (CDM) group that cannot be occupied by data, such as DMRS CDM groups without data.

The third predetermined rule may be, for example, further obtaining the product of the channel coding rate, the number of layers of the DMRS and the number of subcarriers corresponding to an information element according to the channel coding rate, the number of layers of the DMRS and the number of subcarriers corresponding to the information element. The number of information bits is obtained according to the product, a predetermined rule and a mapping table.

The TCI may also be referred to as the configuration information of the quasi co-location reference signal. That two pieces of transmission configuration information are different includes one of the following: quasi co-location reference signals configured in the two pieces of transmission configuration information with respect to one type of quasi co-location parameter do not satisfy the quasi co-location relationship, or quasi co-location reference signals configured in the two pieces of transmission configuration information with respect to one type of quasi co-location parameter are different.

In an embodiment of the present disclosure, the step of determining the HARQ-ACK feedback bits of the N first-type information elements include:

the HARQ-ACK feedback bits of the N first-type information elements are determined according to at least one of: whether the intersection is empty or whether the difference set is empty.

In an embodiment of the present disclosure, the step of determining the HARQ-ACK feedback bits of the N first-type information elements includes at least one of the following:

in the case where the intersection is non-empty and the difference set is non-empty, the HARQ-ACK feedback bits of the N first-type information elements satisfy a first characteristic; or in the case where the intersection is non-empty and the difference set is empty, the HARQ-ACK feedback bits of the N first-type information elements satisfy the second characteristic.

The first characteristic includes one of characteristics described below:

the N first-type information elements correspond to N groups of HARQ-ACK feedback bits, and each of the N groups of HARQ-ACK feedback bits is used for indicating whether transmission information included in one of the N first-type information elements corresponding to the each of the N groups of HARQ-ACK feedback bits is successfully decoded;

the N first-type information elements correspond to N groups of HARQ-ACK feedback bits, one of the N groups of HARQ-ACK feedback bits corresponding to one of the N first-type information elements is used for indicating whether transmission information included in the one of the N first-type information elements is successfully decoded, and one group of HARQ-ACK feedback bits corresponding to each of the other first-type information elements is used for indicating whether a difference set between the each of the other first-type information elements and the intersection is successfully decoded; the N first-type information elements correspond to N1 groups of HARQ-ACK feedback bits, where N1 is a positive integer less than or equal to (N+1), the intersection between the pieces of transmission information included in the N first-type information elements corresponds to one of the N1 groups of HARQ-ACK feedback bits, and one of the N first-type information elements which has a non-empty difference set with the intersection corresponds to one of the N1 groups of HARQ-ACK feedback bits;

the N first-type information elements correspond to (N+1) groups of HARQ-ACK feedback bits, one of the (N+1) groups of HARQ-ACK feedback bits corresponds to the intersection between the pieces of transmission information included in the N first-type information elements and is used for indicating whether transmission information included in the intersection is successfully decoded, and each of remaining N groups of HARQ-ACK feedback bits corresponds to a respective one of the N first-type information elements and is used for indicating whether a difference set between the respective one of the N first-type information elements and the intersection is successfully decoded.

In an embodiment of the present disclosure, the step of determining the mapping relationship between the bit field value corresponding to the bit indication field in the DCI and the parameter value indicated by the bit indication field in the DCI includes at least one of the following:

the bit indication field includes bit indication fields corresponding to P first-type information elements of the N first-type information elements, where P is a positive integer less than or equal to N;

the bit indication field is a bit indication field in one or more pieces of DCI among M pieces of DCI for scheduling the N first-type information elements;

in the case where the intersection is non-empty, the bit indication field is used for indicating a first-type parameter type;

in the case where the intersection is empty, the bit indication field is used for indicating a second-type parameter type;

in the case where the intersection is non-empty, the bit indication field corresponds to a mapping relationship one;

in the case where the intersection is empty, the bit indication field corresponds to a mapping relationship two;

the number of bits included in the bit indication field in the case where the intersection is non-empty is not equal to the number of bits included in the bit indication field in the case where the intersection is empty;

the number of bits included in the DCI in the case where the intersection is non-empty is not equal to the number of bits included in the DCI in the case where the intersection is empty; or in the case where the intersection is non-empty, the bit indication field is divided into R groups of bits, where each of the R groups of bits is used for indicating one parameter type, and R is an integer greater than or equal to 1.

The method includes at least one of characteristics described below:

the second-type parameter type includes at least one of the following parameter types: the NDI, the MCS, the RV, the CBGTI or the CBGFI;

the first-type parameter type includes at least one of the following parameter types: the frequency domain resource, the time domain resource, the DMRS, the rate matching or the first information;

a difference set between a parameter type set indicated in the mapping relationship one and a parameter type set indicated in the mapping relationship two is non-empty;

an intersection between a parameter type set indicated in the mapping relationship one and a parameter type set indicated in the mapping relationship two is empty; or a parameter type set indicated in the mapping relationship one is a subset of a parameter type set indicated in the mapping relationship two, or a parameter type set indicated in the mapping relationship two is a subset of a parameter type set indicated in the mapping relationship one.

In an embodiment of the present disclosure, the step of determining the intersection between the pieces of transmission information included in the N first-type information elements and/or the difference set includes at least one of the following:

the intersection and/or the difference set are determined according to a relationship between the number of CBGs actually included in one TB and the number of CBGs included in one TB which is indicated in CBGTI, where the N first-type information elements are CBGs, the number of CBGs actually included in one TB is acquired according to at least one of the following parameters: a transport block size (TBS), the modulation order, the number of layers of the DMRS, the channel coding rate, the number of subcarriers occupied by the rate matching resource, the number of subcarriers allocated before rate matching or the number of subcarriers occupied after rate matching, and the number of CBGs included in one TB which is indicated in the CBGTI is determined according to the number of non-zero bits in the CBGTI, for example, the number of CBGs included in one TB which is indicated in the CBGTI is equal to the number of non-zero bits in the CBGTI;

in the case where the N first-type information elements are located in different frequency domain bandwidths, an intersection between the N first-type information elements and/or the difference set are determined according to a third-type parameter, where the third-type parameter includes at least one of the index of the frequency domain bandwidth, a downlink assignment index (DAI), a process number, the modulation order, the channel coding rate or the RV, here, the DAI is used for indicating a total number of data channels allocated in one frequency domain bandwidth or one frequency domain bandwidth group and a data channel index of a current data channel allocated in current DCI;

in the case where the time domain resources occupied by the N first-type information elements are located between the two consecutive HARQ-ACK feedback resources of the predetermined type, the intersection between the pieces of transmission information included in the N first-type information elements is non-empty, where the HARQ-ACK feedback resources of the predetermined-type include the pieces of HARQ-ACK information for the first-type information elements in the same process number; or in the case where frequency domain bandwidths occupied by the N first-type information elements are located in one frequency domain bandwidth group, an intersection between the N first-type information elements is non-empty.

In the case where the N first-type information elements are located in different frequency domain bandwidths, the step of determining the intersection between the N first-type information elements according to the third-type parameter includes at least one of the following:

in the case where a correspondence exists between values of N third-type parameters of the N first-type information elements, the intersection between the N first-type information elements is non-empty;

in the case where no correspondence exists between values of N third-type parameters of the N first-type information elements, the intersection between the N first-type information elements is empty;

in the case where a correspondence exists between a first-type information element of the N first-type information elements in a first frequency domain bandwidth and a value of a third-type parameter in a second frequency domain bandwidth, an intersection between the first-type information element in the first frequency domain bandwidth and a first-type information element corresponding to the value of the third-type parameter in the second frequency domain bandwidth is non-empty, where the correspondence is acquired according to higher-layer signaling information and/or physical layer signaling information.

In an embodiment of the present disclosure, the step of determining the resource mapping manner of the first-type information element includes at least one of the following:

a resource mapping manner in the case where the intersection is non-empty is different from a resource mapping manner in the case where the intersection is empty;

in the case where the intersection is non-empty, the resource mapping manner of the first-type information element is a mapping to a time-frequency resource and then a mapping to a layer, or the resource mapping manner of the first-type information element is a mapping to a layer and then a mapping to a time-frequency resource in one DMRS group, and then a mapping to a layer and then a mapping to a time-frequency resource in another DMRS group, or the resource mapping manner of the first-type information element is that the same first-type information element is mapped in each DMRS group separately, where one of the N first-type information elements corresponds to more than one DMRS group; or in the case where the intersection is empty, the resource mapping manner of the first-type information element is a mapping to a layer and then a mapping to a time-frequency resource, where one first-type information element corresponds to one DMRS group, and/or the mapping to the layer includes all layers corresponding to all DMRSs corresponding to the first-type information element.

In the embodiments of the present disclosure, in the case where the intersection is non-empty, link robustness is improved and the link performance is fully utilized based on the first information so that spectral efficiency is improved. Meanwhile, signaling information is fully utilized in the embodiments of the present disclosure so that signaling loads are reduced to a certain extent.

Figure 4:
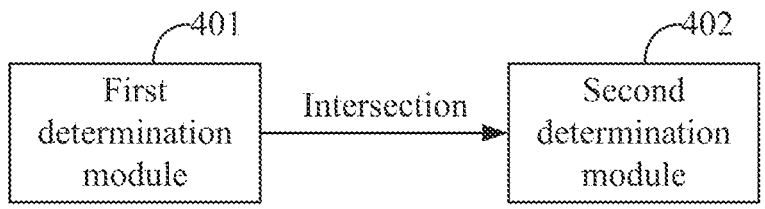
FIG. 4 is a structure diagram of an apparatus for transmitting information according to another embodiment of the present disclosure.

Referring to FIG. 4, another embodiment of the present disclosure provides an apparatus for transmitting information. The apparatus includes a first determination module 401 and a second determination module 402.

The first determination module 401 is configured to determine an intersection between pieces of transmission information included in N first-type information elements.

The second determination module 402 is configured to: in a case where the intersection is non-empty, determine first information.

The first information includes at least one of: a difference set between pieces of transmission information included in any two first-type information elements, a first information element and a second information element, of the N first-type information elements, Hybrid Automatic Repeat reQuest acknowledgement (HARQ-ACK) feedback bits of the N first-type information elements, a mapping relationship between a bit field value corresponding to a bit indication field in DCI and a parameter value indicated by the bit indication field in the DCI, the number of bits of each of the pieces of transmission information or a resource mapping manner of a first-type information element of the N first-type information elements.

N is a positive integer greater than or equal to 2.

The second determination module 402 is specifically configured to determine the difference set between the pieces of transmission information included in the any two first-type information elements of the N first-type information elements in at least one of manners described below.

In the case where fourth-type parameters corresponding to two first-type information elements are the same, a difference set between pieces of transmission information included in the two first-type information elements is empty.

In the case where fourth-type parameters corresponding to two first-type information elements are different, a difference set between pieces of transmission information included in the two first-type information elements is non-empty.

In the case where fourth-type parameters corresponding to two first-type information elements are different, whether a difference set between pieces of transmission information included in the two first-type information elements is non-empty is determined according to fifth-type parameters corresponding to the two first-type information elements.

The fourth-type parameter and/or the fifth-type parameter include at least one of: a TCI, a channel coding rate, a modulation order, the number of layers of a DMRS, the number of PRBs, the number of time domain symbols, the number of subcarriers occupied by a rate matching resource, the number of bits of transmission information obtained according to a fourth predetermined rule or a product of a channel coding rate, the number of layers of a DMRS and the number of subcarriers obtained according to a third predetermined rule. A difference between the fourth-type parameter and the fifth-type parameter is non-empty.

The number of PRBs and the number of time domain symbols may be the number of PRBs and the number of time domain symbols, which are allocated before rate matching, the number of PRBs and the number of time domain symbols, which are occupied by an information element after rate matching, or the number of PRBs and the number of time domain symbols, which are occupied by a channel where an information element is located after rate matching.

Information about the rate matching resource includes information about a rate matching resource for calculating the number of bits of the transmission information, such as xOverhead in NR and/or information in a rate matching resource that cannot be occupied at the time of a transmission of the information element, such as ZP-CSI-RS, a combination of PRB and time domain symbol, or DMRS CDM group information that cannot be occupied by data such as DMRS CDM groups without data.

The third predetermined rule may be, for example, further obtaining the product of the channel coding rate, the number of layers of the DMRS and the number of subcarriers corresponding to an information element according to the channel coding rate, the number of layers of the DMRS and the number of subcarriers corresponding to the information element. The number of information bits is obtained according to the product, a predetermined rule and a mapping table.

The TCI may also be referred to as configuration information of a quasi co-location reference signal. That two pieces of transmission configuration information are different includes one of the following: quasi co-location reference signals configured in the two pieces of transmission configuration information with respect to one type of quasi co-location parameter do not satisfy a quasi co-location relationship, or quasi co-location reference signals configured in the two pieces of transmission configuration information with respect to one type of quasi co-location parameter are different.

The first determination module 401 is specifically configured to determine the intersection in a manner described below, and/or the second determination module 402 is specifically configured to determine the difference set in a manner described below.

The difference set and/or the intersection are determined according to at least one of the following parameters: a first index of a second-type information element included in one first-type information element of the any two first-type information elements; a second index of a second-type information element included in another one first-type information element of the any two first-type information elements; the number C of second-type information elements included in one first-type information element of the any two first-type information elements; the number D of second-type information elements included in another one first-type information element of the any two first-type information elements; a third index of a piece of transmission information included in the first-type information element; a generation parameter of a first scrambling sequence of downlink control information (DCI) for scheduling the N first-type information elements; generation parameters of second scrambling sequences of the N first-type information elements; a transmission configuration indicator (TCI); a modulation and coding scheme (MCS); a new data indicator (NDI); code block group transmission information (CBGTI); code block group flushing out information (CBGFI); or link performance corresponding to the N first-type information elements. The link performance corresponding to the first-type information element is obtained according to one or both of the modulation order or the channel coding rate. Alternatively, the link performance is determined according to a channel quality fed back by a communication node, such as a Channel Quality Indicator (CQI), a signal-to-interference-plus-noise ratio (SINR) or reference signal received power (RSRP). Alternatively, the link performance is determined according to a HARQ-ACK fed back. For example, the feedback of an ACK indicates good link performance and the feedback of an NACK indicates bad link performance. A certain penalty factor may be assigned to the NACK and the ACK and accumulated so that the link performance is obtained.

The first-type information element includes one or more second-type information elements, and C and D are non-negative integers.

The first determination module 401 is specifically configured to determine the intersection according to the parameter in a manner described below, and/or the second determination module 402 is specifically configured to determine the difference set according to the parameter in a manner described below.

In the case where a correspondence exists between the first index and the second index, an intersection between transmission information included in the second-type information element corresponding to the first index and transmission information included in the second-type information element corresponding to the second index is non-empty.

An index of the second-type information element is an index of the second-type information element in a set of second-type information elements. The set of second-type information elements is composed of second-type information elements included in the first-type information element. For example, indexes of (CBG11, CBG13) (that is, the second-type information elements) in CW1 (that is, the first-type information element) in FIG. 7 are {0, 1}. Alternatively, each second-type information element in the set of second-type information elements corresponds to one bit in the CBGTI. For example, the indexes of (CBG11, CBG13) (that is, the second-type information elements) in CW1 (that is, the first-type information element) in FIG. 7 are {0, 2}.

Pieces of transmission information with the same third index belong to the intersection.

A piece of transmission information with a different third index belongs to the difference.

In the case where no second index has a correspondence to the first index, transmission information included in the second-type information element corresponding to the first index belongs to the difference set.

In the case where a generation parameter of an i-th scrambling sequence includes a modulation and coding scheme-cell radio network temporary identifier (MCS-C-RNTI), the intersection between the pieces of transmission information included in the N first-type information elements is non-empty, where i belongs to {one, two}.

The intersection includes C second-type information elements in the other one first-type information element.

The difference includes (D–C) second-type information elements in the other one first-type information element, where D is a positive integer greater than or equal to C.

In the case where the NDI indicates a new data transmission, the CBGTI and/or the CBGFI and/or the MCS is used for indicating at least one of the intersection between the pieces of transmission information included in the N first-type information elements or the difference set between the pieces of transmission information included in the any two first-type information elements of the N first-type information elements.

In the case where quasi co-location reference signals configured in the TCI of the N first-type information elements with respect to one type of quasi co-location parameter are the same or satisfy the quasi co-location relationship, the intersection between the pieces of transmission information included in the N first-type information elements is empty. The TCI may also be referred to as the configuration information of the quasi co-location reference signal. That two pieces of transmission configuration information are different includes one of the following: quasi co-location reference signals configured in the two pieces of transmission configuration information with respect to one type of quasi co-location parameter do not satisfy the quasi co-location relationship, or quasi co-location reference signals configured in the two pieces of transmission configuration information with respect to one type of quasi co-location parameter are different.

In the case where quasi co-location reference signals configured in the TCI of the N first-type information elements with respect to one type of quasi co-location parameter are different or do not satisfy the quasi co-location relationship, whether the intersection between the pieces of transmission information included in the N first-type information elements is empty is determined according to signaling information and/or a predetermined rule.

In the case where an NDI corresponding to F first-type information elements of the N first-type information elements indicates a first transmission (which may also be referred to as a new data transmission), a bit field corresponding to E first-type information elements or part of bits in the corresponding bit field is used for indicating information about the intersection and/or information about the difference of the N first-type information elements, where the bit field includes at least one of the following bit fields: the NDI, the MCS, an RV, the CBGTI or the CBGFI, and E and F satisfy one of the following characteristics: E and F are non-negative integers less than or equal to N, E is equal to F, E is equal to N minus F; E is equal to N minus 1, or F is equal to 1.

In the case where the generation parameters of the second scrambling sequences of the N first-type information elements are different, the intersection is non-empty.

In the case where the generation parameters of the second scrambling sequences of the N first-type information elements are the same, the intersection is empty.

In the case where a difference between the link performance corresponding to the N first-type information elements is greater than a predetermined value, the difference set is non-empty.

In the case where among the N first-type information elements, one first-type information element at least exists whose NDI indicates a first transmission, second-type information elements included in the one first-type information element correspond to non-zero elements in CBGTI corresponding to the one first-type information element in sequence, or CBGTI corresponding to the one first-type information element has non-consecutive non-zero elements.

In the case where among the N first-type information elements, one first-type information element at least exists whose NDI indicates a first transmission, the one first-type information element includes non-consecutive CBs or non-consecutive CBGs in a TB.

D is greater than or equal to C.

The apparatus satisfies at least one of characteristics described below.

The correspondence between the first index and the second index includes that the first index is equal to the second index.

In the case where the correspondence exists between the first index and the second index, an intersection between the second-type information element corresponding to the first index and the second-type information element corresponding to the second index is non-empty, and a difference set between the second-type information element corresponding to the first index and the second-type information element corresponding to the second index is empty.

The second determination module 402 is specifically configured to determine the number of bits of the each of the pieces of transmission information in at least one of manners described below.

A parameter for acquiring the number of bits of a piece of transmission information included in the intersection includes any one of fourteenth-type parameters corresponding to Q first-type information elements of the N first-type information elements or a minimum value of numbers of bits of the pieces of transmission information included in the N first-type information elements, where the numbers of bits are obtained according to fourteenth-type parameters corresponding to the N first-type information elements.

A parameter for acquiring the number of bits of a piece of transmission information included in the difference between the pieces of transmission information included in the any two first-type information elements of the N first-type information elements includes a difference between numbers of bits of the pieces of transmission information included in the any two first-type information elements, where the numbers of bits are obtained according to fourteenth-type parameters corresponding to the any two first-type information elements.

The apparatus satisfies at least one of characteristics described below.

The Q first-type information elements include one of: Q first-type information elements with lowest indexes among the N first-type information elements; Q first-type information elements whose fourteenth-type parameters have smallest values among the N first-type information elements; or Q first-type information elements occupying foremost time domain resources among the N first-type information elements.

Q is equal to 1.

Each of the fourteenth-type parameters includes at least one of the modulation order, the number of layers of the DMRS, the channel coding rate, the number of subcarriers occupied by the rate matching resource, the number of subcarriers allocated before rate matching, the number of subcarriers occupied after rate matching or channel coding information.

In the case where the N first-type information elements include information elements corresponding to N DMRS port groups in a CW, the intersection is acquired according to fourteenth-type parameters corresponding to Q DMRS port groups of the N DMRS port groups.

In the case where the N first-type information elements include information elements corresponding to N quasi co-location reference signal sets in a CW, the intersection is acquired according to fourteenth-type parameters corresponding to Q quasi co-location reference signal sets of the N quasi co-location reference signal sets.

The second determination module 402 is specifically configured to determine the HARQ-ACK feedback bits of the N first-type information elements in a manner described below.

The HARQ-ACK feedback bits of the N first-type information elements are determined according to at least one of: whether the intersection is empty or whether the difference is empty.

The second determination module 402 is specifically configured to determine the HARQ-ACK feedback bits of the N first-type information elements in at least one of manners described below.

In the case where the intersection is non-empty and the difference set is non-empty, the HARQ-ACK feedback bits of the N first-type information elements satisfy a first characteristic.

In the case where the intersection is non-empty and the difference is empty, the HARQ-ACK feedback bits of the N first-type information elements satisfy a second characteristic.

The first characteristic includes one of characteristics described below.

The N first-type information elements correspond to N groups of HARQ-ACK feedback bits, and each of the N groups of HARQ-ACK feedback bits is used for indicating whether transmission information included in one of the N first-type information elements corresponding to the each of the N groups of HARQ-ACK feedback bits is successfully decoded.

The N first-type information elements correspond to N groups of HARQ-ACK feedback bits, one of the N groups of HARQ-ACK feedback bits corresponding to one of the N first-type information elements is used for indicating whether transmission information included in the one of the N first-type information elements is successfully decoded, and one group of HARQ-ACK feedback bits corresponding to each of the other first-type information elements is used for indicating whether a difference set between the each of the other first-type information elements and the intersection is successfully decoded.

The N first-type information elements correspond to N1 groups of HARQ-ACK feedback bits, where N1 is a positive integer less than or equal to (N+1), the intersection between the pieces of transmission information included in the N first-type information elements corresponds to one of the N1 groups of HARQ-ACK feedback bits, and one of the N first-type information elements which has a non-empty difference set with the intersection corresponds to one of the N1 groups of HARQ-ACK feedback bits.

The N first-type information elements correspond to (N+1) groups of HARQ-ACK feedback bits, one of the (N+1) groups of HARQ-ACK feedback bits corresponds to the intersection between the pieces of transmission information included in the N first-type information elements and is used for indicating whether transmission information included in the intersection is successfully decoded, and each of remaining N groups of HARQ-ACK feedback bits corresponds to a respective one of the N first-type information elements and is used for indicating whether a difference set between the respective one of the N first-type information elements and the intersection is successfully decoded.

The second determination module 402 is specifically configured to determine the mapping relationship between the bit field value corresponding to the bit indication field in the DCI and the parameter value indicated by the bit indication field in the DCI in at least one of manners described below.

The bit indication field includes bit indication fields corresponding to P first-type information elements of the N first-type information elements, where P is a positive integer less than or equal to N.

The bit indication field is a bit indication field in one or more pieces of DCI among M pieces of DCI for scheduling the N first-type information elements.

In the case where the intersection is non-empty, the bit indication field is used for indicating a first-type parameter type.

In the case where the intersection is empty, the bit indication field is used for indicating a second-type parameter type.

In the case where the intersection is non-empty, the bit indication field corresponds to a mapping relationship one.

In the case where the intersection is empty, the bit indication field corresponds to a mapping relationship two.

The number of bits included in the bit indication field in the case where the intersection is non-empty is not equal to the number of bits included in the bit indication field in the case where the intersection is empty.

The number of bits included in the DCI in the case where the intersection is non-empty is not equal to the number of bits included in the DCI in the case where the intersection is empty.

In the case where the intersection is non-empty, the bit indication field is divided into R groups of bits, where each of the R groups of bits is used for indicating one parameter type, and R is an integer greater than or equal to 1.

The apparatus includes at least one of characteristics described below.

The second-type parameter type includes at least one of the following parameter types: the NDI, the MCS, the RV, the CBGTI or the CBGFI.

The first-type parameter type includes at least one of the following parameter types: a frequency domain resource, a time domain resource, the DMRS, the rate matching or the first information.

A difference set between a parameter type set indicated in the mapping relationship one and a parameter type set indicated in the mapping relationship two is non-empty.

An intersection between a parameter type set indicated in the mapping relationship one and a parameter type set indicated in the mapping relationship two is empty.

A parameter type set indicated in the mapping relationship one is a subset of a parameter type set indicated in the mapping relationship two, or a parameter type set indicated in the mapping relationship two is a subset of a parameter type set indicated in the mapping relationship one.

The first determination module 401 and/or the second determination module 402 are specifically configured to determine the intersection between the pieces of transmission information included in the N first-type information elements and/or the difference in at least one of manners described below.

The intersection and/or the difference are determined according to a relationship between the number of CBGs actually included in one TB and the number of CBGs included in one TB which is indicated in CBGTI, where the N first-type information elements are CBGs, the number of CBGs actually included in one TB is acquired according to at least one of the following parameters: a TBS, the modulation order, the number of layers of the DMRS, the channel coding rate, the number of subcarriers occupied by the rate matching resource, the number of subcarriers allocated before rate matching or the number of subcarriers occupied after rate matching, and the number of CBGs included in the TB which is indicated in the CBGTI is determined according to the number of non-zero bits in the CBGTI. For example, the number of CBGs included in one TB which is indicated in the CBGTI is equal to the number of non-zero bits in the CBGTI.

In the case where the N first-type information elements are located in different frequency domain bandwidths, an intersection between the N first-type information elements and/or the difference are determined according to a third-type parameter, where the third-type parameter includes at least one of an index of a frequency domain bandwidth, a DAI, a process number, the modulation order, the channel coding rate or the RV. The DAI is used for indicating a frequency domain bandwidth/a total number of data channels allocated in a frequency domain bandwidth group and an index of a data channel where a current data channel allocated in current DCI is located.

In the case where time domain resources occupied by the N first-type information elements are located between two consecutive HARQ-ACK feedback resources of a predetermined type, the intersection between the pieces of transmission information included in the N first-type information elements is non-empty, where the HARQ-ACK feedback resources of the predetermined-type include pieces of HARQ-ACK information for first-type information elements in the same process number.

In the case where frequency domain bandwidths occupied by the N first-type information elements are located in one frequency domain bandwidth group, an intersection between the N first-type information elements is non-empty.

The first determination module 401 is specifically configured to: in the case where the N first-type information elements are located in different frequency domain bandwidths, determine the intersection between the N first-type information elements according to the third-type parameter in at least one of manners described below.

In the case where a correspondence exists between values of N third-type parameters of the N first-type information elements, the intersection between the N first-type information elements is non-empty.

In the case where no correspondence exists between values of N third-type parameters of the N first-type information elements, the intersection between the N first-type information elements is empty.

In the case where a correspondence exists between a first-type information element of the N first-type information elements in a first frequency domain bandwidth and a value of a third-type parameter in a second frequency domain bandwidth, an intersection between the first-type information element in the first frequency domain bandwidth and a first-type information element corresponding to the value of the third-type parameter in the second frequency domain bandwidth is non-empty. The correspondence is acquired according to higher-layer signaling information and/or physical layer signaling information.

In an embodiment of the present disclosure, the second determination module 402 is specifically configured to determine the resource mapping manner of the first-type information element in at least one of manners described below.

A resource mapping manner in the case where the intersection is non-empty is different from a resource mapping manner in the case where the intersection is empty.

In the case where the intersection is non-empty, the resource mapping manner of the first-type information element is a mapping to a time-frequency resource and then a mapping to a layer, or the resource mapping manner of the first-type information element is a mapping to a layer and a mapping to a time-frequency resource in one DMRS group, and a mapping to a layer and a mapping to a time-frequency resource in another DMRS group, or the resource mapping manner of the first-type information element is that the same first-type information element is mapped to each DMRS group separately, where one of the N first-type information elements corresponds to more than one DMRS group.

In the case where the intersection is empty, the resource mapping manner of the first-type information element is a mapping to a layer and then a mapping to a time-frequency resource, where one of the N first-type information elements corresponds to one DMRS group, and/or the mapping to the layer includes all layers corresponding to all DMRSs corresponding to the first-type information element.

The N first-type information elements satisfy at least one of characteristics described below.

The N first-type information elements are scheduled by M pieces of downlink control information (DCI), where M is a positive integer less than or equal to N and/or M is a positive integer greater than or equal to N.

The N first-type information elements are N first-type information elements belonging to different time units and scheduled by the same piece of downlink control information (DCI).

An intersection between resources occupied by the N first-type information elements is non-empty.

A difference set between frequency domain resources occupied by the N first-type information elements is empty.

A span of resources occupied by the N first-type information elements is less than a predetermined value.

The N first-type information elements occupy the same number of resources.

The N first-type information elements correspond to N independent sixth-type parameters.

The HARQ-ACK feedback bits of the N first-type information elements satisfy the second characteristic.

The N first-type information elements belong to the same third-type information element, where the third-type information element includes N first-type information elements.

The N first-type information elements correspond to the same process number.

The time domain resources occupied by the N first-type information elements are located between the two consecutive HARQ-ACK feedback resources of the predetermined type, where the HARQ-ACK feedback resources of the predetermined type include the pieces of HARQ-ACK information for the first-type information elements in the same process number.

At least two of the N first-type information elements are located in different frequency domain bandwidths.

Frequency domain resources occupied by the N first-type information elements are located in one frequency domain bandwidth group.

Among the N first-type information elements, two first-type information elements at least exist which correspond to two bit sequences of the same piece of transmission information after channel coding, where the two bit sequences after channel coding correspond to two numbers of bits, or the two bit sequences after channel coding correspond to two numbers of bits and two RVs.

The number of soft buffers corresponding to the N first-type information elements is less than N.

Data in soft buffers corresponding to the N first-type information elements is capable of being combined.

More than one frequency domain bandwidth corresponding to the N first-type information elements shares one HARQ entity.

Each of the sixth-type parameters includes at least one of: the DMRS group, the TCI (for configuring a quasi co-location reference signal set), the modulation order, the channel coding rate, the MCS, the RV, the NDI, the index of the frequency domain bandwidth, the frequency domain resource, the time domain resource or information about the rate matching.

Each of the resources includes at least one of: the time domain resource or the frequency domain resource.

The number of resources includes at least one of: the number of time domain symbols, the number of PRBs or the number of subcarriers (i.e., REs).

The span of resources includes a difference between a lowest resource and a highest resource occupied by the N first-type information elements.

The apparatus includes at least one of characteristics described below.

In the case where the N first-type information elements satisfy a third characteristic, the intersection between the pieces of transmission information included in the N first-type information elements is non-empty.

In the case where the intersection between the pieces of transmission information included in the N first-type information elements is non-empty, the N first-type information elements satisfy a third characteristic.

The third characteristic includes at least one of characteristics described below.

The N first-type information elements are scheduled by the M pieces of DCI, where M is a positive integer greater than or equal to 1 and/or M is less than or equal to N.

The span of resources occupied by the N first-type information elements is less than the predetermined value.

The HARQ-ACK feedback bits of the N first-type information elements satisfy the second characteristic.

The N first-type information elements correspond to N independent seventh-type parameters. That is, seventh-type parameters of the N first-type information elements are independent of each other and there is no association between the seventh-type parameters of the N first-type information elements.

The N first-type information elements correspond to the same eighth-type parameter.

A combination of N ninth-type parameters of the N first-type information elements satisfies a fourth characteristic. For example, the combination belongs to a first predetermined set or the combination does not belong to a second predetermined set. The combination is elements in the first predetermined set and/or the second predetermined set.

N tenth-type parameters of the N first-type information elements satisfy a predetermined priority characteristic. For example, in the case where the N tenth-type parameters of the N first-type information elements are different, the tenth-type parameters of the N first-type information elements are determined according to tenth-type parameters of one or more information elements with higher priorities.

The N first-type information elements correspond to the same process number.

The time domain resources occupied by the N first-type information elements are located between the two consecutive HARQ-ACK feedback resources of the predetermined type, where the HARQ-ACK feedback resources of the predetermined type include the pieces of HARQ-ACK information for the first-type information elements in the same process number.

The frequency domain resources occupied by the N first-type information elements are located in one frequency domain bandwidth group.

The N first-type information elements share one channel coding rate.

The N first-type information elements correspond to N modulation orders.

Among the N first-type information elements, two first-type information elements at least exist which correspond to two bit sequences of the same piece of transmission information after channel coding, where the two bit sequences after channel coding correspond to two numbers of bits, or the two bit sequences after channel coding correspond to two numbers of bits and two RVs.

The number of soft buffers corresponding to the N first-type information elements is less than N.

The data in the soft buffers corresponding to the N first-type information elements is capable of being combined.

The more than one frequency domain bandwidth corresponding to the N first-type information elements shares one HARQ entity.

One or more of the seventh-type parameter, the eighth-type parameter, the ninth-type parameter or the tenth-type parameter include at least one of the following parameters: CBGTI, the modulation order, the channel coding rate, the RV, the NDI, the number of information bits, DCI, the TCI, the frequency domain resource, the time domain resource, a reference signal resource, the rate matching resource, an index of the third-type information element to which the N first-type information elements belong or a process number set.

The second characteristic includes at least one of characteristics described below.

The N first-type information elements correspond to one group of HARQ-ACK feedback bits.

The N first-type information elements correspond to more than one group of HARQ-ACK feedback bits, where the more than one group of HARQ-ACK feedback bits has the same value.

Feedback resources where the HARQ-ACK feedback bits of the N first-type information elements are located fall within the same time unit.

The HARQ-ACK feedback bits of the N first-type information elements are located in the same feedback resource.

HARQ-ACK feedback resources of the N first-type information elements are after transmissions resources where the N first-type information elements are located.

The apparatus includes at least one of characteristics described below.

An information element of an i-th type includes at least one of a data channel, a CW, a TB, a CBG, a CB or an information element corresponding to a DMRS group, where i belongs to {one, two, three, four}.

The N first-type information elements have the same transmission direction, where the transmission direction includes any one of the following: information elements are received information elements, or information elements are sent information elements.

In an embodiment of the present disclosure, in the case where the N first-type information elements are CBGs, the N CBGs belong to one TB or CW.

The one TB or CW satisfies at least one of characteristics described below.

Each CBG in the one TB or CW corresponds to one piece of modulation order indication information and/or one piece of channel coding rate indication information.

In the one TB or CW, two CBGs at least exist which are repeatedly sent different times.

In the one TB or CW, two CBGs at least exist which have different channel coding rates.

In an embodiment of the present disclosure, in the case where the N first-type information elements are information elements corresponding to one DMRS group, the method satisfies at least one of characteristics described below.

One CW corresponds to more than one DMRS group.

One TB corresponds to N CWs.

N CWs correspond to N bit sequences of the same TB after channel coding.

An intersection between N information elements corresponding to N DMRS groups corresponding to one CW is non-empty.

One CW is mapped to a layer, to frequency domain, and to time domain in each of N DMRS groups corresponding to the one CW, separately.

A size of transmission information included in one CW is determined according to the number of layers of a DMRS included in one of multiple DMRS groups included in the one CW.

DMRSs in one DMRS group satisfy the quasi co-location relationship.

DMRSs in different DMRS groups do not satisfy the quasi co-location relationship.

Each DMRS group corresponds to one quasi co-location reference signal set.

Another embodiment of the present disclosure provides an apparatus for transmitting information. The apparatus includes a processor and a computer-readable storage medium. The computer-readable storage medium stores instructions which, when executed by the processor, implement any one of the preceding methods for transmitting information.

Another embodiment of the present disclosure provides a computer-readable storage medium. The computer-readable storage medium stores a computer program which, when executed by a processor, implements steps of any one of the preceding methods for transmitting information.

A PDSCH is used as an example in embodiments described hereinafter. Similar methods are applicable to a physical uplink shared channel (PUSCH).

Embodiment One

In the embodiment, whether an intersection between pieces of transmission information included in N first-type information elements is empty is determined according to first signaling information and/or a first agreed rule. For example, it is determined whether an intersection between pieces of transmission information included in N CWs or N TBs or N CBGs is empty. For example, the N CWs or the N TBs or the N CBGs include the same CBs, that is, the intersection is non-empty, where N is a positive integer greater than or equal to 2.

Further, when the intersection between the pieces of transmission information included in the N first-type information elements is non-empty, whether a difference set between pieces of transmission information included in any two first-type information elements of the N first-type information elements is empty is determined according to the first signaling information and/or the first agreed rule.

Further, the N first-type information elements satisfy at least one of characteristics described below:

the N first-type information elements are scheduled by M pieces of downlink control information (DCI), where M is a positive integer less than or equal to N and/or M is a positive integer greater than or equal to 1;

the N first-type information elements are N first-type information elements belonging to different time units and scheduled by the same piece of downlink control information (DCI);

an intersection between time domain resources occupied by the N first-type information elements is non-empty;

an intersection between frequency domain resources occupied by the N first-type information elements is non-empty;

a difference set between frequency domain resources occupied by the N first-type information elements is empty;

the N first-type information elements occupy the same number of time domain symbols; the N first-type information elements occupy the same number of physical resource blocks (PRBs);

the N first-type information elements occupy the same number of subcarriers (i.e., resource elements (REs));

the N first-type information elements correspond to N independent sixth-type parameters; HARQ-ACK feedback bits of the N first-type information elements satisfy a second characteristic;

the N first-type information elements belong to the same third-type information element, where the third-type information element includes N first-type information elements; the N first-type information elements correspond to the same process number; at least two of the N first-type information elements are located in different frequency domain bandwidths;

time domain resources occupied by the N first-type information elements are located between two HARQ-ACK feedback resources in one process number; or frequency domain resources occupied by the N first-type information elements are located in one frequency domain bandwidth group.

Each of the sixth-type parameters includes at least one of: a demodulation reference signal (DMRS) group (for example, N information elements are scheduled by M pieces of DCI and correspond to N DMRS groups, where DMRS ports in the same DMRS group satisfy a quasi co-location relationship), a transmission configuration indicator (TCI) (for configuring a quasi co-location reference signal set), a modulation order, a channel coding rate, a modulation and coding scheme (MCS) (for configuring the modulation order and the channel coding rate), a redundancy version (RV), a new data indicator (NDI), an index of a frequency domain bandwidth, a frequency domain resource, a time domain resource or information about rate matching.

Specifically, for example, the N CWs or the N TBs or the N CBGs are scheduled by the same piece of DCI.

Alternatively, the N CWs or the N TBs or the N CBGs are scheduled by M pieces of DCI, where M is a positive integer less than or equal to N and greater than or equal to 2.

Additionally/alternatively, HARQ-ACK feedback bits of the N CWs or the N TBs or the N CBGs fall within the same time unit.

Additionally/alternatively, the HARQ-ACK feedback bits of the N CWs or the N TBs or the N CBGs fall after transmission time resources of the N CWs or the N TBs or the N CBGs.

Further, no HARQ-ACK feedback resource exists between the N information elements.

Alternatively, time domain resources occupied by the N information elements are located between two HARQ-ACK feedbacks with the same process number in one frequency domain bandwidth group. For example, the N CWs or the N TBs or the N CBGs may be allocated with different PRB sets and/or different numbers of time domain symbols before rate matching.

For simplicity, an example in which whether the intersection between the pieces of transmission information included in the N CWs (that is, the first-type information elements) is empty is determined and whether the difference set is empty is further determined when the intersection is non-empty is used below.

Figure 5:
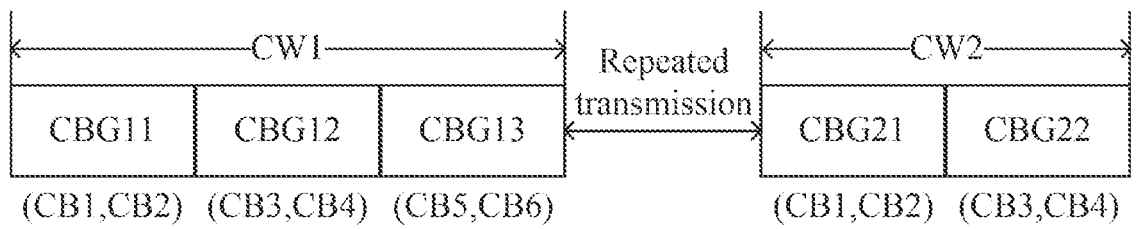
FIG. 5 is a schematic diagram illustrating that CBGs with the same index in two CWs for a repeated transmission include the same transmission information and the two CWs include different numbers of CBGs according to an embodiment of the present disclosure.
Figure 6A:
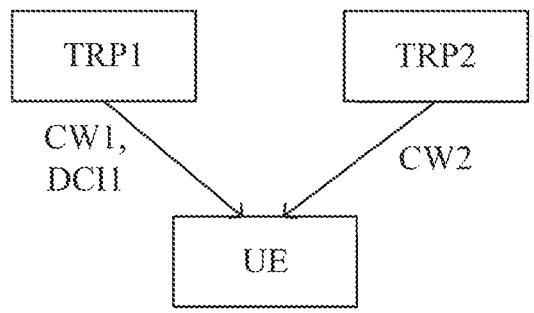
FIG. 6A is a schematic diagram illustrating that the two CWs for the repeated transmission in FIG. 5 are scheduled by one piece of DCI and transmitted by two TRPs according to an embodiment of the present disclosure.

In the embodiment, only part of CBGs in two CWs is repeatedly transmitted. As shown in FIG. 5, CW1 and CW2 are two CWs scheduled by the same piece of DCI, each CW corresponds to one DMRS group, and DMRSs in one DMRS group satisfy the quasi co-location relationship. Optionally, as shown in FIG. 6A, the two CWs are transmitted by two transmission reception points (TRPs), respectively, where one TRP transmits DCI1, and {CW1, CW2} are two CWs of one PDSCH scheduled by DCI1. CW1 includes three CBGs {CBG11, CBG12, CBG13}, and CW2 includes two CBGs {CBG21, CBG22}. It is obtained according to the first signaling information and/or the first agreed rule that the two CWs include repeatedly transmitted CBGs. Further, CBGs with the same index in the two CWs are repeatedly transmitted, that is, an intersection between pieces of transmission information included in two CBGs is non-empty, and a difference set between the pieces of transmission information included in the two CBGs is empty. That is, the CBGs with the same index in the two CWs belong to the intersection of the two CWs, and a CBG with a different index is not repeatedly transmitted, that is, a CBG in one CW has no corresponding CBG in the other CW for a repeated transmission and the CBG belongs to a difference set between pieces of transmission information included in the two CWs. An index of a CBG is index information of the CBG in a set of multiple CBGs (that is, second-type information elements) included in the CW where the CBG is located. For example, in FIG. 5, an index of CBG1i is i, where i=1, 2, 3, and an index of CBG2j is j, where j=1, 2. The above indexes start from 1 and of course may start from 0. That is, when i=j, CBG1i and CBG2j include the same transmission information bits before channel coding. For example, both CBG11 and CBG21 include (CB1, CB2), both CBG12 and CBG22 include (CB3, CB4), (CB5, CB6) included in CBG13 have no corresponding CBG in CW2 for a repeated transmission, the difference set between the pieces of transmission information included in CW1 and CW2 is CBG13, and the intersection between the pieces of transmission information included in CW1 and CW2 is (CB1, CB2, CB3, CB4).

Figure 6B:
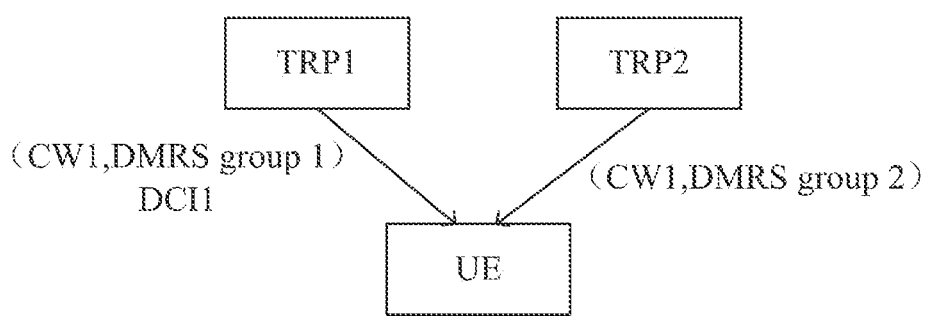
FIG. 6B is a schematic diagram illustrating that two DMRS groups in one CW are scheduled by one piece of DCI and transmitted by two TRPs according to an embodiment of the present disclosure.

Alternatively, as shown in FIG. 6B, two first-type information elements are two DMRS groups scheduled by one piece of DCI in one CW or TB, or it may be referred to as two information elements being two transmission information sets corresponding to two DMRS groups scheduled by one piece of DCI in one CW or TB, where each DMRS group includes complete information of the CW or TB.

The two repeatedly transmitted CBGs indicate that the two CBGs include the same information bits before channel coding, that is, the included CBs are the same. However, coding rates, modulation manners and redundancy versions corresponding to the two CBGs may be different. As shown in FIGS. 5, 6A and 6B, the same information is transmitted through multiple TRPs so that the robustness of information is increased and the delay of an information transmission is reduced. However, due to a reduced retransmission probability, each TRP should have its corresponding MCS in consideration of different link performance of each TRP arriving at a terminal. For example, CW1 corresponds to MCS1 and CW2 corresponds to MCS2, where a channel coding rate R1 corresponding to MCS1 (that is, a ratio of the number of information bits before channel coding to the number of bits after channel coding, where the information bits before channel coding may include a CRC code or not include the CRC code) is greater than a channel coding rate R2 corresponding to MCS2. For example, link performance of TRP1 arriving at a UE is better than link performance of TRP2 arriving at the UE. Therefore, when the intersection between the pieces of transmission information included in the two CWs is non-empty, the difference between the pieces of transmission information included in the two CWs may be made non-empty, especially when the two CWs occupy the same time-frequency resources.

Further, as shown in FIG. 7, each CW includes two CBGs, that is, two CBGs are actually transmitted in the CW at present or two CBGs are actually included in a first transmission of the CW. A maximum number of CBGs included in each CW is 3. CBGTI1 corresponding to CW1 indicates that two CBGs included in CW1 are mapped to {CBG11, CBG13}, where CBG12 is not transmitted. For example, CBGTI1=[1, 0, 1]. CBGTI2 corresponding to CW2 indicates that two CBGs included in CW2 are mapped to {CBG21, CBG22}, where CBG23 is not transmitted. For example, CBGTI2=[1, 1, 0]. 1 in the CBGTI indicates that this CBG is included in a current PDSCH, and 0 in the CBGTI indicates that this CBG is not included in the current PDSCH. CBGs with the same index in two CWs (that is, i=j as described above) include the same transmission information, that is, CBG11 and CBG21 include the same transmission information. CBG13 has no corresponding CBG which has the same index as CBG13 among CBG2j (j=1, 2) in CW2 in this transmission, and CBG22 has no corresponding CBG which has the same index as CBG22 among CBG2i (i=1, 3) in CW1 in this transmission. Therefore, CBG13 and CBG22 belong to the difference between the pieces of transmission information included in CW1 and CW2. Alternatively, CBG13 belongs to a difference of a piece of transmission information included in CW1 from that in CW2, and CBG22 belongs to a difference of a piece of transmission information included in CW2 from that in CW1. Further, in FIG. 7, in response to a first transmission of the two CWs, CBGs included in one CW has discontinuous indexes, CBGTI of the one CW in the first transmission includes discontinuous 1s, and C CBGs included in a TB in the first transmission are mapped to non-zero elements in the CBGTI one by one. In a subsequent transmission, a mapping relationship between the CBGs in the TB and bits in the CBGTI is unchanged. For example, CBGTI=[1, 0, 1] of CW1 in the first transmission indicates that the two CBGs included in CW1 are mapped to CBG11 and CBG13 in sequence, and a second element in the CBGTI in a retransmission of the TB cannot be 0, that is, the CBGTI in the retransmission of the TB can only be [x, 0, y], where x and y belong to {0, 1}.

In the preceding implementations of this embodiment, in FIG. 5, the two CWs scheduled by one piece of DCI have different numbers of CBGs so that the intersection between the pieces of transmission information included in the two CWs is non-empty and the difference between the pieces of transmission information included in the two CWs is non-empty. Therefore, a CW with better link performance includes more transmission information than a CW with worse link performance, thereby making full use of link performance.

Figure 8A:
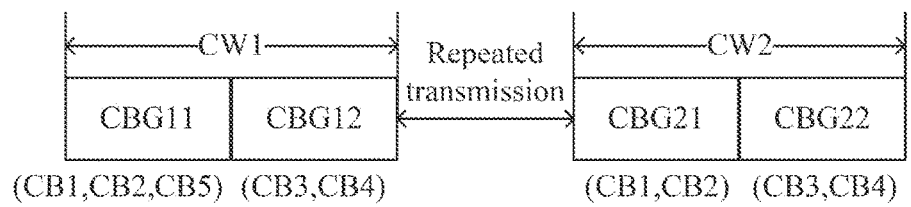
FIG. 8A is schematic diagram one illustrating that CBs with the same index in CBGs with the same index in two CWs include the same transmission information and the two CWs include the same maximum number of CBGs according to an embodiment of the present disclosure.
Figure 8B:
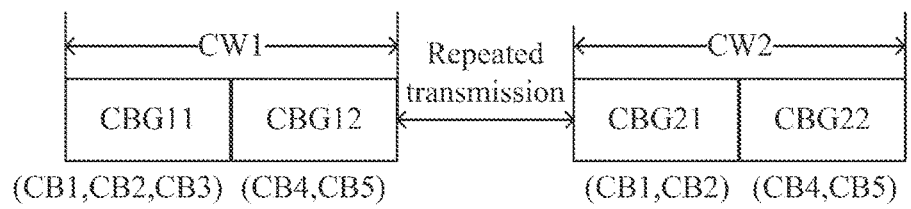
FIG. 8B is schematic diagram two illustrating that CBs with the same index in CBGs with the same index in two CWs include the same transmission information and the two CWs include the same maximum number of CBGs according to an embodiment of the present disclosure.

In another implementation of this embodiment, two CWs include the same number of CBGs; when CBGs have the same index and CBs have the same index in the two CWs, two CBs in the two CWs include the same transmission information, that is, the CBs belong to an intersection between the two CWs; when CBGs have the same index and a CB has a different index in the two CWs, the CB belongs to a difference between the two CWs. As shown in FIG. 8A, an intersection between pieces of transmission information included in CBGs (that is, the first-type information elements) with the same index in two CWs is non-empty, that is, when i=j, an intersection between pieces of transmission information included in CBG1i and CBG2j is non-empty, where i=1, 2 and j=1, 2. Further, CBs (that is, the second-type information elements) with the same index in the CBGs which include the pieces of transmission information whose intersection is non-empty are repeatedly transmitted, that is, the CBs belong to the intersection between the pieces of transmission information included in the CW/CBGs. A CB with a different index is not repeatedly transmitted, that is, the CB belongs to a difference between the pieces of transmission information included in the CW/CBGs. An index of a CB is a relative index of the CB in a set of CBs included in a CBG. For example, indexes of (CB1, CB2, CB5) in CBG11 are {1, 2, 3} in sequence, CB1 in CBG11 and CB1 in CBG21 are repeatedly transmitted, and CB2 in CBG11 and CB2 in CBG21 are repeatedly transmitted. CB5 in CBG11 has no corresponding CB which has the same index as CB5 in CBG21 so that CB5 belongs to a difference between the two CWs. Alternatively, as shown in FIG. 8B, for example, indexes of (CB1, CB2, CB3) in CBG11 are {1, 2, 3} in sequence, CB1 in CBG11 and CB1 in CBG21 are repeatedly transmitted, and CB2 in CBG11 and CB2 in CBG21 are repeatedly transmitted. CB3 in CBG11 has no corresponding CB which has the same index as CB3 in CBG21 so that CB3 belongs to the difference between the two CWs. Indexes corresponding to (CB4, CB5) in CBG22 are {1, 2} in sequence, an index of CBG12 corresponds to that of CBG22, and {CB4, CB5} in CBG12 have the same indexes as {CB4, CB5} in CBG22. Therefore, the intersection is {CB1, CB2, CB4, CB5}, and the difference is CB3. Further, if it is obtained through CBGTI of the two CWs that CW1 includes two CBGs and it is obtained through a calculation of a TBS that CW1 includes five CBs, and it is obtained through the CBGTI that CW2 includes two CBGs and an intersection between CBGs with the same index in CW1 and CW2 is non-empty, a mapping manner shown in FIG. 8B may be used. Thus, CW2 includes non-consecutive CBs in a TB. Alternatively, an index of a CB is a relative index of the CB in a set of CBs included in the TB. The indexes of (CB1, CB2, CB5) in CBG11 are {1, 2, 5} in sequence. In short, when the intersection between the pieces of transmission information included in the two CBGs with a correspondence is non-empty, the difference set between the pieces of transmission information included in the two CBGs with the correspondence may also be non-empty.

When the intersection between the pieces of transmission information included in the two CBGs is non-empty and the difference set between the pieces of transmission information included in the two CBGs is empty, the pieces of transmission information included in different CBGs have the same number of bits, and the different CBGs correspond to different modulation orders and/or may occupy different numbers of PRBs. Therefore, the different CBGs correspond to different numbers of bits after channel coding so that the same CB/CBG/TB corresponds to more than one bit sequence after channel coding which correspond to different CBGs or different CWs corresponding to the different CBGs, respectively. That is, for example, the same transmission information sequence needs to correspond to more than one bit sequence after channel coding in one transmission of the PDSCH, where the more than one bit sequence after channel coding is different in terms of not only the RV but also a length of a bit sequence. Alternatively, no matter whether the lengths of the bit sequences are the same, there are two independent pieces of sequence length information which may be the same or different.

Whether the intersection between the pieces of transmission information included in the two CWs or the two transmission information sets corresponding to the two DMRS groups is empty is obtained through the first signaling information and/or the first agreed rule. For example, whether the intersection between the pieces of transmission information included in the two CWs or the two transmission information sets corresponding to the two DMRS groups is empty is determined through at least one of DMRS information or TCI information. For example, when the TCI includes more than one quasi co-location reference signal set, the DMRS information is jointly coded with information about whether the intersection between the pieces of transmission information included in the two CWs or the two transmission information sets corresponding to the two DMRS groups is empty, and the terminal obtains whether the intersection between the pieces of transmission information in the two CWs or the two transmission information sets corresponding to the two DMRS groups is empty through DCI. Of course, whether the two CWs or the two transmission information sets corresponding to the two DMRS groups include repeatedly transmitted CBGs may also be obtained in other manners.

Further, N CBGs including the same transmission information correspond to one HARQ-ACK feedback bit. As shown in FIG. 5, CBG11 and CBG21 correspond to the same HARQ-ACK feedback bit so that CW1 and CW2 in FIG. 5 require three HARQ-ACK feedback bits which correspond to {CBG11, CBG21}, {CBG12, CBG22}, and {CBG13} in sequence. Of course, if each CBG corresponds to one HARQ-ACK feedback bit according to a higher-layer configuration, it needs to be further constrained that HARQ-ACK feedback bits corresponding to CBGs including the same transmission information are the same. For example, CW1 and CW2 correspond to five HARQ-ACK feedback bits which correspond to CBG11, CBG12, CBG13, CBG21, and CBG22 in sequence, and it needs to be agreed that HARQ-ACK feedback bits of CBG11 and CBG21 have the same value and HARQ-ACK feedback bits of CBG12 and CBG22 have the same value.

Further, in FIGS. 8A and 8B, the intersection and the difference set between the pieces of transmission information included in CBG11 and CBG21 are both non-empty. For example, the intersection between the pieces of transmission information included in CBG11 and CBG21 in FIGS. 8A and 8B is {CB1, CB2}, the difference between the pieces of transmission information included in CBG11 and CBG21 in FIG. 8A is {CB5}, and the difference between the pieces of transmission information included in CBG11 and CBG21 in FIG. 8B is {CB3}. Therefore, HARQ-ACK feedback may be provided in manners described below.

Manner one: CBG11 and CBG21 each correspond to one HARQ-ACK feedback bit. When (CB1, CB2) are successfully decoded, the HARQ-ACK feedback bit corresponding to CBG21 is ACK. When (CB1, CB2, CB5) are successfully decoded, the HARQ-ACK feedback bit corresponding to CBG11 is ACK.

Manner two: The N first-type information elements correspond to N HARQ-ACK feedback bits, one of the N HARQ-ACK feedback bits corresponding to one of the N first-type information elements is used for indicating whether transmission information included in the one of the N first-type information elements is successfully decoded, and one of the N HARQ-ACK feedback bits corresponding to another first-type information element is used for indicating whether a difference between the other first-type information element and the intersection is successfully decoded. That is, for example, the HARQ-ACK feedback bit corresponding to CBG21 is used for indicating whether (CB1, CB2) are successfully decoded, and the HARQ-ACK feedback bit corresponding to CBG11 is used for indicating whether CB5 is successfully decoded.

Manner three: The N first-type information elements correspond to N1 HARQ-ACK feedback bits, where N1 is a positive integer less than or equal to (N+1), the intersection between the pieces of transmission information included in the N first-type information elements corresponds to one of the N1 HARQ-ACK feedback bits, and one of the N first-type information elements which has a non-empty difference with the intersection between the pieces of transmission information included in the N first-type information elements corresponds to one of the N1 HARQ-ACK feedback bits. For example, in FIG. 8, (CB1, CB2) correspond to one HARQ-ACK feedback bit, CB5 corresponds to one feedback bit, and a difference between CBG21 and (CB1, CB2) is empty and CBG21 has no corresponding HARQ-ACK feedback bit.

Manner four: The N first-type information elements correspond to (N+1) HARQ-ACK feedback bits, the intersection between the pieces of transmission information included in the N first-type information elements corresponds to one of the (N+1) HARQ-ACK feedback bits, and each of the N first-type information elements corresponds to a respective one HARQ-ACK feedback bit. The HARQ-ACK feedback bit corresponding to the intersection between the pieces of transmission information included in the N first-type information elements is used for indicating whether the intersection between the pieces of transmission information included in the N first-type information elements is successfully decoded, and the HARQ-ACK feedback bit corresponding to each of the N first-type information elements is used for indicating whether a difference between the each of the N first-type information elements and the intersection between the pieces of transmission information included in the N first-type information elements is successfully decoded. For example, in FIG. 8A, (CB1, CB2) correspond to one HARQ-ACK feedback bit, CB5 corresponds to one feedback bit, and the difference between CBG21 and (CB1, CB2) is empty but CBG21 still has the corresponding HARQ-ACK feedback bit except that the HARQ-ACK feedback bit may be an NACK by default or used for notifying other information (that is, second information) such as a selective repeat (SR) and/or CSI feedback and/or beam failure recovery request information, where the included failure recovery request information is used for indicating new reference signal indication information. For example, the terminal determines that a beam failure occurs according to performance of a reference signal in a first reference signal set, selects a new reference signal from a second reference signal set, and sends the new reference signal indication information to a base station.

The intersection and the difference set between the pieces of transmission information included in the two CWs are determined by using the two CWs as an example. Similarly, two information elements may be data portions corresponding to two DMRS groups in one CW. As shown in FIG. 6B, the two DMRS groups in the one CW are respectively from different TRPs, whether an intersection between pieces of transmission information included in two data portions corresponding to the two DMRS groups is empty is determined according to the first signaling information or it is agreed that the intersection between the pieces of transmission information included in the two data portions corresponding to the two DMRS groups in the one CW is non-empty, and whether a difference set between the two data portions corresponding to the two DMRS groups is empty is further determined according to second signaling information and/or a second agreed rule.

Embodiment Two

In this embodiment, one CW (a third-type information element) at least includes two CBGs (first-type information elements), and an intersection between pieces of transmission information included in the two CBGs is non-empty, where the CBG corresponds to one bit in CBGTI.

Further, in the one CW, one CBG at least exists which has no corresponding CBG for a repeated transmission in the one CW, that is, information in the one CBG is transmitted only in the one CBG instead of being repeatedly transmitted in more than one CBG.

Further, different CBGs in the one CW correspond to different channel coding rates or are repeatedly transmitted different times.

Further, the one CW corresponds to one DMRS group and/or one quasi co-location reference signal set.

Figure 9:
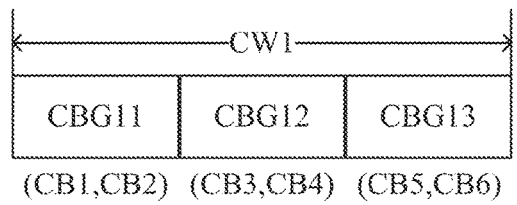
FIG. 9 is a schematic diagram illustrating that different CBGs in one CW include the same transmission information according to an embodiment of the present disclosure.

As shown in FIG. 9, CW1 includes three CBGs, CBG1 and CBG3 are repeatedly transmitted and include the same transmission information, and CBG2 includes no CBG for a repeated transmission in CW1.

Further, N CBGs repeatedly transmitted correspond to one HARQ-ACK feedback bit. As shown in FIG. 9, CBG1 and CBG3 correspond to the same HARQ-ACK feedback bit so that CW1 in FIG. 9 requires two HARQ-ACK feedback bits which correspond to {CBG1, CBG3} and {CBG2} in sequence. Of course, if each CBG corresponds to one HARQ-ACK according to a higher-layer configuration, it needs to be further constrained that HARQ-ACKs corresponding to CBGs repeatedly transmitted are the same. For example, CW1 corresponds to three HARQ-ACK feedback bits which correspond to CBG1, CBG2 and CBG3 in sequence, and it needs to be agreed that HARQ-ACK feedback bits of CBG1 and CBG3 have the same value.

Further, whether one CW includes repeatedly transmitted CBGs is determined through first signaling information and/or a first agreed rule. For example, if G CBGs are included according to a TB size and CBGTI indicates that more than G CBGs are transmitted in a current TB, the one CW includes the repeatedly transmitted CBGs. For example, it is obtained through an MSC, allocated subcarriers and information about rate matching that the TB includes two CBGs. However, the CBGTI indicates that three CBGs are transmitted in the TB so that the TB includes the repeatedly transmitted CBGs. For example, first two CBGs are different CBGs and begin to be repeatedly transmitted from a third CBG, that is, (CBG1, CBG3) are repeated transmissions. To make the TB size different from the number of CBGs included in a PDSCH/PUSCH, the following manner may be used: a parameter for calculating the TB size is different from a parameter used in an actual transmission of the PDSCH/PUSCH, where the parameter includes at least one of a modulation order, the number of layers of a DMRS, a channel coding rate, the number of subcarriers occupied by a rate matching resource, the number of subcarriers allocated before rate matching or the number of subcarriers occupied after rate matching. Further, the above two sets of parameters are determined through signaling information and/or an agreed rule, which are respectively used for calculating the TB size and the transmission of the PDSCH/PUSCH. Alternatively, there is only one set of parameters, the TB size is obtained according to the one set of parameters, and it is obtained according to the TB size that the TB includes three CBGs. However, the CBGTI indicates that only two CBGs are included in the TB, especially when an NDI indicates that the TB is a first transmission, it indicates that the three CBGs included in the TB have the repeatedly transmitted CBGs, as shown in FIG. 9.

One CW can include not only repeatedly transmitted CBGs but also a CBG which is not repeatedly transmitted through the preceding embodiment so that different traffic such as enhanced Mobile Broadband (eMBB) traffic and Ultra-Reliable and Low Latency Communications (URLLC) traffic are transmitted in one CW or CBs with different reliability and delay requirements are transmitted in one CW.

Embodiment Three

In the embodiment, whether an intersection between pieces of transmission information included in N first-type information elements is empty, that is, whether the N first-type information elements include the same transmission information is determined through first signaling information and/or a first agreed rule. N is a positive integer greater than or equal to 2. A detailed description is provided below with N being 2.

Further, seventh-type parameters corresponding to the N first-type information elements with a non-empty intersection are independent of each other. For example, each CBG of the N CBGs corresponds to one parameter value and/or one piece of parameter configuration signaling of a seventh-type parameter, and N values of seventh-type parameters of the N CBGs are obtained respectively through third signaling information or a third agreed rule, where the N values may be the same or different but the parameters are obtained respectively. After the seventh-type parameters of the N CBGs are acquired respectively, the same seventh-type parameter is allowed or different seventh-type parameters are allowed.

Further, the N first-type information elements with the non-empty intersection correspond to the same eighth-type parameter. For example, configuration signaling of the eighth-type parameter is shared among the N CBGs and/or N values of the eighth-type parameters of the N CBGs are obtained respectively through fourth signaling information or a fourth agreed rule, where the N values need to be the same. For example, channel coding rates of the N CBGs are the same, process numbers of the N CBGs are the same, and frequency domain bandwidths of the N CBGs are the same.

Further, a combination of N values of ninth-type parameters corresponding to the N first-type information elements with the non-empty intersection needs to satisfy a fourth characteristic. For example, CBGFI corresponding to the N first-type information elements need to have the same value, HARQ-ACK feedback bits corresponding to the N first-type information elements need to be the same, a combination of process numbers of the N first-type information elements satisfies a condition, a combination of frequency domain bandwidths of the N first-type information elements satisfies a condition, a combination of DAIs of the N first-type information elements satisfies a condition, and a combination of NDIs of the N first-type information elements satisfies a condition. For example, the NDIs of the N first-type information elements need to be the same.

Further, N values of tenth-type parameters corresponding to the N first-type information elements with the non-empty intersection satisfy a predetermined priority characteristic. For example, when MCS indications of the N first-type information elements are different, a value of an MCS indication of one information element is agreed. For example, different TBSs of the N first-type information elements are determined by using a predetermined TBS of one information element, or different parameters for acquiring the TBSs of the N first-type information elements are determined by using a predetermined parameter of one information element.

Figure 10:
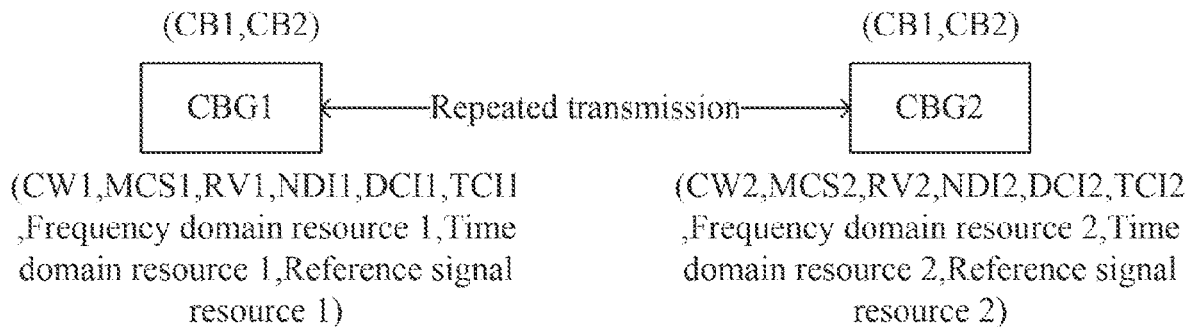
FIG. 10 is a schematic diagram illustrating that each of two CBGs including the same transmission information corresponds to one set of parameters according to an embodiment of the present disclosure.

As shown in FIG. 10, an intersection between pieces of transmission information included in CBG1 and CBG2 is non-empty, CBG1 and CBG2 include the same transmission information (CB1, CB2), and CBG1 and CBG 2 correspond to one set of values of a parameter set one, respectively. The parameter set one includes at least one of a CW index, a modulation and coding scheme (MCS) (or a modulation order or a channel coding rate), a redundancy version (RV), a new data indicator (NDI), downlink control information (DCI), a transmission configuration indicator (TCI), a frequency domain resource, a time domain resource, the number of layers of a DMRS, information about rate matching, an index of a frequency domain bandwidth, a DAI or HARQ-ACK information. The seventh-type parameter, the eighth-type parameter, the ninth-type parameter and the tenth-type parameter include one or more parameters in the parameter set one.

Figure 11A:
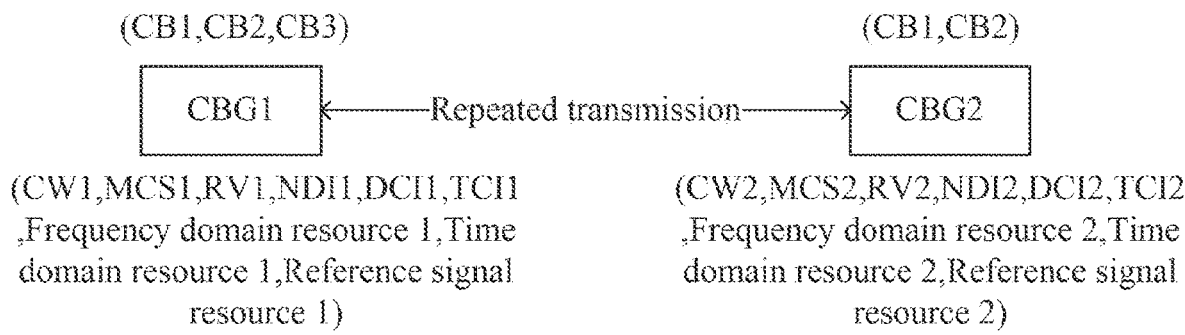
FIG. 11A is schematic diagram one illustrating that two CBGs include both the same transmission information and different information according to an embodiment of the present disclosure.

Further, the intersection between the pieces of transmission information included in the CBGs is non-empty, and a difference set between the pieces of transmission information included in the CBGs is empty, as shown in FIG. 10. Alternatively, an intersection between pieces of transmission information included in CBGs is non-empty, and a difference set between the pieces of transmission information included in the CBGs is also non-empty. As shown in FIG. 11A, an intersection between CBG1 and CBG2 is (CB1, CB2), a difference between CBG1 and CBG2 is CB3, and CB3 is not repeatedly transmitted in CBG2.

Further, when a difference set between pieces of transmission information included in the N CBGs with a non-empty intersection is empty, the N CBGs with a non-empty intersection correspond to one HARQ-ACK feedback bit. As shown in FIG. 10, CBG1 and CBG2 correspond to the same HARQ-ACK feedback bit so that CBG1 and CBG2 in FIG. 10 correspond to one HARQ-ACK feedback bit. Of course, each CBG corresponds to one HARQ-ACK feedback bit according to a higher-layer configuration. For example, if whether the CBGs include the same transmission information is dynamically notified by DCI, each CBG corresponds to one HARQ-ACKB feedback bit for simple feedback. It needs to be further constrained that HARQ-ACK feedback bits corresponding to the CBGs with the non-empty intersection are the same. For example, it needs to be agreed that HARQ-ACK feedback bits of CBG1 and CBG2 have the same value.

Figure 11B:
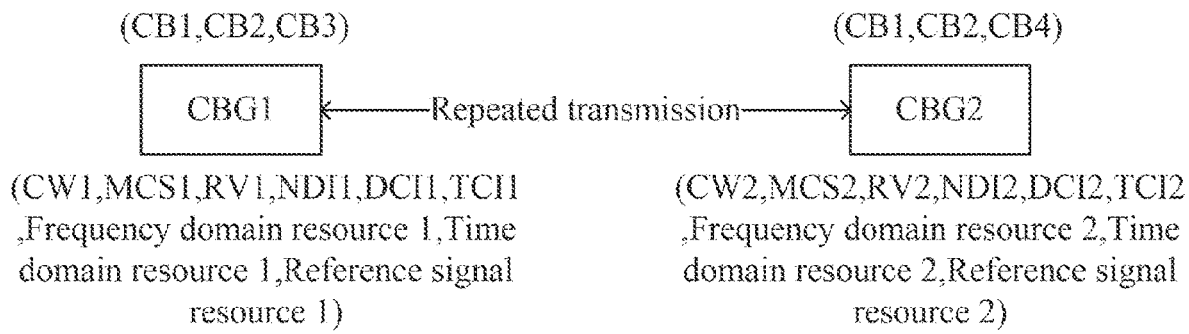
FIG. 11B is schematic diagram two illustrating that two CBGs include both the same transmission information and different information according to an embodiment of the present disclosure.

In FIG. 11A, when the difference set between the pieces of transmission information included in the N CBGs with the non-empty intersection is non-empty, one HARQ-ACK feedback manner is that the N CBGs with the non-empty intersection each correspond to one HARQ-ACK feedback bit. When (CB 1, CB2) are successfully decoded, the HARQ-ACK feedback bit corresponding to CBG2 is an ACK, and when (CB1, CB2, CB3) are successfully decoded, the HARQ-ACK feedback bit corresponding to CBG1 is the ACK. Alternatively, as long as CB3 is successfully decoded, the HARQ-ACK feedback bit corresponding to CBG1 is the ACK. Another HARQ-ACK feedback manner is that the same transmission information included in the N CBGs corresponds to one HARQ-ACK feedback bit and a difference between each CBG and the intersection corresponds to one HARQ-ACK feedback bit. As shown in FIG. 11B, (CB1, CB2) correspond to one HARQ-ACK feedback bit, CB3 corresponds to one HARQ-ACK feedback bit, and CB4 corresponds to one HARQ-ACK feedback bit.

Further, the N first-type information elements correspond to the same process number.

Figure 11C:
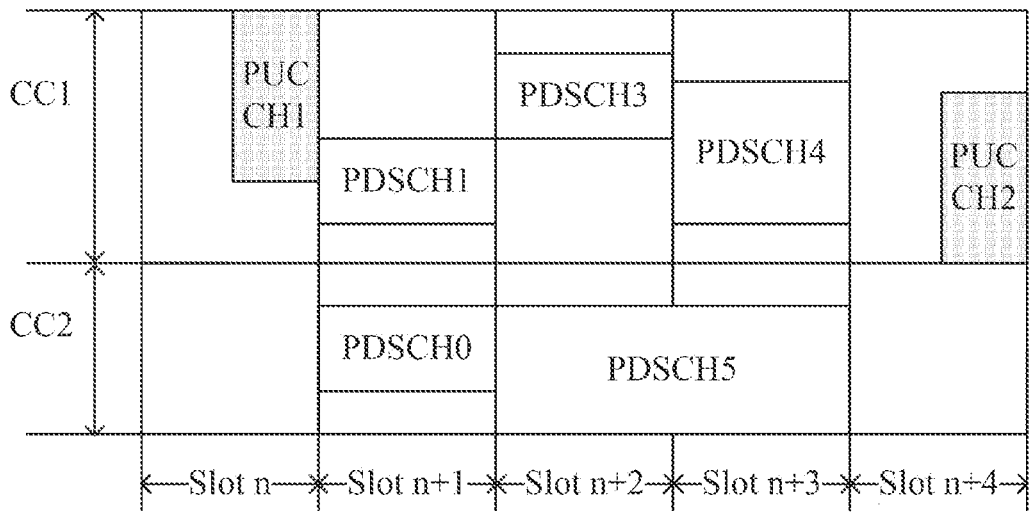
FIG. 11C is a schematic diagram illustrating that N first-type information elements are N PDSCHs between two HARQ-ACK feedback resources of one HARQ process number in one frequency domain bandwidth group according to an embodiment of the present disclosure.

Further, time domain positions occupied by the N first-type information elements are located between two consecutive (or twice) HARQ-ACK feedback resources of a predetermined type, where the HARQ-ACK feedback resources of the predetermined type include HARQ-ACK feedback resources of a PDSCH/TB/CW with the same process number in one frequency domain bandwidth or one frequency domain bandwidth group and no HARQ-ACK feedback resource of the predetermined type exists between time domain resources where the two consecutive HARQ-ACK feedback resources of the predetermined type are located. As shown in FIG. 11C, CC1 and CC2 share an HARQ-entity in a MAC layer, and N PDSCH/PUSCHs between two HARQ-ACK feedbacks of one HARQ-Process (such as a process number 1) of the HARQ-entity constitute the N first-type information elements. There is no HARQ-ACK feedback resource for a PDSCH whose process number is HARQ-Process1 in slot (n+1) to slot (n+3).

Further, HARQ-ACK feedback bits of the N first-type information elements satisfy at least one of the following characteristics: the N first-type information elements correspond to one group of HARQ-ACK feedback bits, N groups HARQ-ACK feedback bits of the N first-type information elements are agreed to be the same, or the HARQ-ACK feedback bits of the N first-type information elements fall within the same time unit.

Further, when the intersection between the pieces of transmission information included in the N first-type information elements is non-empty, or when the intersection between the pieces of transmission information included in the N first-type information elements is non-empty and a difference set between the pieces of transmission information included in the N first-type information elements is empty, the N first-type information elements correspond to one soft buffer, or information in different soft buffers corresponding to the N first-type information elements can be combined.

Embodiment Four

In the embodiment, whether an intersection between N first-type information elements is empty and/or whether a difference between the N first-type information elements is empty are determined, where the N first-type information elements satisfy at least one of characteristics described below.

Characteristic one: The N first-type information elements correspond to the same process number.

Characteristic two: HARQ-ACK feedback bits of the N first-type information elements satisfy at least one of the following characteristics: the N first-type information elements correspond to one HARQ-ACK feedback bit, N HARQ-ACK feedback bits of the N first-type information elements are agreed to be the same, the HARQ-ACK feedback bits of the N first-type information elements fall within the same time unit, or the HARQ-ACK feedback bits of the N first-type information elements fall within different time units.

Figure 12:
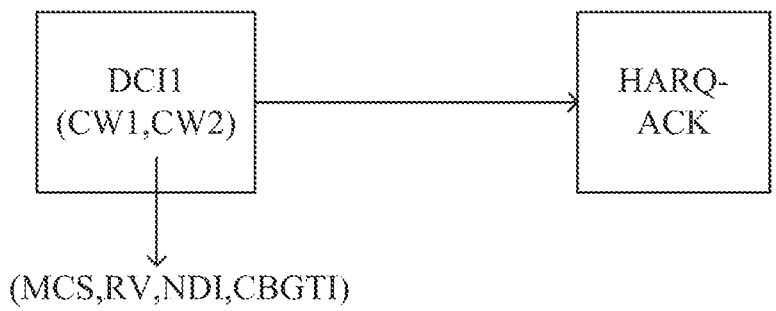
FIG. 12 is a schematic diagram illustrating that two CWs including the same transmission information are scheduled by the same piece of DCI and (MCS, NDI, RV, CBGTI) of one CW (CW2) may be used for notifying other information according to an embodiment of the present disclosure.

Characteristic three: The N first-type information elements are scheduled by one piece of DCI. As shown in FIG. 12, two CWs are scheduled by one piece of DCI. The two CWs scheduled by the one piece of DCI further include three cases described below.

Case one: An intersection between time domain resources and/or frequency domain resources occupied by the two CWs is non-empty, a difference between the time domain resources and/or the frequency domain resources occupied by the two CWs is empty, and each CW corresponds to one DMRS group and/or one quasi co-location reference signal set.

Case two: The intersection between the time domain resources and/or the frequency domain resources occupied by the two CWs is non-empty, the difference between the time domain resources and/or the frequency domain resources occupied by the two CWs is non-empty, and each CW corresponds to one DMRS group and/or one quasi co-location reference signal set.

Case three: The intersection between the time domain resources and/or the frequency domain resources occupied by the two CWs is empty, and the difference set between the time domain resources and/or the frequency domain resources occupied by the two CWs is non-empty, such as slot aggregation.

Figure 13:
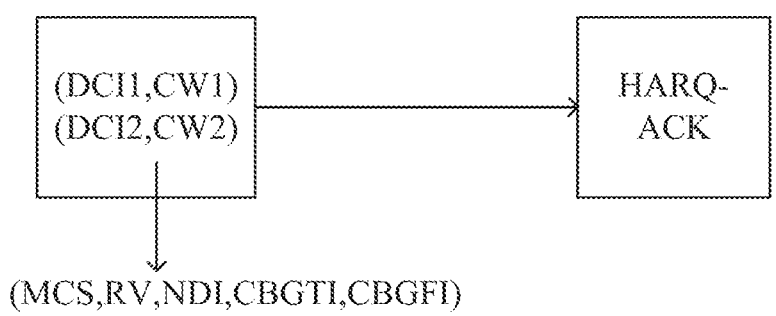
FIG. 13 is a schematic diagram illustrating that two CWs including the same transmission information are scheduled by two pieces of DCI, HARQ-ACKs of the two CWs fall within the same time unit, and (MCS, NDI, RV, CBGTI) of a CW in one piece of DCI (DCI2) may be used for notifying other information according to an embodiment of the present disclosure.

Alternatively, the N first-type information elements are scheduled by more than one piece of DCI, and the N first-type information elements correspond to one HARQ-ACK feedback bit or the N HARQ-ACK feedback bits of the N first-type information elements are agreed to be the same. As shown in FIG. 13, between two CWs, CW1 is scheduled by DCI1, CW2 is scheduled by DCI2, and HARQ-ACK feedback bits of CW1 and CW2 satisfy the preceding agreed condition.

Figures 14, 15, 16:
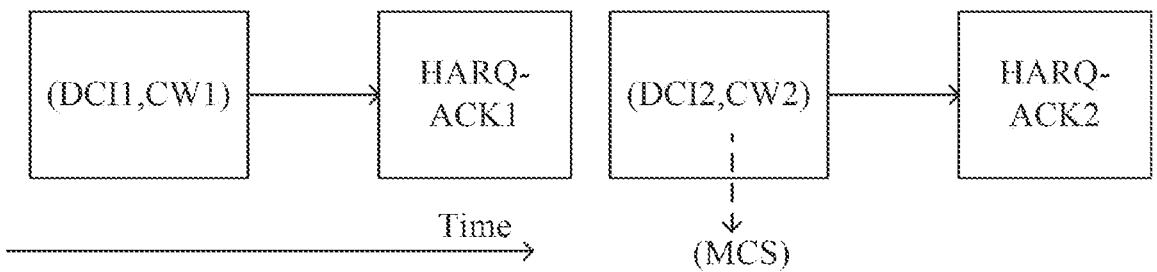
FIG. 14 is a schematic diagram illustrating that two CWs including the same transmission information include their respective HARQ-ACKs and part of an MCS bit field of a latter CW may be used for notifying other information according to an embodiment of the present disclosure.
FIG. 15 is schematic diagram one illustrating that in the case where a PDSCH occupies multiple slots, different TCIs are used for different slots and a TCI is associated with (CBGTI, CBGFI, modulation order, channel coding rate, RV, NDI) according to an embodiment of the present disclosure.
FIG. 16 is a schematic diagram illustrating that in the case where a PDSCH occupies multiple time domain symbol sets, different TCIs are used for different time domain symbol sets and a TCI is associated with (CBGTI, CBGFI, modulation order, channel coding rate, RV, NDI) according to an embodiment of the present disclosure.

Alternatively, the N first-type information elements are scheduled by more than one piece of DCI, and the HARQ-ACK feedback bits of the N first-type information elements do not need to satisfy the preceding agreed condition and are independent of each other. As shown in FIG. 14, between two CWs, CW1 is scheduled by DCI1, an NACK is fed back after CW1 is transmitted, and CW2 is scheduled by DCI2 which indicates that CW2 is a retransmission of CW1.

The N first-type information elements described in another embodiment of the present disclosure may satisfy any one or more of characteristics one to three described in this embodiment.

Embodiment Five

In the embodiment, a repeated transmission in N first-type information elements (that is, an intersection between pieces of transmission information included in the N first-type information elements is non-empty) is associated with at least one of a mapping table (that is, a mapping relationship) between a bit field indication value (that is, a bit field value) corresponding to a predetermined bit field (that is, a bit indication field) in DCI and an indicated parameter value or the number of information bits included in a predetermined bit field in DCI, where N is a positive integer greater than or equal to 2.

Further, the mapping table corresponding to the predetermined bit field may also be referred to as a parameter indicated by the predetermined bit field.

Further, the predetermined bit field in the DCI is a predetermined bit field in one or more pieces of DCI among at least one piece of DCI.

Further, when the intersection between the pieces of transmission information included in the N first-type information elements is non-empty, the mapping table corresponding to the predetermined bit field in the DCI is one table such as Table 1. When the intersection between the pieces of transmission information included in the N first-type information elements is empty, the mapping table corresponding to the predetermined bit field in the DCI is another table such as Table 2.

Further, Table 1 and Table 2 satisfy at least one of the following characteristics: a difference between parameter type sets included in Table 1 and Table 2 is non-empty, an intersection between parameter type sets included in Table 1 and Table 2 is empty, or a parameter type set indicated by one mapping table is a subset of a parameter type set indicated by the other bit field.

Specifically, when it is determined that an intersection between pieces of transmission information included in two TB/CWs included in one piece of DCI is non-empty, in a 5-bit MCS bit field corresponding to one TB/CW in the DCI, only two bits are used for indicating Modulation, that is, a modulation order, and the remaining three bits are not used for indicating an MCS since a TB size of a repeatedly transmitted TB may be obtained according to one of the TBs. The remaining three bits in the MCS are used for notifying other information, such as a time domain resource and/or a frequency domain resource corresponding to the one TB/CW and/or information about a difference of the one TB/CW and/or HARQ-ACK feedback information of the two TB/CWs. That is, the MCS bit field is divided into two bit groups, one bit group includes two bits for notifying the modulation order, and the other bit group includes three bits for notifying the time domain resource and/or the frequency domain resource and/or the information about the difference of the one TB/CW and/or the HARQ-ACK feedback information of the two TB/CWs and/or other information. Therefore, when a difference between time domain resources and/or frequency domain resources occupied by the two CWs in the one piece of DCI is non-empty or the intersection between the pieces of transmission information included in the two TB/CWs is non-empty, the two TB/CWs have the same (MCS, RV) and only one bit notification field is required, where bit notification fields (MCS, RV, NDI) of one TB/CW may be used for notifying other information which may be any information that can be notified in the DCI, such as information about rate matching.

When it is determined that the intersection between the pieces of transmission information included in the two TB/CWs included in the one piece of DCI is non-empty, indication fields (CBGTI, CBGFI) corresponding to one TB/CW in the DCI are not used for indicating information about a transmission of a CBG and a contamination situation of a CBG and may be used for notifying other information.

When it is determined that the intersection between the pieces of transmission information included in the two TB/CWs included in the one piece of DCI is empty, (MCS, RV, NDI, CBGTI, CBGFI) corresponding to each TB/CW in the DCI are used for notifying its respective (MCS, RV, NDI, CBGTI, CBGFI) and not used for notifying other information.

Alternatively, when it is determined that the two TB/CWs included in the one piece of DCI are not repeated transmissions (that is, the intersection between the pieces of transmission information included in the two TB/CWs is empty), bit fields (MCS, RV, NDI, CBGTI, CBGFI) corresponding to each TB/CW in the DCI correspond to 5 bits, 2 bits, 1 bit, 4 bits and 1 bit, respectively. When it is determined that the two TB/CWs included in the one piece of DCI are repeated transmissions (that is, the intersection between the pieces of transmission information included in the two TB/CWs is non-empty), at least one of the bit fields (MCS, RV, NDI, CBGTI, CBGFI) corresponding to one TB/CW in the DCI correspond to zero bits.

Similarly, the preceding methods are also applicable to the case where the N first-type information elements are scheduled by N pieces of DCI. When the intersection between the pieces of transmission information included in the N first-type information elements is non-empty, some or all bits in a bit indication field of at least one of bit fields (MCS, RV, NDI, CBGTI, CBGFI) corresponding to P TB/CWs scheduled by P pieces of DCI among the N pieces of DCI are used for indicating other information.

Alternatively, When the intersection between the pieces of transmission information included in the N first-type information elements is non-empty, the number of bits in a bit indication field of at least one of bit fields (MCS, RV, NDI, CBGTI, CBGFI) corresponding to one TB/CW scheduled by the P pieces of DCI among the N pieces of DCI is 0 or the number of bits is less than the number of bits in the case of no repeated transmission.

The P pieces of DCI among the N pieces of DCI are determined according to at least one of: indexes of control resource set (CORESET)/search spaces where the N pieces of DCI are located, indexes of control channel resource groups where the N pieces of DCI are located, an index of a start CCE of each of the N pieces of DCI, or an index of a time domain resource occupied by each of the N pieces of DCI.

For example, the P pieces of DCI among the N pieces of DCI are P pieces of DCI with lowest indexes or highest indexes. Alternatively, (MCS, RV, NDI, CBGTI, CBGFI) in only DCI with a lowest index among the N pieces of DCI are used for indicating (MCS, RV, NDI, CBGTI, CBGFI) in sequence and at least one of (MCS, RV, NDI, CBGTI, CBGFI) in other DCI is used for transmitting other information. Alternatively, the number of bits in a bit field of at least one of (MCS, RV, NDI, CBGTI, CBGFI) in these pieces of DCI is reduced.

Embodiment Six

In the embodiment, a repeated transmission in N first-type information elements (that is, an intersection between pieces of transmission information included in the N first-type information elements is non-empty) is associated with at least one of the number of bits of each of the pieces of transmission information included in the N first-type information elements.

Further, when the intersection between the pieces of transmission information included in the N first-type information elements is non-empty, the number of bits of each of the pieces of transmission information included in the N first-type information elements including the repeated transmission is obtained according to a fourteenth-type parameter corresponding to one of the N first-type information elements. For example, when it is determined that two TB/CWs include a repeated transmission, the number of bits of each of pieces of transmission information included in the two TB/CWs is obtained according to (MCS, PRB) of one TB. Specifically, when it is determined that two TBs include the same information, the following is obtained according to R and $Q_m$ included in MCS indication information of one TB, $N_{RE}$ obtained from the number $n_{PRB}$ of allocated PRBs, and the following formulas (1) to (3):

$$N_{info} = N_{RE} \cdot RQ_m \cdot \upsilon \tag{1}$$

$$N'_{info} = \max\left(24, 2^n \cdot \left\lfloor \frac{N_{info}}{2^n} \right\rfloor\right) \tag{2}$$

$$n = \max(3, \lfloor \log_2(N_{info}) \rfloor - 6) \tag{3}$$

where $N_{RE}$ denotes the number of subcarriers corresponding to the one TB, $N_{info}$ denotes the number of bits of first transmission information, $N'_{info}$ denotes the number of bits of second transmission information, R denotes a channel coding rate, $Q_m$ denotes a modulation order, that is, the number of bits after channel coding and carried in one modulation symbol, $n_{PRB}$ denotes the number of allocated PRBs, υ denotes the number of layers corresponding to the one TB, and n is a positive integer obtained according to the number of bits of the first transmission information.

Then, a TB size (TBS) is obtained by looking up a table according to the number $N'_{info}$ of bits of the second transmission information, where $N'_{info}$ and the TBS are given in the table (that is, the number of bits of transmission information and the TBS obtained according to a fourth predetermined rule).

When an intersection between the pieces of transmission information included in the two TB/CWs is non-empty, the number of bits of each of the pieces of transmission information included in the two CW/TBs is obtained according to a fourteenth-type parameter corresponding to one of the CW/TBs. A specific acquisition according to the fourteenth-type parameter corresponding to the one CW/TB may be at least one of a default acquisition according to a parameter of TB1, an acquisition according to a TB with a minimum MCS value or an acquisition according to a TB with the minimum number of layers.

Alternatively, two TBSs are obtained according to fourteenth-type parameters corresponding to the two CW/TBs, the number of bits of transmission information included in the intersection between the pieces of transmission information included in the two TB/CWs is a smaller value of the two TBSs, and/or the number of transmission bits included in a difference between the pieces of transmission information included in the two TB/CWs is a difference between the two TBSs.

Further, if two DMRS groups in one CW shown in FIG. 6B are repeatedly transmitted, different DMRS groups are from different TRPs, and each DMRS group includes an entire piece of TB information, that is, TB1 corresponding to CW1 is included in both a DMRS group 1 and a DMRS group 2, the number of layers, v, in the preceding formula (1) corresponds to the number of layers included in one of more than one DMRS group of the one CW, such as the number of layers included in the DMRS group 1 or the minimum number of layers included in the DMRS group 1 and the DMRS group 2. Alternatively, it is limited that the two DMRS groups include the same number of layers. Further, if the different DMRS groups correspond to different fourteenth-type parameters, the number of bits needs to be acquired according to a fourteenth-type parameter corresponding to one of the DMRS groups.

Generally, a resource mapping of one CW is a mapping to a layer, a mapping to frequency domain and a mapping to time domain in sequence. However, in this case, it cannot be ensured that each DMRS in FIG. 6B includes the entire piece of TB information. Therefore, the resource mapping of the one CW may use manners described below.

Resource mapping manner one: The resource mapping of the one CW is the mapping to the frequency domain, the mapping to the time domain and the mapping to the layer in sequence.

Resource mapping manner two: Alternatively, though the one CW corresponds to the two DMRS groups, a sequence of the one CW before channel scrambling and modulation and after channel coding includes all bits carried in the two DMRS groups. For example, the one CW includes 100 bits, first 50 bits and last 50 bits of the 100 bits preferably have different RVs/the same RV of one TB and then the one CW is mapped to the layer, to the frequency domain, and to the time domain in one DMRS group (which, for example, includes two DMRS ports, that is, two layers) and then mapped to the layer, to the frequency domain, and to the time domain in the other DMRS group. The layer corresponds to the DMRS port in the preceding description.

In the preceding resource mapping manners one and two, though the one CW corresponds to the two DMRS groups, the sequence of the one CW before channel scrambling and modulation and after channel coding includes all the bits carried in the two DMRS groups. For example, the one CW includes 100 bits, the first 50 bits and the last 50 bits of the 100 bits preferably have different RVs/the same RV of one TB.

Resource mapping manner three: One TB corresponds to two CWs, each CW corresponds to two coded sequences of the one TB, each of the two CWs corresponds to one DMRS group, and each CW is mapped to the layer, to the frequency domain, and to the time domain in its respective CW. For example, a first bit sequence of the same TB after channel coding corresponds to a first DMRS group and a first CW. The first bit sequence after channel coding includes 50 bits. A second bit sequence of the same TB after channel coding corresponds to a second DMRS group and a second CW. The second bit sequence after channel coding includes 60 bits.

The fourteenth-type parameter includes a parameter required for acquiring the TBS. For example, the fourteenth-type parameter includes at least one of the following transmission parameters: a modulation order, the number of layers of a DMRS, a channel coding rate, the number of subcarriers occupied by a rate matching resource, the number of subcarriers allocated before rate matching, the number of subcarriers occupied after rate matching or channel coding information (such as a maximum number of information bits included in a code block at the time of channel coding).

Further, if the two DMRS groups in the one CW shown in FIG. 6B are repeatedly transmitted, different DMRS groups are from different TRPs, each DMRS group includes the entire piece of TB information, that is, TB1 corresponding to CW1 is included in both the DMRS group 1 and the DMRS group 2, and different DMRS groups correspond to different fourteenth-type parameters, two TBSs are obtained according to the two DMRS groups, the number of bits of transmission information included in an intersection between pieces of transmission information included in PDSCHs corresponding to the two DMRS groups is a smaller value of the two TBSs, and/or the number of transmission bits included in a difference set between the pieces of transmission information included in the PDSCHs corresponding to the two DMRS groups is a difference between the two TBSs.

Embodiment Seven

In the embodiment, whether N TBs include a repeated transmission (that is, an intersection between pieces of transmission information included in N first-type information elements is non-empty) is determined according to a first agreed rule. Specifically, when one piece of DCI is scrambled by an MCS-C-RNTI and indicates two CW/TB/CBG/CB/DMRS groups, the two CW/TBs include a repeated transmission.

Alternatively, N pieces of DCI are all scrambled by the MCS-C-RNTI, and parameters of the N first-type information elements scheduled by the N pieces of DCI satisfy a first agreed condition. Then, the N first-type information elements include the repeated transmission. Specifically, the first agreed condition includes at least one of conditions described below.

Agreed condition one: When an intersection between time domain resources and/or frequency domain resources occupied by the N first-type information elements is non-empty, the N first-type information elements include the repeated transmission. For example, when an intersection between time domain resources and/or frequency domain resources occupied by N PDSCHs is non-empty, CW/TBs with the same index in the N PDSCHs are repeatedly transmitted.

Agreed condition two: A resource span of the time domain resources and/or the frequency domain resources occupied by the N first-type information elements satisfies a second agreed condition. For example, when the N first-type information elements fall within the same time unit (such as a slot or a predetermined set of time domain symbols in a slot) and/or the N first-type information elements fall within the same BWP, CW/TBs with the same index among the N first-type information elements are repeatedly transmitted.

Agreed condition three: The N first-type information elements correspond to the same process number.

Agreed condition four: HARQ-ACK feedback bits of the N first-type information elements satisfy at least one of the following characteristics: the N first-type information elements correspond to one HARQ-ACK feedback bit/one group of HARQ-ACK feedback bits, N HARQ-ACK feedback bits/N groups HARQ-ACK feedback bits of the N first-type information elements are agreed to be the same, or the HARQ-ACK feedback bits of the N first-type information elements fall within the same time unit.

Agreed condition five: Time domain positions occupied by the N first-type information elements are located between two consecutive HARQ-ACK feedback resources of a predetermined type, where the HARQ-ACK feedback resources of the predetermined type include HARQ-ACK feedback resources of PDSCH/TB/CWs with the same process number in a frequency domain bandwidth or a frequency domain bandwidth group, and no HARQ-ACK feedback resource of the predetermined type exists between time domain resources where the two consecutive HARQ-ACK feedback resources of the predetermined type are located.

Agreed condition six: Quasi co-location reference signals indicated in a TCI corresponding to the N first-type information elements with respect to one type of quasi co-location parameter are different or do not satisfy a quasi co-location relationship. Alternatively, when fourth-type parameters corresponding to the N first-type information elements are the same, the intersection is empty; when the fourth-type parameters are different, the intersection is non-empty (when the fourth-type parameters are different, whether the intersection is empty is further determined according to a fifth-type parameter), where the fourth-type parameter and/or the fifth-type parameter include at least one of the following parameters: a transmission configuration indicator (TCI), the channel coding rate, the modulation order, the number of layers of the DMRS, the number of PRBs, the number of time domain symbols, the number of subcarriers occupied by the rate matching resource, the number of bits of transmission information obtained according to a fourth predetermined rule or a product of the channel coding rate, the number of layers of the DMRS and the number of subcarriers obtained according to a third predetermined rule. A difference set between the fourth-type parameter and the fifth-type parameter is non-empty.

The TCI may also be referred to as configuration information of a quasi co-location reference signal. That two pieces of transmission configuration information are different includes one of the following: quasi co-location reference signals configured in the two pieces of transmission configuration information with respect to one type of quasi co-location parameter do not satisfy the quasi co-location relationship, or quasi co-location reference signals configured in the two pieces of transmission configuration information with respect to one type of quasi co-location parameter are different.

The agreed condition may also be referred to as a predetermined condition.

Embodiment Eight

In the embodiment, whether N first-type information elements include a repeated transmission (that is, an intersection between pieces of transmission information included in the N first-type information elements is non-empty) is determined through first signaling information and/or a first agreed rule, where at least two of the N first-type information elements are located in different component carriers (CCs)/BWPs, and N is a positive integer greater than or equal to 2.

Figure 18:
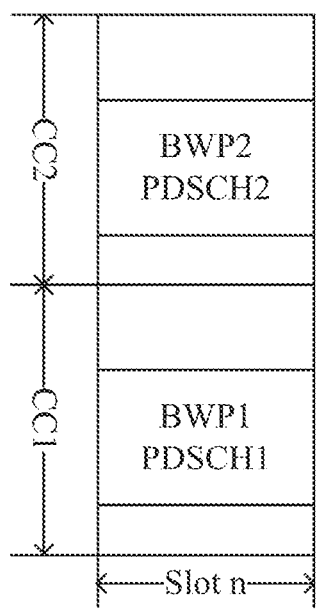
FIG. 18 is a schematic diagram illustrating that PDSCH1 and PDSCH2 belonging to different CCs and falling within the same slot include the same transmission information according to an embodiment of the present disclosure.
Figure 19:
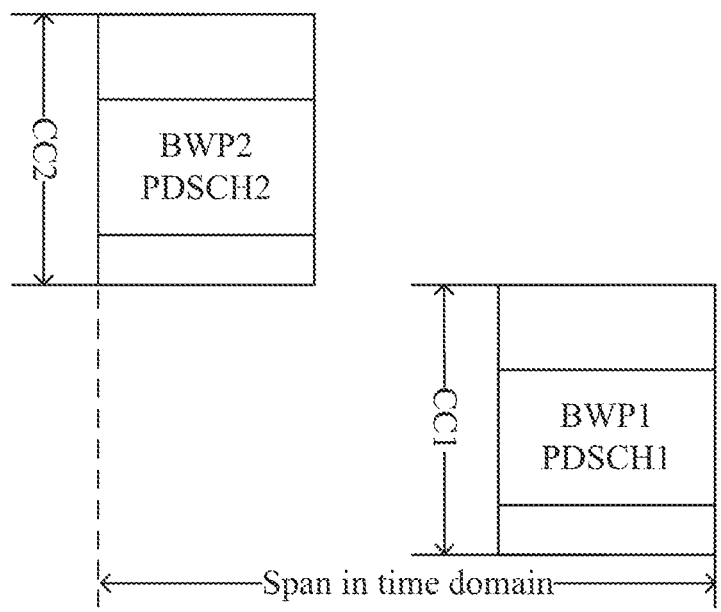
FIG. 19 is a schematic diagram illustrating that PDSCH1 and PDSCH2 belonging to different CCs and falling within different slots include the same transmission information according to an embodiment of the present disclosure.

Further, a time domain span where the N first-type information elements are located is less than a predetermined range. A span of time domain resources represents the number of time units between a first time unit and a last time unit in a union of time domain resources occupied by the N first-type information elements. As shown in FIG. 18, PDSCH1 and PDSCH2 including repeatedly transmitted information need to fall within the same slot. As shown in FIG. 19, PDSCH1 and PDSCH2 including the repeatedly transmitted information may fall within different slots but the time domain span cannot be greater than a predetermined value. Optionally, the slot is defined by a minimum subcarrier spacing of two CCs.

Further, the N first-type information elements need to fall within the same second time unit, where the second time unit includes one or more slots or one or more time domain symbols. A division of the second time unit is obtained according to a predetermined rule.

Further, a correspondence exists between parameters corresponding to two information elements (that is, the first-type information elements) located in different CCs, where each of the parameters is at least one of a process number, a DAI, a CC index, a BWP index, a HARQ process number, RV, a modulation order or a channel coding rate (that is, a third-type parameter). For example, if a correspondence is established between (CC1, BWP1/DAI1/HARQ process number1/RV1/MCS1) and (CC2, BWP2/DAI2/HARQ process number2/RV2/MCS2) through signaling information, an intersection between pieces of transmission information included in an information element corresponding to a parameter combination (CC1, BWP1/DAI1/HARQ process number1/RV1/MCS1) in CC1 and an information element corresponding to a parameter combination (CC2, BWP2/DAI2/HARQ process number2/RV2/MCS2) in CC2 is non-empty, where the information elements fall within a certain time domain span and/or HARQ-ACK feedbacks of the information elements satisfy characteristic one, and (CC1, BWP1/DAI1/HARQ process number1/RV1/MCS1) may be (CC1, BWP1/DAI1/HARQ process number1/RV1/MCS1) corresponding to an information element notified in current DCI. To establish the correspondence between the parameters, multiple correspondences are configured at a higher layer and which one of the multiple correspondences may be notified in DCI. For example, correspondences in Table 2 are configured in configuration information of CC1 or a BWP of CC1, and which one of the correspondences is specifically selected in the DCI. The information element notified in the current DCI in Table 2 may include repeatedly transmitted information with information elements in more than one CC, where m, n and p are positive integers greater than or equal to 1. Alternatively, the correspondence is directly notified through RRC/MAC-CE instead of being dynamically notified in the DCI. As shown in Table 3, if {(CC21, BWP21/DAI21/process number 21/RV21/MCS21), (CC22, BWP22/DAI22/process number 22/RV22/MCS22), (CC2n, BWP2n/DAI2n/process number 2n/RV2n/MCS2n)} is configured in configuration information of a CORESET in Table 8, parameters (CC11, BWP11/DAI11/process number 11/RV11/MCS11) are (CC11, BWP11/DAI11/process number 11/RV11/MCS11) corresponding to an information element scheduled by DCI in the CORESET. If Table 8 is configured in the configuration information of the BWP, (CC11, BWP11/DAI11/process number 11/RV11/MCS11) needs to be notified via semi-static signaling. In Table 2 and Table 3, BWP2i (where i=1, 2, ... , n), BWP3j (where j=1, 2, ... , m) and BWP4k (where k=1, 2, ... , p) are configured at the higher layer or may be activated BWPs of CC2i (where i=1, 2, ... , n), CC3j (where j=1, 2, ... , m) and CC4k (where k=1, 2, ... , p).

TABLE 2

| Bit value of a correspondence in DCI | Seventh-type parameter corresponding to an information element including transmission information whose intersection with transmission information included in a current information element in (CC1, BWP1) notified in DCI is non-empty |
|---|---|
| 00 | No repeated transmission |
| 01 | {(CC21, BWP21/DAI21/process number 21/RV21/MCS21), (CC22, BWP22/DAI22/process number 22/RV22/MCS22), ... , (CC2n, BWP2n/DAI2n/process number 2n/RV2n/MCS2n)} |
| 10 | {(CC31, BWP31/DAI31/process number 31/RV31/MCS31), (CC32, BWP32/DAI32/process number 32/RV32/MCS32), ... , (CC3m, BWP3m/DAI3m/process number 3m/RV3m/MCS3m)} |
| 11 | {(CC41, BWP41/DAI41/process number 41/RV41/MCS41), (CC42, BWP42/DAI42/process number 42/RV42/MCS42), ... , (CC4p, BWP4p/DAI4p/process number 4p/RV4p/MCS4p)} |

TABLE 3

| (CC11, BWP11/DAI11/ process number 11/RV11/MCS11) | {(CC21, BWP21/DAI21/process number 21/RV21/MCS21), (CC22, BWP22/DAI22/process number 22/RV22/MCS22), ... , (CC2n, BWP2n/DAI2n/process number 2n/RV2n/MCS2n)} |
|---|---|

Further, when HARQ-ACK feedback bits of the two information elements located in the different CCs satisfy characteristic one, characteristic one includes at least one of the following: the two information elements correspond to one HARQ-ACK feedback bit, two HARQ-ACK feedback bits of the two information elements are predetermined to be the same, or the HARQ-ACK feedback bits of the two information elements fall within the same time unit. Alternatively, when the two information elements located in the different CCs include repeatedly transmitted information, the HARQ-ACK feedback bits of the two information elements satisfy the preceding characteristic one.

In standards of the related art, one CC group corresponds to one MAC entity, one MAC entity allocates one HARQ entity to each CC, one HARQ entity corresponds to one or more HARQ processes, and each TB/CW in one HARQ process corresponds to one soft buffer. When an NDI corresponding to a TB/CW corresponding to a soft buffer indicates new data, information in the soft buffer is cleared and current data is put into the soft buffer. When the NDI corresponding to the TB/CW corresponding to the soft buffer indicates a repeated transmission, currently transmitted data is combined with data in the soft buffer and then put into the soft buffer. Alternatively, when CBGFI corresponding to the TB/CW corresponding to the soft buffer indicates contaminated data, no processing is performed on the soft buffer.

Figure 20:
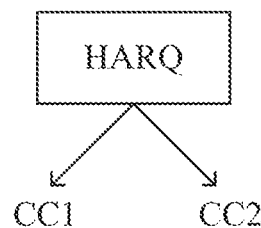
FIG. 20 is a schematic diagram illustrating that two CCs share one HARQ entity.
Figure 21:
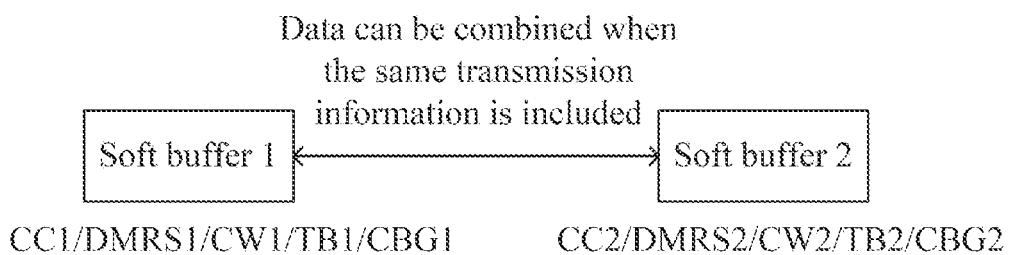
FIG. 21 is a schematic diagram illustrating that two soft buffers including the same transmission information may be combined.
Figure 22:
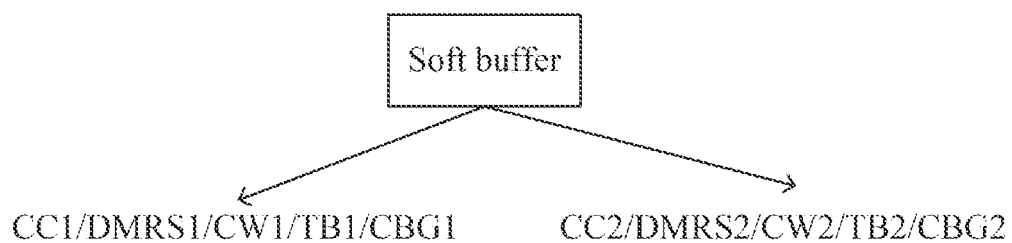
FIG. 22 is a schematic diagram illustrating that two first-type information elements including the same transmission information share one soft buffer.

However, when the preceding scheme is used, two CCs including the same transmission information need to share one HARQ entity, as shown in FIG. 20. Alternatively, the N first-type information elements correspond to N soft buffers. When an intersection between the N first-type information elements is non-empty or when the intersection between the N first-type information elements is non-empty and a difference is empty, data/information in the N soft buffers corresponding to the N first-type information elements may be subjected to soft combining or the number of soft buffers corresponding to the N first-type information elements is less than N. The soft combining includes combining respective demodulated soft information before being sent to a channel decoder. Alternatively, when data with the same RV is repeatedly transmitted, received data may be directly combined. Of course, as an implementation at a receiving end, other combination manners are not excluded. As shown in FIG. 21, when the intersection between the pieces of transmission information included in the N first-type information elements is non-empty or when the intersection between the N first-type information elements is non-empty and the difference is empty, the data in the soft buffers corresponding to the N first-type information elements may be subjected to the soft combining. In FIG. 21, N=2, and two first-type information elements include one of two PDSCHs with different CC indexes, two CW/TB/CBGs scheduled by one piece of DCI or two CW/TB/CBGs scheduled by more than one piece of DCI. Alternatively, as shown in FIG. 22, the N first-type information elements share one soft buffer.

Another embodiment of the present disclosure provides a method for transmitting an information element. The method includes:
  determining correspondence between an eleventh-type parameter and a twelfth-type parameter according to signaling information and/or a predetermined rule; and
  determining thirteenth-type parameter and/or the eleventh-type parameter of the information element according to the correspondence.

The eleventh-type parameter includes one of a quasi co-location reference signal set, a group where a quasi co-location reference signal set is located, a transmission configuration indicator (TCI) state, a TCI state group, a demodulation reference signal (DMRS) port group, a time domain resource set, a frequency domain resource set, a first-type process number set or a control channel resource group.

The twelfth-type parameter includes at least one of the thirteenth-type parameter or a difference or a difference set between two thirteenth-type parameters corresponding to values of two eleventh-type parameters.

An intersection between quasi co-location parameter sets associated with different quasi co-location reference signal sets is non-empty and/or a difference set between the quasi co-location parameter sets associated with the different quasi co-location reference signal sets is empty; one quasi co-location reference signal set corresponds to one TCI state index; and one TCI state may include one or more quasi co-location reference signal sets, with different quasi co-location reference signal sets corresponding to different DMRS groups.

The step of determining the correspondence between the eleventh-type parameter and the twelfth-type parameter includes at least one of steps described below:
  the correspondence is determined through the signaling information;
  configuration information of one type of parameter includes a value of another type of parameter corresponding to the one type of parameter;
  a parameter for acquiring one type of parameter includes another type of parameter.

The one type of parameter and the other type of parameter belong to {the eleventh-type parameter, the twelfth-type parameter}.

The step in which the thirteenth-type parameter and/or the eleventh-type parameter of the information element are determined according to the correspondence includes at least one of steps described below:
  a value of the thirteenth-type parameter of the information element is acquired according to a value of a thirteenth-type parameter with a correspondence to a value of the eleventh-type parameter of the information element;
  a value of the thirteenth-type parameter of the information element is acquired according to a difference with a thirteenth-type parameter with a correspondence to a value of the eleventh-type parameter of the information element and a reference value of the thirteenth-type parameter;
  a value of the thirteenth-type parameter of the information element is acquired according to a difference set with a thirteenth-type parameter with a correspondence to a value of the eleventh-type parameter of the information element and a reference set of the thirteenth-type parameter;
  a value of another type of parameter of the information element is determined according to a value of one type of parameter corresponding to the information element and the correspondence.

The one type of parameter and the other type of parameter belong to {the eleventh-type parameter, the twelfth-type parameter}.

The reference value or the reference set of the thirteenth-type parameter is acquired in at least one of manners described below.

The reference value or the reference set is acquired according to information about the thirteenth-type parameter indicated in control signaling for scheduling the information element. The reference value or the reference set is acquired according to a thirteenth-type parameter corresponding to a predetermined portion of the information element.

The method satisfies at least one of characteristics described below:
  K time units scheduled by one piece of DCI correspond to values of J eleventh-type parameters and/or J thirteenth-type parameters, where K is a positive integer greater than or equal to J;
  Z repeated transmissions of one piece of transmission information correspond to values of W eleventh-type parameters and/or W thirteenth-type parameters, where Z is a positive integer greater than or equal to W;
  a value of a thirteenth-type parameter in a first-type time unit of K time units scheduled by one piece of DCI is acquired according to information about the thirteenth-type parameter indicated in the one piece of DCI;
  a value of a thirteenth-type parameter in a second-type time unit of K time units scheduled by one piece of DCI is acquired according to a difference between information about the thirteenth-type parameter indicated in the one piece of DCI and information about a thirteenth-type parameter having a correspondence with a value of an eleventh-type parameter of the second-type time unit;
  a value of a thirteenth-type parameter in a first-type time unit of K time units scheduled by one piece of DCI is acquired according to information about the thirteenth-type parameter indicated in the one piece of DCI;
  a value of a thirteenth-type parameter of a predetermined repeated transmission of Z repeated transmissions of one piece of transmission information is acquired according to information about the thirteenth-type parameter indicated in DCI for scheduling the one piece of transmission information;
  a value of a thirteenth-type parameter of each repeated transmission other than a predetermined repeated transmission of Z repeated transmissions of one piece of transmission information is acquired according to a difference between a value of the thirteenth-type parameter indicated in DCI for scheduling the one piece of transmission information and information about a thirteenth-type parameter having a correspondence with a value of an eleventh-type parameter of the each repeated transmission other than the predetermined repeated transmission;
  the thirteenth-type parameter is updated or changed with the eleventh-type parameter; among Z repeated transmissions, two repeated transmissions at least exist which satisfy a fifth characteristic, where the fifth characteristic includes at least one of the following: a difference or a difference set between values of eleventh-type parameters corresponding to the two repeated transmissions is non-zero or non-empty, or a difference or a difference set between values of thirteenth-type parameters corresponding to the two repeated transmissions is non-zero or non-empty; or
  among K time units, two time units at least exist which satisfy a sixth characteristic, where the sixth characteristic includes at least one of the following: a difference or a difference set between values of eleventh-type parameters corresponding to the two time units is non-zero or non-empty, or a difference or a difference set between values of thirteenth-type parameters corresponding to the two time units is non-zero or non-empty.

The thirteenth-type parameter includes at least one of: code block group transmission information (CBGTI), code block group flushing out information (CBGFI), a generation parameter of a channel scrambling sequence, a reference signal sequence generation parameter, a modulation order, a channel coding rate, a redundancy version (RV), a new data indicator, information about rate matching, a time domain resource, a frequency domain resource, a maximum number of code block groups (CBGs) included in one transport block (TB) or one codeword (CW), a second-type process number set, a physical uplink control channel (PUCCH) resource set, a time advance (TA), a Hybrid Automatic Repeat Request acknowledgement (HARQ-ACK) feedback codebook or a process number of a data channel for semi-persistent scheduling.

The first-type process number set and/or the second-type process number set satisfy at least one of characteristics described below:
  an intersection between different process number sets is empty;
  different process number sets correspond to different HARQ-ACK feedback codebooks; HARQ-ACKs of channels corresponding to the same process number set are fed back in one HARQ-ACK feedback codebook;
  HARQ-ACKs of channels corresponding to different process number sets are fed back in different HARQ-ACK feedback codebooks;
  HARQ-ACKs of channels corresponding to the same process number set are fed back in one PUCCH or one physical uplink shared channel (PUSCH); or
  HARQ-ACKs of channels corresponding to different process number sets are fed back in different PUCCHs or different PUSCHs.

The PUCCH resource set satisfies at least one of characteristics described below:
  PUCCH resources in different PUCCH resource sets are capable of being sent in the same time unit;
  different PUCCH resources in one PUCCH resource set are incapable of being sent in the same time unit;
  HARQ-ACKs of downlink channels corresponding to the same PUCCH resource set are fed back in one HARQ-ACK feedback codebook;
  different PUCCH resource sets correspond to different HARQ-ACK feedback codebooks; HARQ-ACKs of downlink channels corresponding to different PUCCH resource sets are fed back in different HARQ-ACK feedback codebooks;
  HARQ-ACKs of downlink channels corresponding to the same PUCCH resource set are fed back in one PUCCH or one PUSCH;
  HARQ-ACKs of downlink channels corresponding to different PUCCH resource sets are fed back in different PUCCHs or different PUSCHs; or
  the PUCCH resource set includes a set of candidate PUCCH resources for feeding back HARQ-ACK.

Another embodiment of the present disclosure provides an apparatus for transmitting an information element. The apparatus includes a third determination module and a fourth determination module.

The third determination module is configured to determine a correspondence between an eleventh-type parameter and a twelfth-type parameter according to signaling information and/or a predetermined rule.

The fourth determination module is configured to determine a thirteenth-type parameter and/or the eleventh-type parameter of the information element according to the correspondence.

The eleventh-type parameter includes one of a quasi co-location reference signal set, a group where a quasi co-location reference signal set is located, a transmission configuration indicator (TCI) state, a TCI state group, a demodulation reference signal (DMRS) port group, a time domain resource set, a frequency domain resource set, a first-type process number set or a control channel resource group.

The twelfth-type parameter includes at least one of the thirteenth-type parameter, or a difference or a difference set between two thirteenth-type parameters corresponding to values of two eleventh-type parameters.

An intersection between quasi co-location parameter sets associated with different quasi co-location reference signal sets is non-empty and/or a difference between the quasi co-location parameter sets associated with the different quasi co-location reference signal sets is empty; one quasi co-location reference signal set corresponds to one TCI state index; and one TCI state may include one or more quasi co-location reference signal sets, with different quasi co-location reference signal sets corresponding to different DMRS groups.

The third determination module is configured to perform at least one of operations described below:
  the correspondence is determined through the signaling information;
  configuration information of one type of parameter includes a value of another type of parameter corresponding to the one type of parameter;
  a parameter for acquiring one type of parameter includes another type of parameter.

The one type of parameter and the other type of parameter belong to {the eleventh-type parameter, the twelfth-type parameter}.

The fourth determination module is configured to perform at least one of operations described below:
a value of the thirteenth-type parameter of the information element is acquired according to a value of a thirteenth-type parameter with a correspondence to a value of the eleventh-type parameter of the information element;
  a value of the thirteenth-type parameter of the information element is acquired according to a difference with a thirteenth-type parameter with a correspondence to a value of the eleventh-type parameter of the information element and a reference value of the thirteenth-type parameter;
  a value of the thirteenth-type parameter of the information element is acquired according to a difference set with a thirteenth-type parameter with a correspondence to a value of the eleventh-type parameter of the information element and a reference set of the thirteenth-type parameter;
  a value of another type of parameter of the information element is determined according to a value of one type of parameter corresponding to the information element and the correspondence.

The one type of parameter and the other type of parameter belong to {the eleventh-type parameter, the twelfth-type parameter}.

The fourth determination module is further configured to perform an operation described below:
the reference value or the reference set of the thirteenth-type parameter is acquired in at least one of manners described below:
  the reference value or the reference set is acquired according to information about the thirteenth-type parameter indicated in control signaling for scheduling the information element, or the reference value or the reference set is acquired according to a thirteenth-type parameter corresponding to a predetermined portion of the information element.

The apparatus satisfies at least one of characteristics described below:
  K time units scheduled by one piece of DCI correspond to values of J eleventh-type parameters and/or J thirteenth-type parameters, where K is a positive integer greater than or equal to J;
  Z repeated transmissions of one piece of transmission information correspond to values of W eleventh-type parameters and/or W thirteenth-type parameters, where Z is a positive integer greater than or equal to W;

a value of a thirteenth-type parameter in a first-type time unit of K time units scheduled by one piece of DCI is acquired according to information about the thirteenth-type parameter indicated in the one piece of DCI;

a value of a thirteenth-type parameter in a second-type time unit of K time units scheduled by one piece of DCI is acquired according to a difference between information about the thirteenth-type parameter indicated in the one piece of DCI and information about a thirteenth-type parameter having a correspondence with a value of an eleventh-type parameter of the second-type time unit;

a value of a thirteenth-type parameter in a first-type time unit of K time units scheduled by one piece of DCI is acquired according to information about the thirteenth-type parameter indicated in the one piece of DCI;

a value of a thirteenth-type parameter of a predetermined repeated transmission of Z repeated transmissions of one piece of transmission information is acquired according to information about the thirteenth-type parameter indicated in DCI for scheduling the one piece of transmission information;

a value of a thirteenth-type parameter of each repeated transmission other than a predetermined repeated transmission of Z repeated transmissions of one piece of transmission information is acquired according to a difference between a value of the thirteenth-type parameter indicated in DCI for scheduling the one piece of transmission information and information about a thirteenth-type parameter having a correspondence with a value of an eleventh-type parameter of the each repeated transmission other than the predetermined repeated transmission;

the thirteenth-type parameter is updated or changed with the eleventh-type parameter; among Z repeated transmissions, two repeated transmissions at least exist which satisfy a fifth characteristic, where the fifth characteristic includes at least one of the following: a difference or a difference set between values of eleventh-type parameters corresponding to the two repeated transmissions is non-zero or non-empty, or a difference or a difference set between values of thirteenth-type parameters corresponding to the two repeated transmissions is non-zero or non-empty; or among K time units, two time units at least exist which satisfy a sixth characteristic, where the sixth characteristic includes at least one of the following: a difference or a difference set between values of eleventh-type parameters corresponding to the two time units is non-zero or non-empty or a difference or a difference set between values of thirteenth-type parameters corresponding to the two time units is non-zero or non-empty.

The thirteenth-type parameter includes at least one of: code block group transmission information (CBGTI), code block group flushing out information (CBGFI), a generation parameter of a channel scrambling sequence, a reference signal sequence generation parameter, a modulation order, a channel coding rate, a redundancy version (RV), a new data indicator, information about rate matching, a time domain resource, a frequency domain resource, a maximum number of code block groups (CBGs) includes in one transport block (TB) or one codeword (CW), a second-type process number set, a physical uplink control channel (PUCCH) resource set, a time advance (TA), a Hybrid Automatic Repeat Request acknowledgement (HARQ-ACK) feedback codebook or a process number of a data channel for semi-persistent scheduling.

The first-type process number set and/or the second-type process number set satisfy at least one of characteristics described below:

an intersection between different process number sets is empty;

different process number sets correspond to different HARQ-ACK feedback codebooks; HARQ-ACKs of channels corresponding to the same process number set are fed back in one HARQ-ACK feedback codebook;

HARQ-ACKs of channels corresponding to different process number sets are fed back in different HARQ-ACK feedback codebooks;

HARQ-ACKs of channels corresponding to the same process number set are fed back in one PUCCH or one physical uplink shared channel (PUSCH); or HARQ-ACKs of channels corresponding to different process number sets are fed back in different PUCCHs or different PUSCHs.

The PUCCH resource set satisfies at least one of characteristics described below:

PUCCH resources in different PUCCH resource sets are capable of being sent in the same time unit;

Different PUCCH resources in one PUCCH resource set are incapable of being sent in the same time unit;

HARQ-ACKs of downlink channels corresponding to the same PUCCH resource set are fed back in one HARQ-ACK feedback codebook;

Different PUCCH resource sets correspond to different HARQ-ACK feedback codebooks; HARQ-ACKs of downlink channels corresponding to different PUCCH resource sets are fed back in different HARQ-ACK feedback codebooks;

HARQ-ACKs of downlink channels corresponding to the same PUCCH resource set are fed back in one PUCCH or one PUSCH;

HARQ-ACKs of downlink channels corresponding to different PUCCH resource sets are fed back in different PUCCHs or different PUSCHs; or The PUCCH resource set includes a set of candidate PUCCH resources for feeding back HARQ-ACK.

Another embodiment of the present disclosure provides an apparatus for transmitting an information element. The apparatus includes a processor and a computer-readable storage medium. The computer-readable storage medium stores instructions which, when executed by the processor, implement any one of the preceding methods for transmitting an information element.

Another embodiment of the present disclosure provides a computer-readable storage medium. The computer-readable storage medium stores a computer program which, when executed by a processor, implements steps of any one of the preceding methods for transmitting an information element.

Embodiment Nine

In the embodiment, a TCI and/or a quasi co-location reference signal set/a time domain resource set/a DMRS port group (that is, eleventh-type parameters) are associated with a twelfth-type parameter.

The twelfth-type parameter includes at least one of a thirteenth-type parameter or a difference between values of two thirteenth-type parameters corresponding to values of two eleventh-type parameters.

The thirteenth-type parameter includes at least one of CBGTI, CBGFI, a generation parameter of a channel scrambling sequence, a reference signal sequence generation parameter, a modulation order, a channel coding rate, an MCS, an RV, a new data indicator, information about rate matching, information about a time domain resource, information about a frequency domain resource, an index of a process number set (that is, a second-type process number set), an index of a PUCCH resource set, a time advance (TA) or a maximum number of CBGs. The maximum number of CBGs is a maximum number of CBGs included in one TB/CW.

Reference signals in one DMRS port group satisfy a quasi co-location relationship with respect to one type of quasi co-location parameter and/or one DMRS port group corresponds to one TCI state or one quasi co-location reference signal set.

An association between the eleventh-type parameter and the twelfth-type parameter includes that one type of parameter is acquired according to the other type of parameter and/or that a correspondence between the two types of parameters is established through signaling information. For example, configuration information of the eleventh-type parameter includes information about the twelfth-type parameter. Therefore, the twelfth-type parameter is obtained according to the notified information about the eleventh-type parameter and the correspondence. If the twelfth-type parameter is a difference between two thirteenth-type parameters, a thirteenth-type parameter corresponding to an information element corresponding to the eleventh-type parameter is acquired according to the twelfth-type parameter and a reference value of one of the two thirteenth-type parameters. The reference value of the one of the two thirteenth-type parameters may be notified in DCI or may be a thirteenth-type parameter corresponding to a predetermined portion of the information element.

Figure 17:
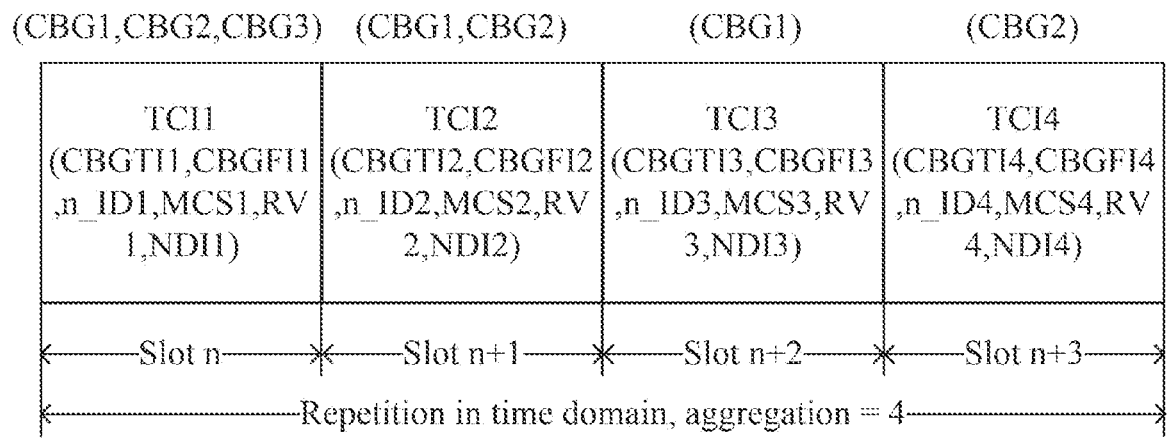
FIG. 17 is schematic diagram two illustrating that in the case where a PDSCH occupies multiple slots, different TCIs are used for different slots and a TCI is associated with (CBGTI, CBGFI, MCS, RV, NDI) according to an embodiment of the present disclosure.

As shown in FIG. 15, aggregation=4, one piece of DCI schedules transmissions in four slots, and one piece of data information is repeatedly transmitted in the four slots, that is, an intersection between each PDSCH in the four slots and TB1={CBG1, CBG2, CBG3} is non-empty and a difference between pieces of transmission information included in TB1 and the PDSCH in each slot is empty or non-empty. To improve link robustness, TB1 may be transmitted by using multiple transmit beams. However, different transmit beams have different link performance so that the different transmit beams may correspond to different thirteenth-type parameters. As shown in FIG. 15, TB1 is repeatedly transmitted in the four slots. Similarly, TB1 may be repeatedly transmitted on different time domain symbol sets in one slot, as shown in FIG. 16. Transmit beams (such as TCIs and/or quasi co-location reference signal sets) may be different in different slots/on different time domain symbol sets. Thus, a correspondence between TCI state indexes and thirteenth-type parameters may be established, as shown in Table 4. Alternatively, a correspondence between different quasi co-location reference signal sets (and/or different time domain resource sets, that is, a time domain resource set 1 and a time domain resource set 2) in one TCI state index and thirteenth-type parameters is established, where the number of the time domain resource sets is the same as the number of the quasi co-location reference signal sets. For example, in FIG. 15, the time domain resource set 1 includes {slot (n), slot (n+2)} corresponding to TCI1; in FIG. 16, the time domain resource set 1 includes {set of time domain symbols 1 and 2, set of time domain symbols 5 and 6} corresponding to TCI1; and in FIG. 17, the time domain resource set 1 includes {slot (n)} corresponding to TCI1, as shown in Table 5. In FIGS. 15 and 16, the aggregation is greater than the number of the quasi co-location reference signal sets and one quasi co-location reference signal set corresponds to more than one slot or time domain symbol set, where more than one quasi co-location reference signal set is polled in the slots/time domain symbol sets whose number is the aggregation. In another implementation of this embodiment, the aggregation is equal to the number of the quasi co-location reference signal sets and one quasi co-location reference signal set corresponds to one slot or time domain symbol set. As shown in FIG. 17, each slot corresponds to one quasi co-location reference signal set. In Tables 4 and 5 and FIGS. 15 to 17, n_ID denotes a generation parameter $n_{ID}$ of a channel scrambling sequence and may also be referred to as a virtual cell ID. n_ID may be a virtual cell ID $n_{ID,PDSCH}$ of a data channel or a virtual cell ID $n_{ID,PDCCH}$ of a control channel.

TABLE 4

| TCI State Index | Target Reference Signal | Quasi Co-Location Reference Signal | Thirteen-Type Parameter |
|---|---|---|---|
| TCI1 | DMRS group1 in time domain resource 1 | (DL-RS1, type-1) (DL-RS2, type-2) | (CBGTI1, CBGFI1, n_ID1, MCS1, RV1, NDI1, frequency domain resource) |
| TCI2 | DMRS group1 in time domain resource 2 | (DL-RS1, type-1) (DL-RS2, type-2) | (CBGTI2, CBGFI2, n_ID2, MCS2, RV2, NDI2, frequency domain resource) |

TABLE 5

| TCI State Index | Target Reference Signal | Quasi Co-Location Reference Signal | Thirteen-Type Parameter |
|---|---|---|---|
| TCI1 | DMRS group1 in time domain resource 1 | (DL-RS1, type-1) (DL-RS2, type-2) | (CBGTI1, CBGFI1, n_ID1, MCS1, RV1, NDI1, frequency domain resource) |
|  | DMRS group1 in time domain resource 2 | (DL-RS1, type-1) (DL-RS2, type-2) | (CBGTI2, CBGFI2, n_ID2, MCS2, RV2, NDI2, frequency domain resource) |

In Tables 4 and 5, the correspondence between TCI states/quasi co-location reference signals and thirteenth-type parameters is directly established. Other information except n_ID among the thirteenth-type parameters is dynamically changed. Tables 4 and 5 are established via higher-layer signaling. The thirteenth-type parameter is dynamically changed in a manner described below. A thirteenth-type parameter of one of multiple TCIs is predetermined to be acquired according to an indication of DCI. Alternatively, a thirteenth-type parameter of one of multiple time units for aggregation (where different time unit sets correspond to different quasi co-location reference signal sets) is acquired according to an indication of DCI. (For example, (CBGTI, CBGFI, MCS, RV, NDI) in a TCI with a minimum index or a time unit with a minimum index are predetermined to be acquired according to information indicated in the DCI. For example, (CBGTI, CBGFI, MCS, RV, NDI) in TCI1 or a first time unit for aggregation (that is, sloth in FIG. 15, the set of time domain symbols 1 and 2 in FIG. 16, or slot (n) in FIG. 17) are acquired according to the information indicated in the DCI, and the thirteenth-type parameter in another time unit/TCI is acquired according to a difference between the thirteenth-type parameter corresponding to this time unit/TCI and the thirteenth-type parameter notified in the DCI (that is, a twelfth-type parameter corresponding to this time unit/TCI) and the thirteenth-type parameter notified in the DCI.) Therefore, a correspondence between a TCI/time unit/time unit set and a difference between a thirteenth-type parameter corresponding to the TCI/time unit/time unit set and the thirteenth-type parameter notified in the DCI (that is, the twelfth-type parameter) may be established in an RRC/MAC-CE command. Specifically, as shown in Tables 6 and 7, CBGTIDiff is used for notifying a difference between CBGTI in a time unit where a TCI is located and CBGTI notified in DCI, where a value of 0 indicates the non-existence of the difference and a value of 1 indicates the existence of the difference. That is, the CBGTI in the time unit where the TCI is located is (CBGTIDiff+CBGTIofDCI) mod 2, where CBGTIofDCI denotes the CBGTI notified in the DCI. A correspondence between the TCI and CBGTIDiffNum may also be established, where CBGTIDiffNum denotes a difference between the number of CBGs in TB1 transmitted in the time unit where the TCI is located and the number of CBGs notified in the DCI. Similarly, CBGFIDiffer is used for notifying whether CBGFI in the time unit where the TCI is located is different from CBGFI notified in the DCI, that is, the CBGFI in the time unit where the TCI is located is (CBGFIDiff+CBGFIofDCI) mod 2. MCSDiffDiffer is used for notifying a difference between an MCS corresponding to TB1 in the time unit where the TCI is located and an MCS of TB1 notified in the DCI, that is, the MCS in the time unit where the TCI is located is (MCSDiff+MCSofDCI) mod 32. RVDiffer is used for notifying a difference between an RV in the time unit where the TCI is located and an RV notified in the DCI, that is, the RV in the time unit where the TCI is located is (RVDiffer+RVofDCI) mod 4. NDIDiffer is used for notifying whether an NDI in the time unit where the TCI is located is different from an NDI notified in the DCI, that is, the NDI in the time unit where the TCI is located is (NDIDiffer+NDIofDCI) mod 2. A difference between frequency domain resources is used for notifying a difference between a frequency domain resource (such as a PRB set) in the time unit where the TCI is located and a frequency domain resource (such as the PRB set) notified in the DCI. That is, the frequency domain resource (such as the PRB set) in the time unit where the TCI is located is a union of the difference and the frequency domain resource notified in the DCI (for example, when an intersection between the difference and the frequency domain resource notified in the DCI is empty). Alternatively, the frequency domain resource (such as the PRB set) in the time unit where the TCI is located is the intersection between the difference and the frequency domain resource notified in the DCI (for example, when the intersection between the difference and the frequency domain resource notified in the DCI is non-empty). A difference between time domain resources is similar to the difference between frequency domain resources. A thirteenth-type parameter of DCI denotes the thirteenth-type parameter notified in the DCI, and A mod B denotes A modulo B. A correspondence between eleventh-type parameters and some differences between thirteenth-type parameters as well as some thirteenth-type parameters may also be established. For example, in Tables 6 and 7, other parameters use differences, and the time domain resource and the frequency domain resource may not use differences.

TABLE 6

| TCI State Index | Target Reference Signal | Quasi Co-Location Reference Signal | Difference between Thirteen-Type Parameters |
| --- | --- | --- | --- |
| TCI1 | DMRS group1 in time domain resource 1 | (DL-RS1, type-1) (DL-RS2, type-2) | (CBGTIDiffNum1, CBGFIDiffer1, n_ID1, MCSDiff1, RVDiff1, NDIDiff1, difference set between frequency domain resources, difference set between time domain resources) |
| TCI2 | DMRS group1 in time domain resource 2 | (DL-RS1, type-1) (DL-RS2, type-2) | (CBGTIDiffNum2, CBGFIDiffer2, n_ID2, MCSDiff2, RVDiff2, NDIDiff2, difference set between frequency domain resources, difference set between time domain resources) |

TABLE 7

| TCI State Index | Target Reference Signal | Quasi Co-Location Reference Signal | Difference between Thirteen-Type Parameters |
| --- | --- | --- | --- |
| TCI1 | DMRS group1 in time domain resource 1 | (DL-RS1, type-1) (DL-RS2, type-2) | (CBGTIDiffNum1, CBGFIDiffer1, n_ID1, MCSDiff1, RVDiff1, NDIDiff1, difference set between frequency domain resources, difference set between time domain resources) |
|  | DMRS group1 in time domain resource 2 | (DL-RS1, type-1) (DL-RS2, type-2) | (CBGTIDiffNum2, CBGFIDiffer2, n_ID2, MCSDiff2, RVDiff2, NDIDiff2, difference set between frequency domain resources, difference set between time domain resources) |

In the embodiment, each slot/time domain symbol set for aggregation corresponds to one set of thirteenth-type parameters. As shown in FIG. 17, the thirteenth-type parameters may be bound to the TCI as described above or may not be bound to the TCI. Further, PDSCHs in different slot/time domain symbol sets for aggregation may occupy different numbers of time domain symbol/PRB/subcarriers. For example, an intersection between pieces of transmission information included in multiple slot/time domain symbol sets is empty, and a difference between the pieces of transmission information included in the multiple slot/time domain symbol sets set is also empty. A PDSCH in a slot/time domain symbol set with a higher MCS may occupy a smaller number of time domain symbol/PRB/subcarriers, and the PDSCH is repeated in the multiple slot/time domain symbol sets. That is, the number of PRB/subcarrier/time domain symbols occupied by the PDSCH in the slot/time domain symbol set is obtained according to the number of allocated subcarriers in the DCI and the thirteenth-type parameter in each slot. In FIG. 17, TBS0 is obtained according to an MCS in a minimum slot (such as sloth) of the four slots, the number of allocated PRBs in the DCI and the number of allocated time domain symbols in the DCI (the time domain symbols are those in sloth), that is, TBSs transmitted in the four slots are all TBS0. Then, PRBi/the number i of subcarriers/the number i of time domain symbols required for transmitting TBS0 in slotn+i (i=1, 2, 3) is obtained according to an MCS in slotn+i and TBS0, and PRB/subcarrier/time domain symbols actually occupied by the PDSCH in slotn+i are obtained in conjunction with information about rate matching. That is, different numbers of frequency domain resources and/or different numbers of time domain resources may be occupied in different slots/different time domain symbol sets for aggregation.

Similarly, when the thirteenth-type parameter is the maximum number of CBGs, a different eleventh-type parameter corresponds to a different maximum number of CBGs. For example, different DMRS groups correspond to different TCIs, the maximum number of CBGs may be different when the TCI is different, and a HARQ-ACK is fed back with different accuracy since different beams correspond to different link performance.

Figure 23:
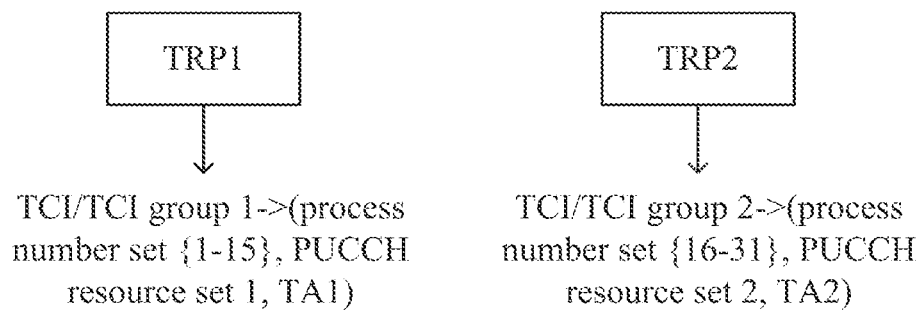
FIG. 23 is a schematic diagram illustrating that different TRPs correspond to different TCI/TCI groups, different process number sets, different PUCCH resource sets and different TAs, and a correspondence exists between the TCI/TCI groups and the process number sets, the PUCCH resource sets and the TAs.

Similarly, in another implementation of this embodiment, when the thirteenth-type parameter is one or more of the index of the process number set, the index of the PUCCH resource set (which may also be referred to as a candidate control channel resource set) or the time advance (TA), it indicates that one or more of the index of the process number set (that is, the second-type process number set), the index of the PUCCH resource set or the TA needs to change with a TCI/TCI group. For example, as shown in FIG. 23, different TCI/TCI groups correspond to different TRPs, the different TCI/TCI groups correspond to different process number sets and different indexes of PUCCH resource sets, and the different process number sets and the different PUCCH resource sets correspond to the different TRPs. For example, HARQ-ACKs of PDSCHs associated with the same index of the process number set or the same index of the PUCCH resource set may fed back in one PUCCH resource/HARQ-ACK feedback codebook, and HARQ-ACKs of PDSCHs associated with different indexes of process number sets or different indexes of PUCCH resource sets cannot be fed back in one PUCCH resource/HARQ-ACK feedback codebook.

A process number set corresponding to a PDSCH/PDCCH is obtained according to a TCI/TCI group of the PDCCH/PDSCH as a process number set corresponding to the TCI/TCI group. For example, if the TCI/TCI group of the PDCCH/PDSCH is TCI1/TCI group 1, a process number set 1 is {0-15} so that a process number is 0 when a relative process number index notified in DCI is 0; and if the TCI/TCI group of the PDCCH/PDSCH is TCI2/TCI group 2, a process number set 2 is {16-31} so that the process number is 16 when the relative process number index notified in the DCI is 0.

Optionally, a PUCCH resource set corresponding to the PDSCH/PDCCH is obtained according to the TCI/TCI group of the PDCCH/PDSCH as a PUCCH resource set corresponding to the TCI/TCI group. For example, if the TCI/TCI group of the PDCCH/PDSCH is TCI1/TCI group 1, the PUCCH resource set is a set 1 so that a HARQ-ACK of the PDCCH/PDSCH is fed back by using one PUCCH resource selected from the PUCCH resource set 1, and if the TCI/TCI group of the PDCCH/PDSCH is TCI2/TCI group 2, the PUCCH resource set is a set 2 so that the HARQ-ACK of the PDCCH/PDSCH is fed back by using one PUCCH resource selected from the PUCCH resource set 2. One PUCCH resource set includes multiple PUCCH resource sets from which a PUCCH set is selected according to a UCI load, and one PUCCH resource is further selected from the PUCCH set according to signaling information or a predetermined rule.

Optionally, a TA for an ACK/NACK corresponding to the feedback of the PDSCH/PDCCH is obtained according to the TCI/TCI group of the PDCCH/PDSCH as a TA corresponding to the TCI/TCI group. For example, if the TCI/TCI group of the PDCCH/PDSCH is TCI1/TCI group 1, the TA is TA1 and a PUCCH/PUSCH including the ACK/NACK of the HARQ-ACK of the PDCCH/PDSCH uses TA1, and if the TCI/TCI group of the PDCCH/PDSCH is TCI2/TCI group 2, the TA is TA1 and a PUCCH/PUSCH including the ACK/NACK of the HARQ-ACK of the PDCCH/PDSCH uses TA2.

Further, an intersection between pieces of transmission information included in different slots is non-empty and a difference between the pieces of transmission information included in the different slots is empty, that is, the same TB is included, and different slot/TCIs correspond to different modulation orders so that one TB corresponds to two bit sequences after channel coding which correspond to the different slot/TCIs, respectively. More than one bit sequence after channel coding differs not only in RV but also in length. For example, when one transmission information sequence is subjected to a rate matching operation of the channel coding, E bits are obtained from L bits after channel coding. The E bits are a bit sequence after channel coding and sent out after channel scrambling, modulation and precoding so that one piece of transmission information needs to correspond to more than one value of E.

In the preceding schemes, the value of the thirteenth-type parameter may be notified for each slot (that is, a time resource set) for aggregation or a combination of the value of the thirteenth-type parameter and the value of the eleventh-type parameter may be notified for each slot.

In the preceding schemes, different slot/time domain symbol sets correspond to different values of thirteenth-type parameters. In another implementation of this embodiment, the PDSCH may be the slot, the value of the eleventh-type parameter is dynamically notified in DCI, and the value of the thirteenth-type parameter is obtained according to the value of the eleventh-type parameter and the correspondence. The value of the eleventh-type parameter and a reference value of the thirteenth-type parameter are dynamically notified in the DCI, a difference of the thirteenth-type parameter is obtained according to the value of the eleventh-type parameter and the correspondence, and the value of the thirteenth-type parameter is obtained according to the difference and the reference value of the thirteenth-type parameter.

In another implementation of this embodiment, a relationship between process number set/PUCCH resource sets and HARQ-ACK feedback codebooks may be established, where HARQ-ACKs corresponding to PDSCH/PDCCHs corresponding to the same process number set/PUCCH resource set may be in one feedback codebook, HARQ-ACKs corresponding to PDSCH/PDCCHs corresponding to different process number set/PUCCH resource sets cannot be in one HARQ-ACK feedback codebook, and the HARQ-ACKs corresponding to the PDSCH/PDCCHs corresponding to the same process number set/PUCCH resource set may be fed back in the one HARQ-ACK feedback codebook corresponding to the process number set/PUCCH resource set. The HARQ-ACKs of the PDSCH/PDCCHs corresponding to the different process number set/PUCCH resource sets are in different HARQ-ACK feedback codebooks.

Similarly, for example, if different TRPs or different beams correspond to different process number sets, a correspondence between process number sets (that is, first-type process number sets, that is, the eleventh-type parameters)

and the twelfth-type parameters may also be established. In this case, the thirteenth-type parameter may change with the process number set.

In the preceding embodiment, when scrambling sequences corresponding to different TRPs have different generation parameters, a TCI/TCI group/index of the quasi co-location reference signal set/group where the quasi co-location reference signal set is located/DMRS group may be established so that a sequence generation parameter is determined. For example, if it is notified in DCI that two quasi co-location reference signal sets correspond to two DMRS groups, an initialization parameter of a pseudonoise (PN) sequence of a DMRS is acquired by the following formula:

$$c_{init}=(2^{17}(N_{symbol}^{slot}n_{s,f}^{\mu}+l+1)(2N_{ID}^{(nSCID+x)mod\ y}+1)+ \\ 2N_{ID}^{(nSCID+x)mod\ y}+n_{SCID}) mod\ 2^{31} \quad (4)$$

Alternatively, a scrambling sequence of the PDSCH is $$c_{init}=n_{RNTI}\cdot 2^{15}+q\cdot 2^{14}+n_{ID}^{x\ mod\ y}.$$

In formula (4), x denotes the preceding TCI/TCI group/index of the quasi co-location reference signal set/group where the quasi co-location reference signal set is located/DMRS group and y denotes the total number of configured $n_{ID,DMRS}$ s. The index of the quasi co-location reference signal set is a relative index of the quasi co-location reference signal set notified in the DCI. For example, if two quasi co-location reference signal sets are notified in the DCI, indexes of the quasi co-location reference signal sets are {0, 1}. For example, one quasi co-location reference signal set is notified in the DCI, that is, there is only one DMRS group, the index of the quasi co-location reference signal set is {0}.

Embodiment Ten

In the embodiment, different TBs may include different maximum numbers of CBGs. For example, the maximum number $C_{CBG,TBi}^{max}$ (1=1, 2) of CBGs included in each TB is determined through signaling information and/or an agreed rule. Further, the TBs are two TBs scheduled by one piece of DCI or the two TBs are two TBs scheduled by two pieces of DCI. For example, if the two TBs are the two TBs scheduled by the one piece of DCI, the number of CBGs included in each TB is determined according to $C_{CBG,TBi}^{max}$ corresponding to the each TB. For example, if TB1 includes C1 CBs, the number of CBGs included in TB1 is $C_{CBG,TB}1=\min(C1,C_{CBG,TB1}^{max})$, each of first M1=mod(C1, $C_{CBG,TB1}$) CBGs includes $$\left\lceil \frac{C1}{C_{CBG,TB1}} \right\rceil$$

CBs, and each of the remaining (C1−M1) CBGs includes $$\left\lfloor \frac{C1}{C_{CBG,TB1}} \right\rfloor$$

CBs. If TB2 includes C2 CBs, the number of CBGs included in TB2 is $C_{CBG,TB2}=\min(C2,C_{CBG,TB2}^{max})$, each of first M2=mod(C2, $C_{CBG,TB2}$) CBGs includes $$\left\lceil \frac{C2}{C_{CBG,TB2}} \right\rceil$$

CBs, and each of the remaining ((C2−M2) CBGs includes $$\left\lfloor \frac{C2}{C_{CBG,TB2}} \right\rfloor$$

CBs.

Further, when two TBs are included in DCI, the number of bits of a CBGTI field is $C_{CBG,TB1}^{max}+C_{CBG,TB2}^{max}$.

Further, as for HARQ-ACK feedback, the number of HARQ-ACK feedback bits corresponding to the two TBs is $C_{CBG,TB1}^{max}+C_{CBG,TB2}^{max}$.

Further, the two TBs belong to the same frequency domain bandwidth.

Further, the two TBs are scheduled by the one piece of DCI, separately and have the same index. In particular, a relationship between DCI and $C_{CBG,i}^{max}$ needs to be determined. For example, DCI1 corresponds to $C_{CBG,1}^{max}$ and DCI2 corresponds to $C_{CBG,2}^{max}$. Specifically, the maximum number of CBGs included in each TB scheduled by DCI in a control resource set (CORESET)/search space is configured in the CORESET/search space.

Further, the maximum number of CBGs is determined according to whether DMRSs corresponding to the two TBs satisfy a quasi co-location relationship. For example, the two TBs each correspond to one DMRS group, when two DMRS groups correspond to the same quasi co-location reference signal set, the maximum numbers of CBGs are the same, and when the two DMRS groups correspond to different quasi co-location reference signal sets, the maximum numbers of CBG are different.

The embodiment is described by using the two TBs as an example. It is not excluded in this embodiment that the maximum number CBGs is configured for each of more than two TBs in one frequency domain bandwidth.

Another embodiment of the present disclosure provides an information processing method. The method includes steps described below:

third information is sent, and/or the third information is determined through signaling information and/or a predetermined rule.

The third information includes at least one of: a maximum number of fourth-type information elements capable of being simultaneously transmitted in one time unit; a maximum number of fourth-type information elements capable of being transmitted in one time unit; a maximum number of spatial receive parameters capable of being simultaneously transmitted in one time unit; a maximum number of fourth-type information elements capable of being notified to be received in a time domain resource between two Hybrid Automatic Repeat Request acknowledgment (HARQ-ACK) feedback resources of one process number, where the HARQ-ACK feedback resources include ACKs or non-acknowledgments (NACKs) for fourth-type information elements in the one process number; whether multiple frequency domain bandwidths are capable of sharing one HARQ entity; whether data or information in multiple soft buffers is capable of being combined; a maximum number of fourth-type information elements including the same transmission information; a condition to be satisfied by a relationship between frequency domain resources occupied by at least two fourth-type information elements whose time domain resources have a non-empty intersection; a condition to be satisfied by a relationship between time domain resources occupied by multiple fourth-type information elements which fall within one time unit; a size of a soft buffer and/or the number of soft buffers corresponding to one process number; or a size of a codeword (CW) or a transport block (TB) and/or the number of CWs or TBs included in one soft buffer.

The time unit includes at least one of a time domain symbol or a slot.

A transmission includes at least one of sending or receiving.

The condition to be satisfied by the relationship between the frequency domain resources occupied by the at least two fourth-type information elements whose time domain resources have the non-empty intersection includes at least one of conditions described below.

An intersection between the frequency domain resources is empty.

An intersection between the frequency domain resources is non-empty and a difference between the frequency domain resources is empty.

An intersection between the frequency domain resources is non-empty and a difference between the frequency domain resources is non-empty.

In the case where the frequency domain resources partially overlap, an intersection between frequency domain resources occupied by multiple fourth-type information elements includes an integer multiple of precoding resource block groups (PRGs), where one of the PRGs is incapable of including both an intersection between the frequency domain resources and a difference set between the frequency domain resources.

The condition to be satisfied by the relationship between the time domain resources occupied by the multiple fourth-type information elements which fall within one time unit includes at least one of conditions described below.

An intersection between the time domain resources is empty.

An intersection between the time domain resources is non-empty and a difference set between the time domain resources is empty.

An intersection between the time domain resources is non-empty and a difference set between the time domain resources is non-empty.

The third information is capability information for one frequency domain bandwidth and/or the capability information is capability information for one frequency domain bandwidth group.

The method satisfies at least one of characteristics described below:
  the fourth-type information element includes one of a data channel, a CW, a TB, a code block group (CBG), a code block (CB), a channel corresponding to a demodulation reference signal (DMRS) group, an information element belonging to one frequency domain bandwidth, an information element belonging to one frequency domain bandwidth group or an information element whose scrambling sequence generation parameter includes a predetermined value;
  a frequency domain resource occupied by the fourth-type information element belongs to one frequency domain bandwidth, or a frequency domain resource occupied by the fourth-type information element belongs to one frequency domain bandwidth group; a scrambling sequence generation parameter of the fourth-type information element includes a predetermined value;
  a scrambling sequence generation parameter of a control channel for scheduling the fourth-type information element includes a predetermined value;

in the case where the relationship between the time domain resources occupied by a multiple fourth-type information elements which fall within one time unit satisfies that the intersection between the time domain resources is non-empty and the difference set between the time domain resources is non-empty, a first intersection and a second intersection are incapable of being simultaneously non-empty, where the first intersection is an intersection between one PRG and the intersection between the time domain resources and the second intersection is an intersection between the one PRG and the difference set between the time domain resources, or the intersection between the time domain resources includes an integer multiple of PRGs.

That is, the PRG cannot include both the intersection and the difference set. The resource includes one or more of a time domain resource or a frequency domain resource, and the PRG is a frequency domain PRG and/or a time domain PRG.

Another embodiment of the present disclosure provides an information processing apparatus. The apparatus includes a processing module.

The processing module is configured to send third information and/or determine the third information through signaling information and/or a predetermined rule.

The third information includes at least one of: a maximum number of fourth-type information elements capable of being simultaneously transmitted in one time unit; a maximum number of fourth-type information elements capable of being transmitted in one time unit; a maximum number of spatial receive parameters capable of being simultaneously transmitted in one time unit; a maximum number of fourth-type information elements capable of being notified to be received in a time domain resource between two Hybrid Automatic Repeat Request acknowledgment (HARQ-ACK) feedback resources of one process number, where the HARQ-ACK feedback resources include ACKs or non-acknowledgments (NACKs) for fourth-type information elements in the one process number; whether multiple frequency domain bandwidths are capable of sharing one HARQ entity; whether data or information in multiple soft buffers is capable of being combined; a maximum number of fourth-type information elements including the same transmission information; a condition to be satisfied by a relationship between frequency domain resources occupied by at least two fourth-type information elements whose time domain resources have a non-empty intersection; a condition to be satisfied by a relationship between time domain resources occupied by multiple fourth-type information elements which fall within one time unit; a size of a soft buffer and/or the number of soft buffers corresponding to one process number; or a size of a codeword (CW) or a transport block (TB) and/or the number of CWs or TBs included in one soft buffer.

The time unit includes at least one of a time domain symbol or a slot.

A transmission includes at least one of sending or receiving.

The condition to be satisfied by the relationship between the frequency domain resources occupied by the at least two fourth-type information elements whose time domain resources have the non-empty intersection includes at least one of conditions described below.

An intersection between the frequency domain resources is empty.

An intersection between the frequency domain resources is non-empty and a difference set between the frequency domain resources is empty.

An intersection between the frequency domain resources is non-empty and a difference set between the frequency domain resources is non-empty.

In the case where the frequency domain resources partially overlap, an intersection between frequency domain resources occupied by multiple fourth-type information elements includes an integer multiple of precoding resource block groups (PRGs), where one of the PRGs is incapable of including both an intersection between the frequency domain resources and a difference set between the frequency domain resources.

The condition to be satisfied by the relationship between the time domain resources occupied by the multiple fourth-type information elements which fall within one time unit includes at least one of conditions described below.

An intersection between the time domain resources is empty.

An intersection between the time domain resources is non-empty and a difference set between the time domain resources is empty.

An intersection between the time domain resources is non-empty and a difference set between the time domain resources is non-empty.

The third information is capability information for one frequency domain bandwidth and/or the capability information is capability information for one frequency domain bandwidth group.

The apparatus satisfies at least one of characteristics described below.

The fourth-type information element includes one of a data channel, a CW, a TB, a code block group (CBG), a code block (CB), a channel corresponding to a demodulation reference signal (DMRS) group, an information element belonging to one frequency domain bandwidth, an information element belonging to one frequency domain bandwidth group or an information element whose scrambling sequence generation parameter includes a predetermined value.

A frequency domain resource occupied by the fourth-type information element belongs to one frequency domain bandwidth, or a frequency domain resource occupied by the fourth-type information element belongs to one frequency domain bandwidth group.

A scrambling sequence generation parameter of the fourth-type information element includes a predetermined value.

A scrambling sequence generation parameter of a control channel for scheduling the fourth-type information element includes a predetermined value.

In the case where the relationship between the time domain resources occupied by a multiple fourth-type information elements which fall within one time unit satisfies that the intersection between the time domain resources is non-empty and the difference set between the time domain resources is non-empty, a first intersection and a second intersection are incapable of being simultaneously non-empty, where the first intersection is an intersection between one PRG and the intersection between the time domain resources and the second intersection is an intersection between the one PRG and the difference set between the time domain resources, or the intersection between the time domain resources includes an integer multiple of PRGs.

That is, the PRG cannot include both the intersection and the difference set. The resource includes one or more of a time domain resource or a frequency domain resource, and the PRG is a frequency domain PRG and/or a time domain PRG.

Another embodiment of the present disclosure provides an information processing apparatus. The apparatus includes a processor and a computer-readable storage medium. The computer-readable storage medium stores instructions which, when executed by the processor, implement any one of the preceding information processing methods.

Another embodiment of the present disclosure provides a computer-readable storage medium. The computer-readable storage medium stores a computer program which, when executed by a processor, implements steps of any one of the preceding information processing methods.

Embodiment Eleven

In the embodiment, a terminal reports to a base station at least one of information/capability information described below.

Information one: a maximum number of fourth-type information elements that can be simultaneously received on one time domain symbol of one frequency domain bandwidth or a maximum number of fourth-type information elements that can be simultaneously received on one time domain symbol of one frequency domain bandwidth group. Optionally, the frequency domain bandwidth group is an intra-band.

Information two: a maximum number of fourth-type information elements that can be received in one slot of one frequency domain bandwidth or a maximum number of fourth-type information elements that can be received in one slot of one frequency domain bandwidth group. Multiple fourth-type information elements in the one slot are time-division multiplexed and/or frequency-division multiplexed or occupy time domain resources whose intersection is non-empty and/or occupy frequency domain resources whose intersection is non-empty.

Information three: a maximum number of fourth-type information elements that can be simultaneously sent on one time domain symbol of one frequency domain bandwidth or a maximum number of fourth-type information elements that can be simultaneously sent on one time domain symbol of one frequency domain bandwidth group.

Information four: a maximum number of fourth-type information elements that can be sent in one slot of one frequency domain bandwidth or a maximum number of fourth-type information elements that can be sent in one slot of one frequency domain bandwidth group. Multiple fourth-type information elements in the one slot are time-division multiplexed and/or frequency-division multiplexed or occupy time domain resources whose intersection is non-empty and/or occupy frequency domain resources whose intersection is non-empty.

Information five: a maximum number of fourth-type information elements that can be notified to be received in a time domain resource between two HARQ-ACK feedbacks of one process number, where the HARQ-ACK feedback includes an ACK or a non-acknowledgment (NACK) for a fourth-type information element in the one process number. Further, the one process number may be a process number in one frequency domain bandwidth group, where the one frequency domain bandwidth group includes one or more frequency domain bandwidths.

Information six: whether multiple frequency domain bandwidths can share one HARQ entity.

Information seven: whether data/information in multiple soft buffers can be combined.

Information eight: a maximum number of fourth-type information elements including transmission information whose intersection is non-empty, that is, a maximum number of values of N described herein.

Information nine: a condition to be satisfied by a relationship between frequency domain resources occupied by multiple fourth-type information elements whose time domain resources have a non-empty intersection in one frequency domain bandwidth. The condition to be satisfied by the relationship between the frequency domain resources includes at least one of the following: an intersection between the frequency domain resources is empty; an intersection between the frequency domain resources is non-empty and a difference between the frequency domain resources is empty (that is, the frequency domain resources totally overlap); or an intersection between the frequency domain resources is non-empty and a difference between the frequency domain resources is non-empty (that is, the frequency domain resources partially overlap). Optionally, it may be limited that in the case where the frequency domain resources partially overlap, the intersection between the frequency domain resources occupied by the multiple fourth-type information elements includes an integer multiple of precoding resource block groups (PRGs) or one PRG cannot include both the intersection between the frequency domain resources and the difference between the frequency domain resources.

Information ten: a condition to be satisfied by a relationship between time domain resources occupied by multiple fourth-type information elements which fall within one time unit. The condition to be satisfied by the relationship between the time domain resources includes at least one of the following: an intersection between the time domain resources is empty; an intersection between the time domain resources is non-empty and a difference between the time domain resources is empty (that is, the time domain resources totally overlap); or an intersection between the time domain resources is non-empty and a difference between the time domain resources is non-empty (that is, the time domain resources partially overlap). Optionally, when the time domain resources partially overlap, the intersection between the time domain resources occupied by the multiple fourth-type information elements includes an integer multiple of time domain precoding groups or one time domain precoding group cannot include both the intersection between the time domain resources and the difference between the time domain resources.

Information eleven: a size of a soft buffer and/or the number of soft buffers corresponding to one process number. For example, if one process number includes three soft buffers, the number of CW/TBs buffered in one process number can be supported so that three TRPs can be supported to simultaneously send data to the terminal or three TRPs can be supported to transmit data to the terminal between two HARQ-ACK feedback resources of the one process number.

Information twelve: a size of a CW/TB and/or the number of CW/TBs included in one soft buffer. For example, if one process number includes three soft buffers, the number of CW/TBs buffered in one process number can be supported so that three TRPs can be supported to simultaneously send data to the terminal or three TRPs can be supported to transmit data to the terminal between two HARQ-ACK feedback resources of the one process number.

Information thirteen: a maximum number of spatial receive parameters that can be simultaneously received on one OFDM symbol of one frequency domain bandwidth or a maximum number of spatial receive parameters that can be simultaneously received on one OFDM symbol of one frequency domain bandwidth group. Different spatial receive parameters of two signals include that quasi co-location reference signals of the two signals with respect to the spatial receive parameters do not satisfy a quasi co-location relationship or that quasi co-location reference signals of the two signals with respect to the spatial receive parameters do not belong to one reference signal group.

Information fourteen: a maximum number of spatial transmit parameters that can be simultaneously sent on one OFDM symbol of one frequency domain bandwidth or a maximum number of spatial transmit parameters that can be simultaneously sent on one OFDM symbol of one frequency domain bandwidth group. Different spatial transmit parameters correspond to different spatial transmit filters.

Information fifteen: a maximum number of processes supported in one frequency domain bandwidth or a maximum number of processes supported in one frequency domain bandwidth group.

Further, the one process number may be a process number in one frequency domain bandwidth or a process number in one frequency domain bandwidth group.

Further, the one time domain symbol is one OFDM symbol or one single carrier symbol.

The fourth-type information element includes one of a data channel, a codeword CW, a transport block (TB), a code block group (CBG), a code block (CB), a channel corresponding to a demodulation reference signal (DMRS) group, a synchronization signal, a PRACH signal or a reference signal.

Optionally, a scrambling sequence generation parameter of the fourth-type information element includes a predetermined value or a scrambling sequence generation parameter of a control channel for scheduling the fourth-type information element includes a predetermined value. The predetermined value includes at least one of a Rand A (RA)-RNTI, a temporary C-RNTI, a C-RNTI, an MCS-C-RNTI, a CS-RNTI, a TPC-PUCCH-RNTI, a TPC-PUSCH-RNTI, a TPC-SRS-RNTI, an INT-RNTI, an SFI-RNTI or an SP-CSI-RNTI. For example, information one is the number of PDSCHs scrambled by the C-RNTI and received simultaneously by the terminal on the same time domain symbol.

One or more of information one to information thirteen may also be notified by the base station to the terminal through signaling information.

Embodiment Twelve

In the embodiment, when an NDI indicates a first transmission of a TB/CW, CBGs included in the TB/CW correspond to non-zero bits in CBGTI in sequence, where the CBGTI includes non-consecutive non-zero bits. For example, the TB/CW includes two CBGs {CBG1, CBG2} in the first transmission and the CBGTI corresponding to the TB/CW includes three bits, that is, the TB/CW includes at most three CBGs. In this case, CBGTI=[1, 0, 1], where {CBG1, CBG2} correspond to two non-zero elements in the CBGTI in sequence, that is, {CBG1, CBG2} correspond to a first bit and a third bit in the CBGTI.

Further, in a retransmission of the TB/CW, the CBGTI is [x, 0, y], where x and y belong to {0, 1} and are used for indicating whether this CBG is included in a current PDSCH.

Embodiment Thirteen

In the embodiment, a mapping table between an indication value of a CBGTI bit field and an indicated parameter is determined according to an NDI.

For example, when the NDI indicates that a TB/CW is a new data transmission or a first transmission, a CBGTI indication field corresponding to the TB/CW does not function since all CBGs obtained according to a TBS in the TB/CW are included in the TB by default and a set of CBGs included in the TB/CW does not need to be indicated by the CBGTI. For example, if it is obtained according to the TBS corresponding to the TB/CW that the TB/CW includes three CBGs, the TB/CW is predetermined to include the three CBGs in the first transmission and the CBGTI indicates which CBGs in the TB are included in a current PDSCH in a retransmission of the TB/CW. For example, when the NDI indicates the new data transmission or the first transmission, the CBGTI bit field corresponding to the TB/CW corresponding to the NDI may be used for notifying other information, such as information about an intersection between two TB/CWs, information about a difference between the two TB/CWs, information about HARQ-ACKs of the two TB/CWs or other information. That is, a correspondence table between the indication value of the CBGTI bit field and the indicated parameter is Table 1. A parameter type indicated in Table 1 is the information about the intersection between the two TB/CWs, the information about the difference between the two TB/CWs, the information about the HARQ-ACKs of the two TB/CWs or the other information. When the NDI indicates that a current TB/CW is a repeated transmission of a previous TB/CW, CBGTI corresponding to the TB/CW is used for indicating CBGs included in the current TB/CW. That is, the correspondence table between the indication value of the CBGTI bit field and the indicated parameter is Table 2. A parameter type indicated in Table 2 is the CBGTI, that is, an indication of whether a CBG is included in the current TB.

Embodiment Fourteen

In the embodiment, a process number of a data channel for semi-persistent scheduling (also referred to as a data channel without dynamic scheduling) is acquired according to at least one of information about a group where a control channel corresponding to the data channel for semi-persistent scheduling is located, a data channel group corresponding to the data channel for semi-persistent scheduling, a process number set corresponding to the data channel for semi-persistent scheduling or a quasi co-location reference signal set.

Further, more than one data channel for semi-persistent scheduling is included in one slot, where each of the more than one data channel for semi-persistent scheduling is a downlink data channel and/or an uplink data channel.

Specifically, for example, a process number of downlink semi-persistent scheduling (SPS) is acquired according to the following formula:

$$\text{HARQ Process ID} = [\text{floor}(\text{CURRENT\_slot} \times 10/(\text{numberOfSlotsPerFrame} \times \text{periodicity}))] \text{modulo nrofHARQ-Processes} \quad (5)$$

where CURRENT_slot denotes an index of a slot where an SPS-PDSCH is located, numberOfSlotsPerFrame denotes the number of slots included in one subframe, periodicity denotes a period of the SPS, and nrofHARQ-Processes denotes the process number. When two TRPs perform transmissions to a terminal, two SPS-PDSCHs exist in one frequency domain bandwidth in one slot. If the same process number is obtained according to the above formula (5), a certain mechanism is required to distinguish the two SPS-PDSCHs unless they are a repeated transmission. Therefore, the following manners may be used.

Manner one: A PDSCH transmitted by each TRP is calculated according to formula (5), but DCI for activating the PDSCH is located in a different control channel resource group and corresponds to a different process number set. For example, a first control channel resource group corresponds to a process number set {0-15} and a second control channel resource group corresponds to a process number set {16-31}. When a relative process number 0 is obtained by formula (5), if DCI for scheduling the PDSCH for semi-persistent scheduling corresponds to the process number set {0-15}, an actual process number of the PDSCH for semi-persistent scheduling is 0; and if the DCI for scheduling the PDSCH for semi-persistent scheduling corresponds to the process number set {16-31}, the actual process number of the PDSCH for semi-persistent scheduling is 31.

Manner two: The PDSCH transmitted by each TRP is calculated according to formula (5). However, if the DCI for activating the PDSCH corresponds to a different quasi co-location reference signal set/a different group where a quasi co-location reference signal set is located, or the PDSCH corresponds to a different quasi co-location reference signal set/a different group where a quasi co-location reference signal set is located, the PHSCH has a different process number.

Manner three: Formulas for calculating process numbers of PDSCHs transmitted by different TRPs are different. For example, a PDSCH transmitted by a first TRP uses the process number in formula (5) and a PDSCH transmitted by a second TRP uses a process number in formula (6), where Δ is a non-negative integer and may be configured in a control channel resource group/control channel resource where DCI for scheduling the PDSCH is located or may be configured in configuration information of the PDSCH.

$$\text{HARQ Process ID2} = [\text{floor}((\text{CURRENT\_slot}+\Delta) \times 10/(\text{numberOfSlotsPerFrame} \times \text{periodicity}))] \text{modulo nrofHARQ-Processes}$$

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic disk or other magnetic storage devices, or any other medium that can be used for storing desired information and that can be accessed by a computer. Moreover, as is known to those having ordinary skill in the art, the communication media generally include computer-readable instructions, data structures, program modules or other data in carriers or in modulated data signals transported in other transport mechanisms and may include any information delivery medium.

The implementations disclosed in embodiments of the present disclosure are intended to facilitate an understanding of embodiments of the present disclosure and not to limit embodiments of the present disclosure. Any person skilled in the art to which embodiments of the present disclosure pertain may make any modifications and changes in the form and details of implementation without departing from the spirit and scope disclosed in embodiments of the present disclosure, but the scope of the present patent is still subject to the scope defined by the appended claims.

What is claimed is:

1. A method for transmitting information, comprising:
   determining whether pieces of transmission information comprised in N first-type information elements comprise same transmission information, wherein the transmission information is an information bit transmitted in a data channel before channel coding; and
   in a case where the pieces of transmission information comprised in N first-type information elements comprise same transmission information, determining first information, wherein the first information comprises:
   a number of bits of each of the pieces of transmission information and a resource mapping manner of the N first-type information element;
   wherein N is a positive integer greater than or equal to 2;
   wherein each of the N first-type information elements comprises an information element corresponding to a demodulation reference signal (DMRS) group, wherein each DMRS group corresponds to one quasi co-location reference signal set, and wherein the N first-type information elements comprise information elements corresponding to N quasi co-location reference signal sets in one codeword (CW);
   wherein determining the number of bits of each of the pieces information comprises acquiring a number of bits of a piece of transmission information comprised in the same transmission information according to fourteenth-type parameters corresponding to one first-type information element with lowest index among the N first-type information elements and corresponding to one quasi co-location reference signal set of the N quasi co-location reference signal sets, the fourteenth-type parameter comprising a number of subcarriers allocated before rate matching, wherein the number of subcarriers allocated before rate matching is determined by R, $Q_m$, and $n_{PRB}$, wherein R, $Q_m$, and $n_{PRB}$ corresponds to the one first-type information element with lowest index, wherein R denotes a channel coding rate, $Q_m$ denotes a modulation order, and $n_{PRB}$ denotes the number of allocated PRBs.

2. The method of claim 1, wherein determining the same transmission information comprises:
   determining the same transmission information according to a transmission configuration indicator (TCI);
   wherein in a case where quasi co-location reference signals configured in the TCIs of the N first-type information elements are different, whether the same transmission information comprised in the N first-type information elements is empty is determined according to at least one of signaling information or a predetermined rule, wherein the quasi co-location signals are associated with one type of quasi co-location parameter.

3. The method of claim 1, wherein determining the resource mapping manner of the N first-type information element comprises at least one of the following:
   a resource mapping manner in the case where the N first-type information element comprise the same transmission information is different from a resource mapping manner in a case where the N first-type information element do not comprise the same transmission information; or
   in the case where the N first-type information element comprise the same transmission information, the resource mapping manner of the N first-type information element is a mapping to a layer and then a mapping to a time-frequency resource in one DMRS group, and then a mapping to a layer and then a mapping to a time-frequency resource in another DMRS group, or the resource mapping manner of the N first-type information element is that a same first-type information element is mapped in each DMRS group separately, wherein one first-type information element corresponds to more than one DMRS group.

4. The method of claim 1, wherein the N first-type information elements satisfy the following characteristics:
   the N first-type information elements are scheduled by one piece of DCI;
   the N first-type information elements correspond to N independent sixth-type parameters;
   the N first-type information elements belong to a same third-type information element; and
   the N first-type information elements correspond to a same process number;
   wherein each of the N independent sixth-type parameters comprises DMRS group, TCI, RV and frequency domain resource.

5. The method of claim 1, comprising at least one of the following:
   in a case where the N first-type information elements satisfy a third characteristic, the N first-type information elements comprises the same transmission information; or
   in a case where the N first-type information elements comprise the same transmission information, the N first-type information elements satisfy a third characteristic.

6. The method of claim 1, further comprising:
   determining a correspondence between an eleventh-type parameter and a thirteenth-type parameter according to at least one of signaling information or a predetermined rule; and
   determining the thirteenth-type parameter according to the correspondence;

wherein the eleventh-type parameter comprises one of: a transmission configuration indicator (TCI) state, a TCI state group; wherein the thirteenth-type parameter comprises one of:
a reference signal sequence generation parameter; a redundancy version (RV) and a time domain resource; an RV and a frequency domain resource; or a time advance (TA).

7. The method of claim 1, further comprising:
sending third information;
wherein the third information comprises at least one of:
a condition to be satisfied by a relationship between frequency domain resources occupied by two fourth-type information elements whose time domain resources overlap; or
a condition to be satisfied by a relationship between time domain resources occupied by a plurality of fourth-type information elements which fall within one time unit;
wherein the fourth-type information element comprises a data channel, and the third information is capability information of a terminal for one frequency domain bandwidth and/or capability information of a terminal for one frequency domain bandwidth group.

8. The method of claim 7, wherein the condition to be satisfied by the relationship between the frequency domain resources occupied by the two fourth-type information elements whose time domain resources overlaps comprises at least one of the following:
the frequency domain resources do not overlap;
the frequency domain resources partial overlap; or
the frequency domain resources are same.

9. The method of claim 1, wherein the N first-type information elements comprise the same transmission information means that a same information bit is repeatedly transmitted in the N first-type information elements.

10. The method of claim 7, wherein the condition to be satisfied by the relationship between the time domain resources occupied by the plurality of fourth-type information elements which fall within one time unit comprises at least one of the following:
the time domain resources do not overlap;
the time domain resources partial overlap; or
the time domain resources are same.

11. An apparatus for transmitting information, comprising:
a first determination module, which is configured to determine whether pieces of transmission information comprised in N first-type information elements comprise same transmission information, wherein the transmission information is an information bit transmitted in a data channel before channel coding; and
a second determination module, which is configured to: in a case where the pieces of transmission information comprised in N first-type information elements comprise same transmission information, determine first information, wherein the first information comprises:
a number of bits of each of the pieces of transmission information and a resource mapping manner of the N first-type information element;
wherein N is a positive integer greater than or equal to 2;
wherein each of the N first-type information elements comprises an information element corresponding to a demodulation reference signal (DMRS) group, wherein each DMRS group corresponds to one quasi co-location reference signal set, and wherein the N first-type information elements comprise information elements corresponding to N quasi co-location reference signal sets in one codeword (CW);
wherein determining the number of bits of each of the pieces information comprises acquiring a number of bits of a piece of transmission information comprised in the same transmission information according to fourteenth-type parameters corresponding to one first-type information element with lowest index among the N first-type information elements and corresponding to one quasi co-location reference signal set of the N quasi co-location reference signal sets, the fourteenth-type parameter comprising a number of subcarriers allocated before rate matching, wherein the number of subcarriers allocated before rate matching is determined by R, $Q_m$, and $n_{PRB}$, wherein R, $Q_m$, and $n_{PRB}$ corresponds to the one first-type information element with lowest index, wherein R denotes a channel coding rate, $Q_m$ denotes a modulation order, $n_{PRB}$ and denotes the number of allocated PRBs.

12. The apparatus of claim 11, wherein determining the resource mapping manner of the first-type information element comprises at least one of the following:
a resource mapping manner in the case where the N first-type information element comprise the same transmission information is non-empty is different from a resource mapping manner in a case where the N first-type information element does not comprise the same transmission information; or
in the case where the N first-type information element comprise the same transmission information, the resource mapping manner of the N first-type information element is a mapping to a layer and then a mapping to a time-frequency resource in one DMRS group, and then a mapping to a layer and then a mapping to a time-frequency resource in another DMRS group, or the resource mapping manner of the N first-type information element is that a same first-type information element is mapped in each DMRS group separately, wherein one first-type information element corresponds to more than one DMRS group.

13. The apparatus of claim 11, wherein the N first-type information elements satisfy the following characteristics:
the N first-type information elements are scheduled by one piece of DCI;
the N first-type information elements correspond to N independent sixth-type parameters;
the N first-type information elements belong to a same third-type information element; and
the N first-type information elements correspond to a same process number;
wherein each of the N independent sixth-type parameters comprises: DMRS group, TCI, RV and frequency domain resource.

14. The apparatus of claim 11, comprising at least one of the following:
in a case where the N first-type information elements satisfy a third characteristic, the N first-type information elements comprises the same transmission information; or
in a case where the N first-type information elements comprise the same transmission information, the N first-type information elements satisfy a third characteristic.

15. The apparatus of claim 11, wherein the N first-type information elements comprise the same transmission information means that a same information bit is repeatedly transmitted in the N first-type information elements.

16. The apparatus of claim 11, further comprising:
a processing module configured to send third information;
wherein the third information comprises at least one of:
a condition to be satisfied by a relationship between frequency domain resources occupied by two fourth-type information elements whose time domain resources overlap; or
a condition to be satisfied by a relationship between time domain resources occupied by a plurality of fourth-type information elements which fall within one time unit;
wherein the fourth-type information element comprises a data channel, and the third information is capability information of a terminal for one frequency domain bandwidth and/or capability information of a terminal for one frequency domain bandwidth group.

* * * * *